(12) United States Patent
Pahwa et al.

(10) Patent No.: US 10,914,606 B2
(45) Date of Patent: Feb. 9, 2021

(54) USER INTERACTIONS FOR A MAPPING APPLICATION

(71) Applicant: Apple Inc., Cupertino, CA (US)

(72) Inventors: Aroon Pahwa, Palo Alto, CA (US); Britt K. Nelson, San Francisco, CA (US); Stephen O. Lemay, Palo Alto, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 16/102,146

(22) Filed: Aug. 13, 2018

(65) Prior Publication Data
US 2019/0003849 A1    Jan. 3, 2019

Related U.S. Application Data

(63) Continuation of application No. 14/836,754, filed on Aug. 26, 2015, now Pat. No. 10,066,959.
(Continued)

(51) Int. Cl.
*G01C 21/36* (2006.01)

(52) U.S. Cl.
CPC ....... *G01C 21/3664* (2013.01); *G01C 21/362* (2013.01); *G01C 21/367* (2013.01);
(Continued)

(58) Field of Classification Search
CPC .... G01C 21/26; G01C 21/36; G01C 21/3614; G01C 21/362; G01C 21/3664;
(Continued)

(56) References Cited

U.S. PATENT DOCUMENTS

| 4,803,487 A | 2/1989 | Willard et al. |
| 5,237,159 A | 8/1993 | Stephens et al. |

(Continued)

FOREIGN PATENT DOCUMENTS

| AU | 2015100708 A4 | 3/2015 |
| AU | 2015100709 A4 | 7/2015 |

(Continued)

OTHER PUBLICATIONS

Google, "How to create a "My Map" in Google Maps," Dec. 8, 2008, https://www.youtube.com/watch?v=TftFnot5uXw (Year: 2008).*
(Continued)

*Primary Examiner* — Spencer D Patton
(74) *Attorney, Agent, or Firm* — Dentons US LLP

(57) ABSTRACT

The present disclosure relates to systems and processes for interacting with mapping applications. In one example, a virtual assistant server can efficiently communicate with a map server to provide a user with map data in response to spoken user requests received at a user device. In another example, communicatively coupled electronic devices can be synchronized such that a location marker generated on one device can be displayed on the other device. In another example, an electronic device can display simplified views of individual route directions that can be updated based on movement of the user or in response to user requests. In another example, an electronic device can selectively display an interface including a current location of a user or an interface including a route to a predicted destination based on contextual information associated with the user. The interfaces can include affordances for launching an associated mapping application.

36 Claims, 29 Drawing Sheets

Related U.S. Application Data

(60) Provisional application No. 62/129,849, filed on Mar. 8, 2015, provisional application No. 62/044,944, filed on Sep. 2, 2014, provisional application No. 62/044,993, filed on Sep. 2, 2014.

(52) U.S. Cl.
CPC ..... *G01C 21/3608* (2013.01); *G01C 21/3626* (2013.01); *G01C 21/3632* (2013.01); *G01C 21/3667* (2013.01)

(58) Field of Classification Search
CPC ............ G01C 21/3673; G01C 21/3679; G01C 21/3682; G01C 21/3685; G01C 21/3688; G08G 1/0968; G08G 1/096877; G08G 1/096883; G08G 1/096894; G08G 1/0969
See application file for complete search history.

(56) References Cited

U.S. PATENT DOCUMENTS

| | | |
|---|---|---|
| 5,265,007 A | 11/1993 | Barnhard et al. |
| 5,484,988 A | 1/1996 | Hills et al. |
| 5,617,031 A | 4/1997 | Tuttle |
| 5,691,524 A | 11/1997 | Josephson |
| 5,717,868 A | 2/1998 | James |
| 5,729,219 A | 3/1998 | Armstrong et al. |
| 5,783,808 A | 7/1998 | Josephson |
| 5,815,657 A | 9/1998 | Williams et al. |
| 5,853,327 A | 12/1998 | Gilboa |
| 5,864,337 A | 1/1999 | Marvin |
| 5,910,989 A | 6/1999 | Naccache |
| 5,917,913 A | 6/1999 | Wang |
| 5,983,197 A | 11/1999 | Enta |
| 6,016,484 A | 1/2000 | Williams et al. |
| 6,097,371 A | 8/2000 | Siddiqui et al. |
| 6,164,528 A | 12/2000 | Hills et al. |
| 6,167,353 A | 12/2000 | Piernot et al. |
| 6,189,785 B1 | 2/2001 | Lowery |
| 6,190,174 B1 | 2/2001 | Lam |
| 6,193,152 B1 | 2/2001 | Fernando et al. |
| 6,230,148 B1 | 5/2001 | Pare et al. |
| 6,260,027 B1 | 7/2001 | Takahashi et al. |
| 6,282,656 B1 | 8/2001 | Wang |
| 6,323,846 B1 | 11/2001 | Westerman et al. |
| 6,328,207 B1 | 12/2001 | Gregoire et al. |
| 6,398,646 B1 | 6/2002 | Wei et al. |
| 6,416,471 B1 | 7/2002 | Kumar et al. |
| 6,570,557 B1 | 5/2003 | Westerman et al. |
| 6,581,042 B2 | 6/2003 | Pare et al. |
| 6,597,378 B1 | 7/2003 | Shiraishi et al. |
| 6,644,546 B2 | 11/2003 | George et al. |
| 6,662,166 B2 | 12/2003 | Pare et al. |
| 6,677,932 B1 | 1/2004 | Westerman |
| 6,842,182 B2 | 1/2005 | Ungar et al. |
| 6,889,138 B1 | 5/2005 | Krull et al. |
| 6,944,818 B2 | 9/2005 | Newman et al. |
| 6,950,810 B2 | 9/2005 | Lapsley et al. |
| 6,963,349 B1 | 11/2005 | Nagasaki |
| 6,970,855 B2 | 11/2005 | Das et al. |
| 7,081,905 B1 | 7/2006 | Raghunath |
| 7,088,342 B2 | 8/2006 | Rekimoto et al. |
| 7,098,896 B2 | 8/2006 | Kushler et al. |
| 7,099,845 B2 | 8/2006 | Higgins et al. |
| 7,099,850 B1 | 8/2006 | Mann, II et al. |
| 7,130,664 B1 | 10/2006 | Williams |
| 7,155,411 B1 | 12/2006 | Blinn et al. |
| 7,190,349 B2 | 3/2007 | Kim et al. |
| 7,305,350 B1 | 12/2007 | Bruecken |
| 7,347,361 B2 | 3/2008 | Lovett |
| 7,356,516 B2 | 4/2008 | Richey et al. |
| 7,359,880 B2 | 4/2008 | Abel et al. |
| 7,406,666 B2 | 7/2008 | Davis et al. |
| 7,430,537 B2 | 9/2008 | Templeton et al. |
| 7,496,527 B2 | 2/2009 | Silverstein et al. |
| 7,535,344 B2 | 5/2009 | Obradovich |
| 7,614,008 B2 | 11/2009 | Ording |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,657,441 B2 | 2/2010 | Richey et al. |
| 7,657,849 B2 | 2/2010 | Chaudhri et al. |
| 7,663,607 B2 | 2/2010 | Hotelling et al. |
| 7,689,508 B2 | 3/2010 | Davis et al. |
| 7,810,720 B2 | 10/2010 | Lovett |
| 7,843,471 B2 | 11/2010 | Doan et al. |
| 7,844,914 B2 | 11/2010 | Andre et al. |
| 7,890,422 B1 | 2/2011 | Hirka et al. |
| 7,957,762 B2 | 6/2011 | Herz et al. |
| RE42,574 E | 7/2011 | Cockayne |
| 8,006,002 B2 | 8/2011 | Kalayjian et al. |
| 8,050,997 B1 | 11/2011 | Nosek et al. |
| 8,105,208 B2 | 1/2012 | Oleson et al. |
| 8,121,945 B2 | 2/2012 | Rackley et al. |
| 8,157,164 B1 | 4/2012 | Billman |
| 8,195,507 B2 | 6/2012 | Postrel |
| 8,195,576 B1 | 6/2012 | Grigg et al. |
| 8,239,784 B2 | 8/2012 | Hotelling et al. |
| 8,279,180 B2 | 10/2012 | Hotelling et al. |
| 8,368,658 B2 | 2/2013 | Brisebois et al. |
| 8,381,135 B2 | 2/2013 | Hotelling et al. |
| 8,392,259 B2 | 3/2013 | MacGillivray et al. |
| 8,452,654 B1 | 5/2013 | Wooters et al. |
| 8,453,940 B2 | 6/2013 | Diamond |
| 8,479,122 B2 | 7/2013 | Hotelling et al. |
| 8,514,186 B2 | 8/2013 | Tan et al. |
| 8,554,694 B1 | 10/2013 | Ward et al. |
| 8,571,937 B2 | 10/2013 | Rose et al. |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,619,034 B2 | 12/2013 | Grad |
| 8,706,628 B2 | 4/2014 | Phillips |
| 8,762,272 B1 | 6/2014 | Cozens et al. |
| 8,763,896 B2 | 7/2014 | Kushevsky et al. |
| 8,825,445 B2 | 9/2014 | Hoffman et al. |
| 8,831,677 B2 | 9/2014 | Villa-Real |
| 8,836,768 B1 | 9/2014 | Rafii et al. |
| 8,842,082 B2 | 9/2014 | Migos et al. |
| 8,880,055 B1 | 11/2014 | Clement et al. |
| 8,892,474 B1 | 11/2014 | Inskeep et al. |
| 8,894,462 B2 | 11/2014 | Leyland et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 9,013,423 B2 | 4/2015 | Ferren |
| 9,244,604 B1 | 1/2016 | Lewbel et al. |
| 9,305,310 B2 | 4/2016 | Radhakrishnan et al. |
| 9,324,067 B2 | 4/2016 | Van Os et al. |
| 9,355,393 B2 | 5/2016 | Purves et al. |
| 9,389,090 B1 * | 7/2016 | Levine ................. G01C 21/362 |
| 9,436,381 B2 | 9/2016 | Migos et al. |
| 9,483,763 B2 | 11/2016 | Van Os et al. |
| 9,519,901 B1 | 12/2016 | Dorogusker |
| 9,547,419 B2 | 1/2017 | Yang et al. |
| 9,558,636 B1 | 1/2017 | Burdick |
| 9,574,896 B2 | 2/2017 | McGavran et al. |
| 9,818,171 B2 | 11/2017 | Zaitsev et al. |
| 9,851,214 B1 | 12/2017 | Chintakindi |
| 9,940,637 B2 | 4/2018 | Van Os et al. |
| 10,019,904 B1 | 7/2018 | Chan et al. |
| 10,250,735 B2 | 4/2019 | Butcher et al. |
| 10,251,034 B2 | 4/2019 | Langlois et al. |
| 10,282,451 B1 | 5/2019 | Ho et al. |
| 10,482,461 B2 | 11/2019 | Van Os et al. |
| 2002/0004760 A1 | 1/2002 | Yoshida et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0046064 A1 | 4/2002 | Maury et al. |
| 2002/0065774 A1 | 5/2002 | Young et al. |
| 2002/0087262 A1 | 7/2002 | Bullock et al. |
| 2003/0006280 A1 | 1/2003 | Seita et al. |

(56) References Cited

U.S. PATENT DOCUMENTS

| | | |
|---|---|---|
| 2003/0061157 A1 | 3/2003 | Hirka et al. |
| 2003/0128237 A1 | 7/2003 | Sakai |
| 2003/0142227 A1 | 7/2003 | Van Zee |
| 2003/0171984 A1 | 9/2003 | Wodka et al. |
| 2003/0181201 A1 | 9/2003 | Bomze et al. |
| 2003/0182628 A1 | 9/2003 | Lira |
| 2003/0184528 A1 | 10/2003 | Kawasaki et al. |
| 2003/0200184 A1 | 10/2003 | Dominguez et al. |
| 2003/0236746 A1 | 12/2003 | Turner et al. |
| 2004/0044953 A1 | 3/2004 | Watkins et al. |
| 2004/0077462 A1 | 4/2004 | Brown et al. |
| 2004/0100389 A1 | 5/2004 | Naito et al. |
| 2004/0122685 A1 | 6/2004 | Bunce |
| 2004/0143553 A1 | 7/2004 | Torget et al. |
| 2004/0150630 A1 | 8/2004 | Hinckley et al. |
| 2004/0169722 A1 | 9/2004 | Pena |
| 2004/0215572 A1 | 10/2004 | Uehara et al. |
| 2004/0254891 A1 | 12/2004 | Blinn et al. |
| 2005/0012723 A1 | 1/2005 | Pallakoff |
| 2005/0052471 A1 | 3/2005 | Nagasaki |
| 2005/0117601 A1 | 6/2005 | Anderson et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0197063 A1 | 9/2005 | White |
| 2005/0210417 A1 | 9/2005 | Marvit et al. |
| 2005/0237194 A1 | 10/2005 | Voba |
| 2005/0250538 A1 | 11/2005 | Narasimhan et al. |
| 2005/0253814 A1 | 11/2005 | Ghassabian |
| 2006/0000900 A1 | 1/2006 | Fernandes et al. |
| 2006/0017692 A1 | 1/2006 | Wehrenberg et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0053392 A1 | 3/2006 | Salmimaa et al. |
| 2006/0064313 A1 | 3/2006 | Steinbarth et al. |
| 2006/0064372 A1 | 3/2006 | Gupta |
| 2006/0079973 A1 | 4/2006 | Bacharach |
| 2006/0132455 A1 | 6/2006 | Rimas-Ribikauskas et al. |
| 2006/0135064 A1 | 6/2006 | Cho et al. |
| 2006/0150087 A1 | 7/2006 | Cronenberger et al. |
| 2006/0165060 A1 | 7/2006 | Dua |
| 2006/0173749 A1 | 8/2006 | Ward et al. |
| 2006/0179404 A1 | 8/2006 | Yolleck et al. |
| 2006/0181518 A1 | 8/2006 | Shen et al. |
| 2006/0197750 A1 | 9/2006 | Kerr et al. |
| 2006/0197753 A1 | 9/2006 | Hotelling |
| 2006/0208065 A1 | 9/2006 | Mendelovich et al. |
| 2006/0218502 A1 | 9/2006 | Matthews et al. |
| 2006/0294007 A1 | 12/2006 | Barthelemy |
| 2006/0294025 A1 | 12/2006 | Mengerink |
| 2007/0061410 A1 | 3/2007 | Alperin |
| 2007/0096283 A1 | 5/2007 | Ljung et al. |
| 2007/0096765 A1 | 5/2007 | Kagan |
| 2007/0123205 A1 | 5/2007 | Lee et al. |
| 2007/0131759 A1 | 6/2007 | Cox et al. |
| 2007/0188409 A1 | 8/2007 | Repetto et al. |
| 2007/0194110 A1 | 8/2007 | Esplin et al. |
| 2007/0194113 A1 | 8/2007 | Esplin et al. |
| 2007/0219901 A1 | 9/2007 | Garbow et al. |
| 2007/0240079 A1 | 10/2007 | Flynt et al. |
| 2007/0254712 A1 | 11/2007 | Chitti |
| 2007/0255564 A1 | 11/2007 | Yee et al. |
| 2007/0260558 A1 | 11/2007 | Look |
| 2008/0006762 A1 | 1/2008 | Fadell et al. |
| 2008/0016443 A1 | 1/2008 | Hiroshima et al. |
| 2008/0027947 A1 | 1/2008 | Pritchett et al. |
| 2008/0040265 A1 | 2/2008 | Rackley III et al. |
| 2008/0040786 A1 | 2/2008 | Chang |
| 2008/0041936 A1 | 2/2008 | Vawter |
| 2008/0052181 A1 | 2/2008 | Devitt-carolan et al. |
| 2008/0054081 A1 | 3/2008 | Mullen |
| 2008/0059351 A1 | 3/2008 | Richey et al. |
| 2008/0067626 A1 | 3/2008 | Hirler et al. |
| 2008/0076637 A1 | 3/2008 | Gilley et al. |
| 2008/0077673 A1 | 3/2008 | Thomas |
| 2008/0078831 A1 | 4/2008 | Johnson et al. |
| 2008/0120029 A1 | 5/2008 | Zelek et al. |
| 2008/0120707 A1 | 5/2008 | Ramia |
| 2008/0126971 A1 | 5/2008 | Kojima |
| 2008/0141126 A1 | 6/2008 | Johnson et al. |
| 2008/0165136 A1 | 7/2008 | Christie et al. |
| 2008/0214191 A1 | 9/2008 | Yach et al. |
| 2008/0221903 A1 | 9/2008 | Kanevsky et al. |
| 2008/0247519 A1 | 10/2008 | Abella et al. |
| 2008/0275779 A1 | 11/2008 | Lakshminarayanan |
| 2008/0284741 A1 | 11/2008 | Hsu et al. |
| 2008/0292074 A1 | 11/2008 | Boni et al. |
| 2008/0319875 A1 | 12/2008 | Levchin et al. |
| 2008/0320391 A1 | 12/2008 | Lemay et al. |
| 2009/0005080 A1 | 1/2009 | Forstall et al. |
| 2009/0023433 A1 | 1/2009 | Walley et al. |
| 2009/0027495 A1 | 1/2009 | Oskin et al. |
| 2009/0030793 A1 | 1/2009 | Fordyce, III |
| 2009/0036165 A1 | 2/2009 | Brede |
| 2009/0037326 A1 | 2/2009 | Chitti et al. |
| 2009/0057396 A1 | 3/2009 | Barbour et al. |
| 2009/0083850 A1 | 3/2009 | Fadell et al. |
| 2009/0088207 A1 | 4/2009 | Sweeney et al. |
| 2009/0091541 A1 | 4/2009 | Chen |
| 2009/0138194 A1 | 5/2009 | Geelen |
| 2009/0159696 A1 | 6/2009 | Mullen |
| 2009/0167706 A1 | 7/2009 | Tan et al. |
| 2009/0173784 A1 | 7/2009 | Yang |
| 2009/0182674 A1 | 7/2009 | Patel et al. |
| 2009/0195402 A1 | 8/2009 | Izadi et al. |
| 2009/0195469 A1 | 8/2009 | Lim et al. |
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0210308 A1 | 8/2009 | Toomer et al. |
| 2009/0213081 A1 | 8/2009 | Case, Jr. |
| 2009/0216556 A1 | 8/2009 | Martin et al. |
| 2009/0222748 A1 | 9/2009 | Lejeune et al. |
| 2009/0228825 A1 | 9/2009 | Van Os et al. |
| 2009/0256817 A1 | 10/2009 | Perlin et al. |
| 2009/0258677 A1 | 10/2009 | Ellis et al. |
| 2009/0307139 A1 | 12/2009 | Mardikar et al. |
| 2009/0325630 A1 | 12/2009 | Tiitola et al. |
| 2009/0327975 A1 | 12/2009 | Stedman |
| 2010/0019990 A1* | 1/2010 | Lee .............. H04L 67/18 345/2.2 |
| 2010/0020034 A1 | 1/2010 | Kim |
| 2010/0023449 A1 | 1/2010 | Skowronek et al. |
| 2010/0026453 A1 | 2/2010 | Yamamoto et al. |
| 2010/0042517 A1 | 2/2010 | Paintin et al. |
| 2010/0078471 A1 | 4/2010 | Lin et al. |
| 2010/0078472 A1 | 4/2010 | Lin et al. |
| 2010/0082445 A1 | 4/2010 | Hodge et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0100839 A1 | 4/2010 | Tseng et al. |
| 2010/0114731 A1 | 5/2010 | Kingston et al. |
| 2010/0125456 A1 | 5/2010 | Weng et al. |
| 2010/0125816 A1 | 5/2010 | Bezos |
| 2010/0131190 A1 | 5/2010 | Terauchi et al. |
| 2010/0131303 A1 | 5/2010 | Collopy et al. |
| 2010/0149090 A1 | 6/2010 | Morris et al. |
| 2010/0153265 A1 | 6/2010 | Hershfield et al. |
| 2010/0159909 A1 | 6/2010 | Stifelman |
| 2010/0161434 A1 | 6/2010 | Herwig et al. |
| 2010/0162170 A1 | 6/2010 | Johns et al. |
| 2010/0164864 A1 | 7/2010 | Chou |
| 2010/0185446 A1 | 7/2010 | Homma et al. |
| 2010/0191570 A1 | 7/2010 | Michaud et al. |
| 2010/0194682 A1 | 8/2010 | Orr et al. |
| 2010/0194692 A1 | 8/2010 | Orr et al. |
| 2010/0198453 A1 | 8/2010 | Dorogusker et al. |
| 2010/0205091 A1 | 8/2010 | Graziano et al. |
| 2010/0216425 A1 | 8/2010 | Smith |
| 2010/0223145 A1 | 9/2010 | Dragt |
| 2010/0243741 A1 | 9/2010 | Eng |
| 2010/0267362 A1 | 10/2010 | Smith et al. |

(56) References Cited

U.S. PATENT DOCUMENTS

| | | |
|---|---|---|
| 2010/0272250 A1 | 10/2010 | Yap et al. |
| 2010/0281374 A1 | 11/2010 | Schulz et al. |
| 2010/0287513 A1 | 11/2010 | Singh et al. |
| 2010/0302168 A1 | 12/2010 | Giancarlo et al. |
| 2010/0306107 A1 | 12/2010 | Nahari |
| 2010/0311397 A1 | 12/2010 | Li |
| 2011/0040657 A1 | 2/2011 | Roswell |
| 2011/0059769 A1 | 3/2011 | Brunolli |
| 2011/0074699 A1 | 3/2011 | Marr et al. |
| 2011/0078025 A1 | 3/2011 | Shrivastav |
| 2011/0078614 A1 | 3/2011 | Lee et al. |
| 2011/0081860 A1 | 4/2011 | Brown et al. |
| 2011/0098928 A1 | 4/2011 | Hoffman et al. |
| 2011/0099079 A1 | 4/2011 | White |
| 2011/0145049 A1 | 6/2011 | Hertel et al. |
| 2011/0153628 A1 | 6/2011 | Basu et al. |
| 2011/0159959 A1 | 6/2011 | Mallinson et al. |
| 2011/0161116 A1 | 6/2011 | Peak et al. |
| 2011/0167369 A1 | 7/2011 | Van Os |
| 2011/0177845 A1 | 7/2011 | Fasold |
| 2011/0184820 A1 | 7/2011 | Mon et al. |
| 2011/0187647 A1 | 8/2011 | Woloszynski et al. |
| 2011/0201306 A1 | 8/2011 | Ali |
| 2011/0202417 A1 | 8/2011 | DeWakar et al. |
| 2011/0218849 A1 | 9/2011 | Rutigliano et al. |
| 2011/0225057 A1 | 9/2011 | Webb et al. |
| 2011/0227872 A1 | 9/2011 | Huska et al. |
| 2011/0244796 A1 | 10/2011 | Khan et al. |
| 2011/0251892 A1 | 10/2011 | Laracey |
| 2011/0258537 A1 | 10/2011 | Rives et al. |
| 2011/0283334 A1 | 11/2011 | Choi et al. |
| 2012/0015779 A1 | 1/2012 | Powch et al. |
| 2012/0022872 A1 | 1/2012 | Gruber et al. |
| 2012/0028609 A1 | 2/2012 | Hruska |
| 2012/0035924 A1 | 2/2012 | Jitkoff et al. |
| 2012/0036029 A1 | 2/2012 | Esplin et al. |
| 2012/0036556 A1 | 2/2012 | Lebeau et al. |
| 2012/0078751 A1 | 3/2012 | Macphail et al. |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0092383 A1 | 4/2012 | Hysek et al. |
| 2012/0101881 A1 | 4/2012 | Taylor et al. |
| 2012/0101887 A1 | 4/2012 | Harvey et al. |
| 2012/0105367 A1 | 5/2012 | Son et al. |
| 2012/0109764 A1 | 5/2012 | Martin et al. |
| 2012/0110431 A1 | 5/2012 | Rosenfeld et al. |
| 2012/0116669 A1 | 5/2012 | Lee et al. |
| 2012/0123806 A1 | 5/2012 | Schumann et al. |
| 2012/0123937 A1 | 5/2012 | Spodak |
| 2012/0127206 A1 | 5/2012 | Thompson et al. |
| 2012/0136780 A1 | 5/2012 | El-awady et al. |
| 2012/0185397 A1 | 7/2012 | Levovitz |
| 2012/0191603 A1 | 7/2012 | Nuzzi |
| 2012/0192065 A1 | 7/2012 | Migos et al. |
| 2012/0192093 A1 | 7/2012 | Migos et al. |
| 2012/0192094 A1 | 7/2012 | Goertz |
| 2012/0197740 A1 | 8/2012 | Grigg et al. |
| 2012/0198531 A1 | 8/2012 | Ort et al. |
| 2012/0209748 A1 | 8/2012 | Small |
| 2012/0215553 A1 | 8/2012 | Leston |
| 2012/0215647 A1 | 8/2012 | Powell et al. |
| 2012/0216113 A1 | 8/2012 | Li |
| 2012/0221464 A1 | 8/2012 | Pasquero et al. |
| 2012/0232968 A1 | 9/2012 | Calman et al. |
| 2012/0235921 A1 | 9/2012 | Laubach |
| 2012/0236037 A1 | 9/2012 | Lessing et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0271712 A1 | 10/2012 | Katzin et al. |
| 2012/0284185 A1 | 11/2012 | Mettler et al. |
| 2012/0287290 A1 | 11/2012 | Jain |
| 2012/0290449 A1 | 11/2012 | Mullen et al. |
| 2012/0290472 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta |
| 2012/0316933 A1 | 12/2012 | Pentland et al. |
| 2012/0317023 A1 | 12/2012 | Moon et al. |
| 2012/0322370 A1 | 12/2012 | Lee |
| 2012/0322371 A1 | 12/2012 | Lee |
| 2013/0006637 A1 | 1/2013 | Kanevsky et al. |
| 2013/0006746 A1 | 1/2013 | Moore |
| 2013/0013499 A1 | 1/2013 | Kalgi |
| 2013/0030934 A1 | 1/2013 | Bakshi et al. |
| 2013/0041654 A1 | 2/2013 | Walker et al. |
| 2013/0047034 A1 | 2/2013 | Salomon et al. |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0065482 A1 | 3/2013 | Trickett |
| 2013/0073321 A1 | 3/2013 | Hofmann et al. |
| 2013/0076591 A1 | 3/2013 | Sirpal et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0085936 A1 | 4/2013 | Law et al. |
| 2013/0093715 A1 | 4/2013 | Marsden et al. |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0115932 A1 | 5/2013 | Williams et al. |
| 2013/0117022 A1 | 5/2013 | Chen et al. |
| 2013/0124319 A1 | 5/2013 | Hodge et al. |
| 2013/0124423 A1 | 5/2013 | Fisher |
| 2013/0125016 A1 | 5/2013 | Pallakoff et al. |
| 2013/0134212 A1 | 5/2013 | Chang |
| 2013/0137073 A1 | 5/2013 | Nacey et al. |
| 2013/0141325 A1 | 6/2013 | Bailey |
| 2013/0144706 A1 | 6/2013 | Qawami et al. |
| 2013/0151414 A1 | 6/2013 | Zhu et al. |
| 2013/0166325 A1 | 6/2013 | Ganapathy et al. |
| 2013/0166679 A1 | 6/2013 | Kuwahara |
| 2013/0179304 A1 | 7/2013 | Swist |
| 2013/0185059 A1 | 7/2013 | Riccardi |
| 2013/0189953 A1 | 7/2013 | Mathews |
| 2013/0189963 A1 | 7/2013 | Epp et al. |
| 2013/0194066 A1 | 8/2013 | Rahman et al. |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0218721 A1 | 8/2013 | Borhan et al. |
| 2013/0219285 A1 | 8/2013 | Iwasaki |
| 2013/0219303 A1 | 8/2013 | Eriksson et al. |
| 2013/0226792 A1 | 8/2013 | Kushevsky et al. |
| 2013/0227413 A1 | 8/2013 | Thorsander et al. |
| 2013/0232073 A1 | 9/2013 | Sheets et al. |
| 2013/0234924 A1 | 9/2013 | Janefalkar et al. |
| 2013/0234929 A1 | 9/2013 | Libin |
| 2013/0238455 A1 | 9/2013 | Laracey |
| 2013/0244615 A1 | 9/2013 | Miller |
| 2013/0246202 A1 | 9/2013 | Tobin |
| 2013/0253980 A1 | 9/2013 | Blom et al. |
| 2013/0282533 A1 | 10/2013 | Foran-owens et al. |
| 2013/0282577 A1 | 10/2013 | Milne |
| 2013/0295961 A1 | 11/2013 | Lehtiniemi et al. |
| 2013/0297414 A1 | 11/2013 | Goldfarb et al. |
| 2013/0304514 A1 | 11/2013 | Hyde et al. |
| 2013/0304651 A1 | 11/2013 | Smith |
| 2013/0307792 A1 | 11/2013 | Andres et al. |
| 2013/0320080 A1 | 12/2013 | Olson et al. |
| 2013/0322665 A1 | 12/2013 | Bennett et al. |
| 2013/0326563 A1 | 12/2013 | Mulcahy et al. |
| 2013/0332113 A1 | 12/2013 | Piemonte et al. |
| 2013/0332358 A1 | 12/2013 | Zhao |
| 2013/0332364 A1 | 12/2013 | Templeton et al. |
| 2013/0339436 A1 | 12/2013 | Gray |
| 2013/0344905 A1 | 12/2013 | Kim et al. |
| 2013/0345971 A1 | 12/2013 | Stamm et al. |
| 2013/0345975 A1 | 12/2013 | Vulcano et al. |
| 2013/0346273 A1 | 12/2013 | Stockton et al. |
| 2013/0346302 A1 | 12/2013 | Purves et al. |

(56) References Cited

U.S. PATENT DOCUMENTS

| | | |
|---|---|---|
| 2013/0346408 A1 | 12/2013 | Duarte et al. |
| 2013/0346882 A1 | 12/2013 | Shiplacoff et al. |
| 2014/0003597 A1 | 1/2014 | Lazaridis et al. |
| 2014/0006285 A1 | 1/2014 | Chi et al. |
| 2014/0006949 A1 | 1/2014 | Briand et al. |
| 2014/0009399 A1 | 1/2014 | Zhang |
| 2014/0011481 A1 | 1/2014 | Kho |
| 2014/0015546 A1 | 1/2014 | Frederick |
| 2014/0015786 A1 | 1/2014 | Honda |
| 2014/0019352 A1 | 1/2014 | Shrivastava |
| 2014/0019522 A1 | 1/2014 | Weng et al. |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058860 A1 | 2/2014 | Roh et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0064155 A1 | 3/2014 | Evans |
| 2014/0068751 A1 | 3/2014 | Last |
| 2014/0073252 A1 | 3/2014 | Lee et al. |
| 2014/0074407 A1 | 3/2014 | Hernandez-Silveira et al. |
| 2014/0074569 A1 | 3/2014 | Francis et al. |
| 2014/0074635 A1 | 3/2014 | Reese et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0084857 A1 | 3/2014 | Liu et al. |
| 2014/0092025 A1 | 4/2014 | Pala et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0109024 A1 | 4/2014 | Miyazaki |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0138435 A1 | 5/2014 | Khalid |
| 2014/0139454 A1 | 5/2014 | Mistry et al. |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0143737 A1 | 5/2014 | Mistry et al. |
| 2014/0143784 A1 | 5/2014 | Mistry et al. |
| 2014/0149198 A1 | 5/2014 | Kim et al. |
| 2014/0155031 A1 | 6/2014 | Lee et al. |
| 2014/0156531 A1 | 6/2014 | Poon et al. |
| 2014/0160033 A1 | 6/2014 | Brikman et al. |
| 2014/0164082 A1 | 6/2014 | Sun et al. |
| 2014/0164241 A1 | 6/2014 | Neuwirth |
| 2014/0167986 A1 | 6/2014 | Parada et al. |
| 2014/0172533 A1 | 6/2014 | Andrews et al. |
| 2014/0173455 A1 | 6/2014 | Shimizu et al. |
| 2014/0176475 A1 | 6/2014 | Myers et al. |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0189584 A1 | 7/2014 | Weng et al. |
| 2014/0191715 A1 | 7/2014 | Wechlin et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0222664 A1 | 8/2014 | Milne |
| 2014/0236840 A1 | 8/2014 | Islam |
| 2014/0237389 A1 | 8/2014 | Ryall et al. |
| 2014/0244365 A1 | 8/2014 | Price et al. |
| 2014/0244493 A1 | 8/2014 | Kenyon et al. |
| 2014/0244495 A1 | 8/2014 | Davis et al. |
| 2014/0257871 A1 | 9/2014 | Christensen et al. |
| 2014/0277843 A1 | 9/2014 | Langlois et al. |
| 2014/0278028 A1 | 9/2014 | Nye et al. |
| 2014/0279442 A1 | 9/2014 | Luoma et al. |
| 2014/0279474 A1 | 9/2014 | Evans et al. |
| 2014/0279497 A1 | 9/2014 | Qaim-magarni et al. |
| 2014/0279556 A1 | 9/2014 | Priebatsch et al. |
| 2014/0280580 A1 | 9/2014 | Langlois et al. |
| 2014/0281957 A1 | 9/2014 | Weng et al. |
| 2014/0282987 A1 | 9/2014 | Narendra et al. |
| 2014/0292396 A1 | 10/2014 | Bruwer et al. |
| 2014/0297385 A1 | 10/2014 | Ryan |
| 2014/0298266 A1* | 10/2014 | Lapp .................. G06F 3/04886 715/835 |
| 2014/0304635 A1 | 10/2014 | Kristinsson et al. |
| 2014/0320387 A1 | 10/2014 | Eriksson et al. |
| 2014/0336931 A1* | 11/2014 | Wilkins .................. G01C 21/20 701/527 |
| 2014/0337207 A1 | 11/2014 | Zhang et al. |
| 2014/0337450 A1 | 11/2014 | Choudhary et al. |
| 2014/0343843 A1 | 11/2014 | Yanku |
| 2014/0344082 A1 | 11/2014 | Soundararajan |
| 2014/0359481 A1 | 12/2014 | Dawson et al. |
| 2014/0365113 A1 | 12/2014 | Mcgavran et al. |
| 2014/0365126 A1 | 12/2014 | Vulcano et al. |
| 2014/0370807 A1 | 12/2014 | Lei et al. |
| 2015/0006207 A1 | 1/2015 | Jarvis et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0014141 A1 | 1/2015 | Rao et al. |
| 2015/0017956 A1 | 1/2015 | Jeong |
| 2015/0039494 A1 | 2/2015 | Sinton et al. |
| 2015/0044965 A1 | 2/2015 | Kamon et al. |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0061972 A1 | 3/2015 | Seo et al. |
| 2015/0065035 A1 | 3/2015 | Kim et al. |
| 2015/0066758 A1 | 3/2015 | Denardis et al. |
| 2015/0067513 A1 | 3/2015 | Zambetti et al. |
| 2015/0067580 A1 | 3/2015 | Um et al. |
| 2015/0077362 A1 | 3/2015 | Seo |
| 2015/0089407 A1 | 3/2015 | Suzuki |
| 2015/0094031 A1 | 4/2015 | Liu |
| 2015/0095174 A1 | 4/2015 | Dua |
| 2015/0098309 A1 | 4/2015 | Adams et al. |
| 2015/0100982 A1 | 4/2015 | Sirpal et al. |
| 2015/0112752 A1 | 4/2015 | Wagner et al. |
| 2015/0121405 A1 | 4/2015 | Ekselius et al. |
| 2015/0127539 A1 | 5/2015 | Ye et al. |
| 2015/0130830 A1 | 5/2015 | Nagasaki et al. |
| 2015/0153850 A1 | 6/2015 | Fujii et al. |
| 2015/0178878 A1 | 6/2015 | Huang |
| 2015/0185896 A1 | 7/2015 | Gwin et al. |
| 2015/0186871 A1 | 7/2015 | Laracey |
| 2015/0187019 A1 | 7/2015 | Fernandes et al. |
| 2015/0217163 A1 | 8/2015 | Amis et al. |
| 2015/0220924 A1 | 8/2015 | Bakker |
| 2015/0257004 A1 | 9/2015 | Shanmugam et al. |
| 2015/0269848 A1 | 9/2015 | Yuen et al. |
| 2015/0302493 A1 | 10/2015 | Batstone et al. |
| 2015/0302510 A1 | 10/2015 | Godsey et al. |
| 2015/0326985 A1 | 11/2015 | Priyantha et al. |
| 2015/0339652 A1 | 11/2015 | Park et al. |
| 2015/0348001 A1 | 12/2015 | Van Os et al. |
| 2015/0348002 A1 | 12/2015 | Van Os et al. |
| 2015/0348009 A1 | 12/2015 | Brown et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0350448 A1 | 12/2015 | Coffman et al. |
| 2015/0370529 A1 | 12/2015 | Zambetti et al. |
| 2016/0005028 A1 | 1/2016 | Mayblum et al. |
| 2016/0012465 A1 | 1/2016 | Sharp |
| 2016/0019536 A1 | 1/2016 | Ortiz et al. |
| 2016/0021003 A1 | 1/2016 | Pan |
| 2016/0047666 A1 | 2/2016 | Fuchs |
| 2016/0048705 A1 | 2/2016 | Yang |
| 2016/0058336 A1 | 3/2016 | Blahnik et al. |

(56) References Cited

U.S. PATENT DOCUMENTS

| | | | |
|---|---|---|---|
| 2016/0061613 A1 | 3/2016 | Jung et al. |
| 2016/0061623 A1 | 3/2016 | Pahwa et al. |
| 2016/0062487 A1 | 3/2016 | Foss et al. |
| 2016/0062572 A1 | 3/2016 | Yang et al. |
| 2016/0065505 A1 | 3/2016 | Iskander |
| 2016/0104228 A1 | 4/2016 | Sundaresan |
| 2016/0110329 A1 | 4/2016 | Yu et al. |
| 2016/0180305 A1 | 6/2016 | Dresser et al. |
| 2016/0224966 A1 | 8/2016 | Van Os et al. |
| 2016/0224973 A1 | 8/2016 | Van Os et al. |
| 2016/0232513 A1 | 8/2016 | Purves et al. |
| 2016/0238402 A1 | 8/2016 | Mcgavran et al. |
| 2016/0253665 A1 | 9/2016 | Van Os et al. |
| 2016/0259489 A1 | 9/2016 | Yang |
| 2016/0260414 A1 | 9/2016 | Yang |
| 2016/0269540 A1 | 9/2016 | Butcher et al. |
| 2016/0358133 A1 | 12/2016 | Van Os et al. |
| 2016/0358134 A1 | 12/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2016/0370879 A1 | 12/2016 | Sharma |
| 2017/0004507 A1 | 1/2017 | Henderson et al. |
| 2017/0011210 A1 | 1/2017 | Cheong et al. |
| 2017/0013408 A1 | 1/2017 | Grzywaczewski et al. |
| 2017/0032375 A1 | 2/2017 | Van Os et al. |
| 2017/0038856 A1 | 2/2017 | Missig et al. |
| 2017/0083188 A1 | 3/2017 | Yang et al. |
| 2017/0139517 A9 | 5/2017 | Morton et al. |
| 2017/0160098 A1 | 6/2017 | Mcgavran et al. |
| 2017/0161018 A1 | 6/2017 | Lemay et al. |
| 2017/0169185 A1 | 6/2017 | Weng |
| 2017/0300897 A1 | 10/2017 | Ferenczi et al. |
| 2017/0353815 A1 | 12/2017 | Jagannathan et al. |
| 2017/0354845 A1 | 12/2017 | Williams et al. |
| 2017/0357439 A1 | 12/2017 | Lemay et al. |
| 2017/0357972 A1 | 12/2017 | Van Os et al. |
| 2018/0088761 A1 | 3/2018 | Schobel et al. |
| 2018/0108243 A1 | 4/2018 | Scherer |
| 2018/0117944 A1 | 5/2018 | Lee |
| 2018/0158066 A1 | 6/2018 | Van Os et al. |
| 2018/0225297 A1 | 8/2018 | Andrew et al. |
| 2018/0276673 A1 | 9/2018 | Van Os et al. |
| 2018/0350144 A1 | 12/2018 | Rathod |
| 2018/0356243 A1 | 12/2018 | Mehta et al. |
| 2019/0050867 A1 | 2/2019 | Van Os et al. |
| 2019/0173996 A1 | 6/2019 | Butcher et al. |
| 2019/0213021 A1 | 7/2019 | Missig et al. |
| 2019/0232110 A1 | 8/2019 | Williams et al. |
| 2019/0232111 A1 | 8/2019 | Williams et al. |
| 2019/0297478 A1 | 9/2019 | Langlois et al. |
| 2019/0334907 A1 | 10/2019 | Rodden et al. |
| 2020/0065821 A1 | 2/2020 | Van Os et al. |
| 2020/0120170 A1 | 4/2020 | Amitay et al. |
| 2020/0159894 A1 | 5/2020 | Keen et al. |
| 2020/0211047 A1 | 7/2020 | Van Os et al. |
| 2020/0358897 A1 | 11/2020 | Dellinger et al. |

FOREIGN PATENT DOCUMENTS

| | | |
|---|---|---|
| AU | 2016100796 A4 | 12/2016 |
| CN | 101171604 A | 4/2008 |
| CN | 101730907 A | 6/2010 |
| CN | 102244676 A | 11/2011 |
| CN | 102282578 A | 12/2011 |
| CN | 102989159 A | 3/2013 |
| CN | 103188280 A | 7/2013 |
| CN | 103210366 A | 7/2013 |
| CN | 103413218 A | 11/2013 |
| CN | 103701605 A | 4/2014 |
| CN | 103778533 A | 5/2014 |
| CN | 104038256 A | 9/2014 |
| CN | 104205785 A | 12/2014 |
| CN | 104252675 A | 12/2014 |
| CN | 104272854 A | 1/2015 |
| CN | 104281430 A | 1/2015 |
| CN | 104288983 A | 1/2015 |
| CN | 104346297 A | 2/2015 |
| EP | 0836074 A2 | 4/1998 |
| EP | 1614992 A1 | 1/2006 |
| EP | 1858238 A2 | 11/2007 |
| EP | 2096413 A1 | 9/2009 |
| EP | 2150031 A1 | 2/2010 |
| EP | 2247087 A1 | 11/2010 |
| EP | 2306692 A1 | 4/2011 |
| EP | 2341315 A1 | 7/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2654275 A1 | 10/2013 |
| EP | 2672377 A2 | 12/2013 |
| EP | 2674889 A2 | 12/2013 |
| EP | 2701107 A1 | 2/2014 |
| EP | 2720442 A1 | 4/2014 |
| EP | 2725537 A1 | 4/2014 |
| GB | 2505476 A | 3/2012 |
| JP | 0-6-284182 A | 10/1994 |
| JP | 9-292262 A | 11/1997 |
| JP | 11-39385 A | 2/1999 |
| JP | 11-73530 A | 3/1999 |
| JP | 11-183183 A | 7/1999 |
| JP | 2001-92586 A | 4/2001 |
| JP | 2001-318751 A | 11/2001 |
| JP | 2002-99854 A | 4/2002 |
| JP | 2003-16398 A | 1/2003 |
| JP | 2003-178244 A | 6/2003 |
| JP | 2003-295994 A | 10/2003 |
| JP | 2003-346059 A | 12/2003 |
| JP | 2004-252736 A | 9/2004 |
| JP | 2004-258738 A | 9/2004 |
| JP | 2005-521961 A | 7/2005 |
| JP | 2005-523505 A | 8/2005 |
| JP | 2006-31182 A | 2/2006 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-221468 A | 8/2006 |
| JP | 2006-277670 A | 10/2006 |
| JP | 2007-34637 A | 2/2007 |
| JP | 2007-507011 A | 3/2007 |
| JP | 2007-124667 A | 5/2007 |
| JP | 2007-226794 A | 9/2007 |
| JP | 2007-334637 A | 12/2007 |
| JP | 2008-102860 A | 5/2008 |
| JP | 2008-306667 A | 12/2008 |
| JP | 2009-9350 A | 1/2009 |
| JP | 2009-49878 A | 3/2009 |
| JP | 2009-99076 A | 5/2009 |
| JP | 2009-134521 A | 6/2009 |
| JP | 2009-136456 A | 6/2009 |
| JP | 2010-61402 A | 3/2010 |
| JP | 2010-517390 A | 5/2010 |
| JP | 2010-524051 A | 7/2010 |
| JP | 2011-519439 A | 7/2011 |
| JP | 2012-504273 A | 2/2012 |
| JP | 2012-508930 A | 4/2012 |
| JP | 2012-99025 A | 5/2012 |
| JP | 2012-114676 A | 6/2012 |
| JP | 2012-198625 A | 10/2012 |
| JP | 2012-208645 A | 10/2012 |
| JP | 2012-215981 A | 11/2012 |
| JP | 2012-529699 A | 11/2012 |
| JP | 2013-20496 A | 1/2013 |
| JP | 2013-25357 A | 2/2013 |
| JP | 2013-25409 A | 2/2013 |
| JP | 2013-34322 A | 2/2013 |
| JP | 2013-120468 A | 6/2013 |
| JP | 2013-530445 A | 7/2013 |
| JP | 2013-533532 A | 8/2013 |
| JP | 5267966 B2 | 8/2013 |
| JP | 2013-191234 A | 9/2013 |

(56) References Cited

FOREIGN PATENT DOCUMENTS

| | | |
|---|---|---|
| JP | 2013-206274 A | 10/2013 |
| JP | 2013-218663 A | 10/2013 |
| JP | 2013-222410 A | 10/2013 |
| JP | 2014-503891 A | 2/2014 |
| JP | 2014-41616 A | 3/2014 |
| JP | 2014-44719 A | 3/2014 |
| JP | 2014-44724 A | 3/2014 |
| JP | 2014-53692 A | 3/2014 |
| JP | 2014-75155 A | 4/2014 |
| JP | 2014-123169 A | 7/2014 |
| JP | 2014-191653 A | 10/2014 |
| KR | 10-2004-0049502 A | 6/2004 |
| KR | 10-2004-0067514 A | 7/2004 |
| KR | 10-2006-0098024 A | 9/2006 |
| KR | 10-2008-0064395 A | 7/2008 |
| KR | 10-2009-0100320 A | 9/2009 |
| KR | 10-2010-0045059 A | 5/2010 |
| KR | 10-2011-0056561 A | 5/2011 |
| KR | 10-2011-0078008 A | 7/2011 |
| KR | 10-2011-0093729 A | 8/2011 |
| KR | 10-2012-0040693 A | 4/2012 |
| KR | 10-2012-0057800 A | 6/2012 |
| KR | 10-1184865 B1 | 9/2012 |
| KR | 10-2013-0027326 A | 3/2013 |
| KR | 10-2013-0112339 A | 10/2013 |
| KR | 10-2013-0116905 A | 10/2013 |
| KR | 10-1330962 B1 | 11/2013 |
| KR | 10-2014-0018019 A | 2/2014 |
| KR | 10-2014-0026263 A | 3/2014 |
| KR | 10-2014-0027029 A | 3/2014 |
| KR | 10-2014-0055429 A | 5/2014 |
| KR | 10-2014-0105309 A | 9/2014 |
| TW | 201012152 A | 3/2010 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | 201509168 A | 4/2015 |
| TW | M474482 U | 11/2016 |
| WO | 2003/038698 A1 | 5/2003 |
| WO | 2003/083793 A2 | 10/2003 |
| WO | 2003/093765 A2 | 11/2003 |
| WO | 2007/000012 A1 | 1/2007 |
| WO | 2007/008321 A2 | 1/2007 |
| WO | 2007/105937 A1 | 9/2007 |
| WO | 2007/116521 A1 | 10/2007 |
| WO | 2008/147457 A1 | 12/2008 |
| WO | 2010/039337 A2 | 4/2010 |
| WO | 2010/056484 A2 | 5/2010 |
| WO | 2010/077960 A2 | 7/2010 |
| WO | 2011/063516 A1 | 6/2011 |
| WO | 2012/078079 A2 | 6/2012 |
| WO | 2012/083113 A2 | 6/2012 |
| WO | 2012/172970 A1 | 12/2012 |
| WO | 2013/017736 A1 | 2/2013 |
| WO | 2013/023224 A2 | 2/2013 |
| WO | 2013/066659 A1 | 5/2013 |
| WO | 2013/157330 A1 | 10/2013 |
| WO | 2013/169875 A2 | 11/2013 |
| WO | 2013/177548 A1 | 11/2013 |
| WO | 2014/074407 A1 | 5/2014 |
| WO | 2014/078965 A1 | 5/2014 |
| WO | 2014/171734 A2 | 10/2014 |
| WO | 2015/009581 A1 | 1/2015 |
| WO | 2015/030912 A1 | 3/2015 |
| WO | 2015/051361 A1 | 4/2015 |

OTHER PUBLICATIONS

Office Action received for European Patent Application No. 16201159.7, dated Jun. 12, 2019, 10 pages.

Office Action received for Japanese Patent Application No. 2016-224506, dated May 14, 2019, 22 pages (11 pages of English Translation and 11 pages of Official Copy).

Office Action received for Japanese Patent Application No. 2018-121118, dated May 14, 2019, 10 pages (5 pages of English Translation and 5 pages of Official Copy).

Office Action received for Korean Patent Application No. 10-2016-0152210, dated May 30, 2019, 8 pages (4 pages of English Translation and 4 pages of Official copy).

Office Action received for Korean Patent Application No. 10-2017-7034558, dated Jun. 4, 2019, 7 pages (3 pages of English Translation and 4 pages of Official Copy).

Kawai, Yasuhiro, "Resolving anxieties regarding card payment abuse by authentication—overcoming cumbersomeness by cooperation with mobile phones", Nikkei Internet Solutions No. 78, Japan, Nikkei BP, Dec. 22, 2003, pp. 28-31(Official Copy only) {See Communication under 37 CFR § 1.98(a) (3)}.

Certificate of Examination received for Australian Patent Application No. 2018101855, dated Aug. 6, 2019, 02 pages.

Corrected Notice of Allowance received for U.S. Appl. No. 15/866,341, dated Aug. 21, 2019, 3 pages.

Final Office Action received for U.S. Appl. No. 15/713,551, dated Jul. 29, 2019, 21 pages.

Intention to Grant received for European Patent Application No. 13795330.3, dated Aug. 9, 2019, 13 pages.

Notice of Allowance received for Chinese Patent Application No. 201380080659.6, dated Jul. 29, 2019, 2 pages (1 page of English Translation and 1 page of Official Copy).

Office Action received for Korean Patent Application No. 10-2017-0022582, dated Jul. 31, 2019, 5 pages (2 pages of English Translation and 3 pages of Official Copy).

Supplementary European Search Report received for European Patent Application. No. 17810749.6, dated Aug. 6, 2019, 6 pages.

Office Action received for Korean Patent Application No. 10-2019-7038235, dated Mar. 9, 2020, 15 pages (7 pages of English Translation and 8 pages of Official Copy).

Corrected Notice of Allowance received for U.S. Appl. No. 15/294,439, dated Mar. 13, 2019, 4 pages.

Decision to Refuse received for European Patent Application No. 16201195.1, dated on Mar. 4, 2019, 23 pages.

Notice of Allowance received for Japanese Patent Application No. 2016-569665, dated Feb. 22, 2019, 4 pages (1 Page of English Translation and 3 Pages of Official Copy).

Office Action received for Australian Patent Application No. 2018200485, dated Feb. 20, 2019, 6 pages.

Office Action received for Japanese Patent Application No. 2017-562050, dated Feb. 1, 2019, 15 pages (8 pages of Englisn Translation and 7 pages of Official Copy).

Office Action received for Japanese Patent Application No. 2017-562330, dated Jan. 18, 2019, 11 pages (6 pages of English Translation and 5 pages of Official Copy).

Office Action received for Taiwanese Patent Application No. 104117508, dated Jan. 25, 2019, 24 pages (5 pages of English Translation and 19 pages of Official Copy).

Supplemental Notice of Allowance received for U.S. Appl. No. 14/870,726, dated Mar. 6, 2019, 6 pages.

Office Action received for Australian Patent Application No. 2018101855, dated Feb. 22, 2019, 4 pages.

International Preliminary Report on Patentability received for PCT Patent Application No. PCT/US2017/035554, dated Dec. 20, 2018, 39 pages.

Non-Final Office Action received for U.S. Appl. No. 16/164,561, dated Jan. 4, 2019, 14 pages.

Notice of Allowance received for U.S. Appl. No. 15/294,439, dated Jan. 8, 2019, 8 pages.

Notice of Allowance received for U.S. Appl. No. 15/616,480, dated Jan. 3, 2019, 8 pages.

Office Action received for Chinese Patent Application No. 201510284715.9, dated Dec. 21, 2018, 22 pages (5 pages of English Translation and 17 pages of Official Copy).

Office Action received for Chinese Patent Application No. 201710094150.7 dated Dec. 19, 2018, 12 Pages.( 5 pages of English translation and 7 pages of Official Copy).

(56) References Cited

OTHER PUBLICATIONS

Office Action received for Chinese Patent Application No. 201510284715.9, dated Jun. 19, 2019, 26 pages (8 pages of English Translation and 18 pages of Official Copy).
Office Action received for Taiwanese Patent Application No. 104117508, dated May 22, 2019, 7 pages (3 pages of English Translation and 4 pages of Official Copy).
Notice of Allowance received for U.S. Appl. No. 14/871,635, dated Jan. 15, 2020, 3 pages.
Office Action received for Chinese Patent Application No. 201610371856.9, dated Dec. 18, 2019, 6 pages (3 pages of English Translation and 3 pages of Official Copy).
Non-Final Office Action received for U.S. Appl. No. 16/377,892, dated May 21, 2020, 9 pages.
Notice of Allowance received for Chinese Patent Application No. 201610371856.9, dated May 11, 2020, 2 pages (1 page of English Translation and 1 page of Official copy).
Notice of Allowance received for Korean Patent Application No. 10-2020-0048600, dated Apr. 30, 2020, 5 pages (2 pages of English Translation and 3 pages of Official Copy).
Notice of Allowance received for U.S. Appl. No. 16/667,271, dated May 12, 2020, 11 pages.
Office Action received for Chinese Patent Application No. 201510284715.9, dated Apr. 14, 2020, 19 pages (7 pages of English Translation and 12 pages of Official Copy).
Summons to Attend Oral Proceedings received for European Patent Application No. 15728352.4, mailed on May 12, 2020, 25 pages.
Minutes of the Oral Proceedings received for European Patent Application No. 13795330.3, mailed on Aug. 2, 2019, 7 pages.
Office Action received for Australian Patent Application No. 2018202559, dated Jul. 19, 2019, 5 pages.
Office Action received for Chinese Patent Application No. 201610371774.4, dated Jul. 8, 2019, 6 pages (3 pages of English Translation and 3 pages of Official copy).
Office Action received for Chinese Patent Application No. 201610371856.9, dated Jul. 10, 2019, 6 pages (3 pages of English Translation and 3 pages of Official Copy).
Notice of Allowance received for U.S. Appl. No. 15/866,341, dated Jul. 26, 2019, 8 pages.
Decision to Grant received for European Patent Application No. 13795330.3, dated Jan. 16, 2020, 2 pages.
Notice of Allowance received for Japanese Patent Application No. 2016-224506, dated Jan. 24, 2020, 4 pages (1 pages of English Translation and 3 pages of Official Copy).
Notice of Allowance received for U.S. Appl. No. 14/871,635, dated Feb. 3, 2020, 3 pages.
Office Action received for Chinese Patent Application No. 201510284715.9, dated Dec. 18, 2019, 24 pages (7 pages of English Translation and 17 pages of Official Copy).
Summons to Attend Oral Proceedings received for European Patent Application No. 15727291.5, mailed on Jan. 28, 2020, 13 pages.
Summons to Attend Oral Proceedings received for European Patent Application No. 16201205.8, mailed on Jan. 28, 2020, 18 pages.
Summons to Attend Oral Proceedings received for European Patent Application No. 16804040.0, mailed on Jan. 24, 2020, 11 pages.
Brief Communication regarding Oral Proceedings received for European Patent Application No. 16201205.8, dated May 29, 2020, 29 pages.
Brief Communication Regarding Oral Proceedings received for European Patent Application No. 16804040.0, dated May 28, 2020, 15 pages.
Decision to Refuse received for European Patent Application No. 15728352.4, dated May 28, 2020, 25 pages.
Non-Final Office Action received for U.S. Appl. No. 16/378,136, dated Jun. 2, 2020, 8 pages.
Notice of Allowance received for Japanese Patent Application No. 2017-562050, dated Jun. 1, 2020, 4 pages (1 page of English Translation and 3 pages of Official Copy).
Non-Final Office Action Received for U.S. Appl. No. 14/871,635, dated Nov. 16, 2018, 36 pages.
Non-Final Office Action received for U.S. Appl. No. 15/866,341, dated Nov. 13, 2018, 11 pages.
Notice of Allowance received for U.S. Appl. No. 15/033,551, dated Nov. 14, 2018, 10 pages.
Office Action received for Korean Patent Application No. 10-2017-7034677, dated Nov. 1, 2018, 5 pages (2 pages of English Translation and 3 pages of Official Copy).
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 14/869,877, dated on Jan. 5, 2017, 3 pages.
Advisory Action received for U.S. Appl. No. 14/870,793, dated on Apr. 13, 2017, 3 pages.
Advisory Action received for U.S. Appl. No. 15/137,944, dated May 11, 2017, 6 pages.
Corrected Notice of Allowance received for U.S. Appl. No. 14/836,754, dated May 23, 2018, 2 pages.
Corrected Notice of Allowance received for U.S. Appl. No. 15/137,944, dated Jan. 11, 2018, 2 pages.
Corrected Notice of Allowance received for U S. Appl. No. 15/137,944, dated Jan. 19, 2018, 2 pages.
Decision to Grant received for Danish Patent Application No. PA201570664, dated Feb. 20, 2017, 2 pages.
Decision to Grant received for Danish Patent Application No. PA201570665, dated Apr. 26, 2017, 2 pages.
Decision to Grant received for Danish Patent Application No. PA201670042, dated Mar. 19, 2018, 2 pages.
"Does Apple Pay Change Payment?" Mac Fan, Japan, Mynavi Publishing Corporation, vol. 22, No. 11 common No. 381, Nov. 1, 2014, 11 pages (4 pages of English Translation and 7 pages of Official copy only).
Extended European Search Report received for European Patent Application No. 16201159.7, dated Mar. 27, 2017, 12 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 18154163.2, dated Mar. 2, 2018, 4 pages.
Final Office Action received for U.S. Appl. No. 14/503,327, dated May 18, 2017, 10 pages.
Final Office Action received for U.S. Appl. No. 14/871,654, dated Nov. 16, 2017, 32 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Jul. 2, 2015, 7 pages.
Final Office Action received for U.S. Appl. No. 14/719,217, dated Feb. 23, 2017, 37 pages.
Final Office Action received for U.S. Appl. No. 14/836,754, dated Jun. 14, 2017, 23 pages.
Final Office Action received for U.S. Appl. No. 14/839,897, dated Jan. 10, 2018, 16 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/869,831, dated Aug. 2, 2016, 14 pages.
Final Office Action received for U.S. Appl. No. 14/869,831, dated May 19, 2017, 20 pages.

(56) References Cited

OTHER PUBLICATIONS

Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 14/871,635, dated Jan. 18, 2018, 33 pages.
Final Office Action received for U.S. Appl. No. 15/137,944, dated Feb. 27, 2017, 10 pages.
Final Office Action received for U.S. Appl. No. 14/836,754, dated Mar. 31, 2017, 24 pages.
Final Office Action received for U.S. Appl. No. 14/870,694, dated Apr. 7, 2017, 16 pages.
Intention to Grant received for Danish Patent Application No. PA201570665, dated Feb. 28, 2017 2 pages.
Intention to Grant received for Danish Patent Application No. PA201570773, dated Mar. 9, 2018, 2 pages.
Intention to Grant received for Danish Patent Application No. PA201670042, dated Jan. 29, 2018, 2 pages.
Intention to Grant received for European Patent Application No. 15724160.5, dated Mar. 7, 2018, 8 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2015/047507, dated Mar. 16, 2017, 16 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/016621, dated Aug. 24, 2017, 8 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/034175, dated Dec. 14, 2017, 14 pages.
International Search Report and Written Opinion received for PCT Application No. PCT/US2015/033326, dated Aug. 10, 2015, 13 pages.
International Search Report and Written Opinion received for PCT Application No. PCT/US2015/033380, dated Aug. 10, 2015, 13 pages.
International Search Report and Written Opinion received for PCT Application No. PCT/US2016/016621, dated May 9, 2016, 12 pages.
International Search Report and Written Opinion received for PCT Application No. PCT/US2016/033751, dated Oct. 5, 2016, 14 pages.
International Search Report and Written Opinion received for PCT Application No. PCT/US2016/034175, dated Oct. 7, 2016, 17 pages.
International Search Report and Written Opinion received for PCT Application No. PCT/US2017/031748, dated Aug. 29, 2017, 14 pages.
International Search Report and Written Opinion received for PCT Application No. PCT/US2016/015316, dated Mar. 8, 2016, 13 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2016/033751, dated Jul. 22, 2016, 2 pages.
Invitation to Pay Additional Fee received for PCT Patent Application No. PCT/US2016/034175, dated Aug. 11, 2016, 3 pages.
"iOS Security", White Paper, Available online at <https://web.archive.org/web/20150526223200/http://www.apple.com/business/docs/iOS_Security_Guide.pdf> Apr. 2015, 55 pages.
Non-Final Office Action received for U.S. Appl. No. 14/503,327, dated Sep. 12, 2016, 10 pages.
Non-Final Office Action received for U.S. Appl. No. 14/869,715, dated Jan. 29, 2016, 62 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/870,793, dated Apr. 19, 2016, 17 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/719,217, dated Jul. 28, 2016, 28 pages.
Non-Final Office Action received for U.S. Appl. No. 14/836,754, dated Aug. 16, 2017, 25 pages.
Non-Final Office Action received for U.S. Appl. No. 14/836,754, dated Oct. 21, 2016, 18 pages.
Non-Final Office Action received for U.S. Appl. No. 14/839,897, dated May 18, 2017, 11 pages.
Non-Final Office Action received for U.S. Appl. No. 14/839,903, dated Feb. 26, 2018, 10 pages.
Non-Final Office Action received for U.S. Appl. No. 14/839,913, dated Jul. 28, 2016, 12 pages.
Non-Final Office Action received for U.S. Appl. No. 14/864,011, dated Jun. 10, 2016, 10 pages.
Non-Final Office Action received for U.S. Appl. No. 14/869,715, dated Oct. 11, 2016, 37 pages.
Non-Final Office Action received for U.S. Appl. No. 14/870,726, dated Sep. 16, 2016, 12 pages.
Non-Final Office Action received for U.S. Appl. No. 14/871,635, dated May 5, 2017, 23 pages.
Non-Final Office Action received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.

(56) References Cited

OTHER PUBLICATIONS

Non-Final Office Action received for U.S. Appl. No. 15/294,439, dated Jan. 26, 2018, 18 pages.
Non-Final Office Action received for U.S. Appl. No. 15/433,238, dated Nov. 3, 2017, 6 pages.
Non-Final Office Action received for U.S. Appl. No. 14/870,694, dated Sep. 23, 2016, 13 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Allowance received for Chinese Patent Application No. 201520357381.9, dated Jul. 29, 2015, 4 pages (2 pages of English Translation and 2 pages of Official copy).
Notice of Allowance received for Chinese Patent Application No. 201520358683.8, dated Mar. 10, 2016, 5 pages (3 pages of English Translation and 2 pages of Official copy).
Notice of Allowance received for Chinese Patent Application No. 201620480708.6, dated Apr. 20, 2017, 3 pages (2 pages of English Translation and 1 page of Official copy).
Notice of Allowance received for Chinese Patent Application No. 201620480846.4, dated Apr. 20, 2017, 3 pages (2 pages of English Translation and 1 page of Official copy).
Notice of Allowance received for Danish Patent Application No. PA201570771, dated Sep. 2, 2016, 2 pages.
Notice of Allowance received for Japanese Patent Application No. 2016-224508, dated Jun. 20, 2017, 3 pages (Official copy only).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official copy).
Notice of Allowance received for Taiwanese Patent Application No. 104114953, dated Oct. 17, 2017, 3 pages (Official copy only).
Notice of Allowance received for Taiwanese Patent Application No. 104128700, dated Mar. 27, 2017, 3 pages (Official copy only).
Notice of Allowance received for Taiwanese Patent Application No. 104133756, dated Nov. 30, 2017, 5 pages (2 pages of English Translation and 3 pages of Official copy).
Notice of Allowance received for Taiwanese Patent Application No. 104133757, dated Jan. 18, 2017, 3 pages (Official copy only).
Notice of Allowance received for the U.S. Appl. No. 14/503,381, dated Dec. 16, 2015, 8 pages.
Notice of Allowance received for U.S. Appl. No. 14/503,072, dated Mar. 26, 2018, 6 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/503,364, dated Jun. 16, 2016, 11 pages.
Notice of Allowance received for U.S. Appl. No. 14/836,754, dated May 10, 2018, 27 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 14/869,715, dated Dec. 19, 2017, 32 pages.
Notice of Allowance received for U.S. Appl. No. 15/137,944, dated Dec. 21, 2017, 8 pages.
Office Action received for Australian Patent Application No. 2017100558, dated Feb. 27, 2018, 3 pages.

Office Action received for European Patent Application No. 15728352.4, dated Jan. 25, 2018, 10 pages.
Office Action received for Japanese Patent Application No. 2016-224507, dated Dec. 1, 2017, 14 pages (7 pages of English Translation and 7 pages of Official copy).
Office Action received for Australan Patent Application No. 2015100708, dated Sep. 8, 2015, 4 pages.
Office Action received for Australian Patent Application No. 2015100709, dated Sep. 9, 2015 (examination Report 1), 4 pages.
Office Action received for Australian Patent Application No. 2015100709, dated Sep. 9, 2015 (examination Report 2), 4 pages.
Office Action received for Australian Patent Application No. 2015286650, dated Apr. 10, 2017, 4 pages.
Office Action received for Australian Patent Application No. 2015266693, dated Apr. 10, 2017, 4 pages.
Office Action received for Australian Patent Application No. 2015302298, dated Apr. 4, 2018, 3 pages.
Office Action received for Australian Patent Application No. 2015302298, dated Sep. 14, 2017, 3 pages.
Office Action received for Australian Patent Application No. 2015385757, dated Sep. 11, 2017, 3 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100326, dated May 16, 2017, 3 pages.
Office Action received for Australian Patent Application No. 2017100328, dated Oct. 16, 2017, 6 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018200485, dated Mar. 15, 2018, 3 pages.
Office Action received for Chinese Patent Application No. 201520358683.8, dated Sep. 2, 2015, 4 pages (2 pages of English Translation and 2 pages of Official copy).
Office Action received for Chinese Patent Application No. 201620101636.x, dated May 25, 2016, 3 pages (1 page of English Translation and 2 pages of Official copy).

(56) References Cited

OTHER PUBLICATIONS

Office Action received for Chinese Patent Application No. 201620101636.x, dated Oct. 13, 2016, 3 pages (1 page of English Translation and 2 pages of Official copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official copy only).
Office Action received for Chinese Patent Application No. 201620480708.6, dated Jan. 9, 2017, 3 pages (1 page of English Translation and 2 pages of Official copy).
Office Action received for Chinese Patent Application No. 201620480708.6, dated Sep. 14, 2016, 3 pages (1 page of English Translation and 2 pages of Official copy).
Office Action received for Chinese Patent Application No. 201620480846.4, dated Jan. 9, 2017, 3 pages (1 page of English Translation and 2 pages of Official copy).
Office Action received for Chinese Patent Application No. 201620480846.4, dated Sep. 14, 2016, 3 pages (1 page of English Translation and 2 pages of Official copy).
Office Action received for Chinese Patent Application No. 201620509362.8, dated Feb. 10, 2017, 2 pages (Official copy only).
Office Action received for Chinese Patent Application No. 201620509362.8, dated Oct. 21, 2016, 3 pages (1 page of English Translation and 2 pages of Official copy ).
Office Action received for Chinese Patent Application No. 201620509515.9, dated Nov. 9, 2016, 2 pages (1 page of English Translation and 1 page of Official copy).
Office Action received for Danish Patent Application No. PA201570709, dated Jul. 21, 2017, 4 pages.
Office Action received for Danish Patent Application No. PA201670709, dated Nov. 30, 2016, 10 pages.
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570665, dated Sep. 5, 2016, 3 pages.
Office Action received for Danish Patent Application No. PA201570771, dated Jun. 13, 2016, 3 pages.
Office Action received for Danish Patent Application No. PA201570773, dated Feb. 15, 2017, 3 pages.
Office Action received for Danish Patent Application No. PA201570773, dated Sep. 12, 2016, 3 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770292, dated Jun. 6, 2017, 7 pages.
Office Action received for Danish Patent Application No. PA201770292, dated Sep. 6, 2017, 4 pages.
Office Action received for European Patent Application No. 15727291.5, dated Jan. 15, 2018, 8 pages.
Office Action received for European Patent Application No. 16201195.1, dated Feb. 14, 2018, 12 pages.
Office Action received for European Patent Application No. 16201205.8, dated Feb. 16, 2018, 12 pages.
Office Action received for German Patent Application No. 202015004267.8, dated Nov. 4, 2015, 4 pages (3 pages of English Translation and 1 pages of Official copy).
Office Action received for Japanese Patent Application No. 2016-224507, dated Jun. 16, 2017, 16 pages (8 pages of English Translation and 8 pages of Official copy).
Office Action received for Japanese Patent Application No. 2016-558332, dated Dec. 8, 2017, 12 pages (6 pages of English Translation and 6 pages of Official copy).
Office Action received for Japanese Patent Application No. 2016-569665, dated Jan. 19, 2018, 10 pages (5 pages of English Translation and 5 pages of Official copy).
Office Action received for Japanese Patent Application No. 2017-540616, dated Jan. 12, 2018, 24 pages (13 pages of English Translation and 11 pages of Official copy).
Office Action received for Japanese Patent Application No. 2017-545733, dated Feb. 13, 2018, 7 pages (3 pages of English Translation and 4 pages of Official copy).
Office Action received for Korean Patent Application No. 10-2017-0022365, dated Jun. 26, 2017, 10 pages (4 pages of English Translation and 6 pages of Official copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2018-7001854, dated Apr. 2, 2018, 13 pages (6 pages of English Translation and 7 pages of Official copy).
Office Action received for Taiwanese Patent Application No. 104114953, dated Feb. 18, 2017, 9 pages(4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action received for Taiwanese Patent Application No. 104117508, dated Jul. 14, 2017, 9 pages (4 pages of English Translation and 5 pages of Official copy).
Office Action received for Taiwanese Patent Application No. 104117508, dated Jul. 20, 2016, 19 pages (8 pages of English Translation and 11 pages of Official copy).
Office Action received for Taiwanese Patent Application No. 104117508, dated Mar. 20, 2017, 22 pages (9 pages of English Translation and 13 pages of Official copy).
Office Action received for Taiwanese Patent Application No. 104128689, dated Aug. 21, 2017, 8 pages (3 pages of English Translation and 5 pages of Official copy).
Office Action received for Taiwanese Patent Application No. 104128689, dated Nov. 14, 2016, 12 pages (5 pages of English Translation and 7 pages of Official copy).
Office Action received for Taiwanese Patent Application No. 104128700, dated Aug. 31, 2016, 13 pages (6 pages of English Translation and 7 pages of Official copy).

(56) References Cited

OTHER PUBLICATIONS

Office Action received for Taiwanese Patent Application No. 104133756, dated May 17, 2017, 13 pages (6 pages of English Translation and 7 pages of Official copy).
Office Action received for Taiwanese Patent Application No. 104133757, dated Jul. 6, 2016, 22 pages (9 pages of English Translation and 13 pages of Official copy).
"Real Solution of Two-step-authentication Password Management for Authentication Enhancement",Fukuda Takao, Nikkei PC, JPN, Nikkei Business Publications, Inc, No. 694. Mar. 24, 2014, 11 pages (3 pages of English Translation and 8 pages of Official copy).
Final Office Action received for U.S. Appl. No. 14/836,754, dated Mar. 22, 2016, 17 pages.
Non-Final Office Action received for U.S. Appl. No. 14/836,754, dated Nov. 17, 2015, 15 pages.
Non-Final Office Action received for U.S. Appl. No. 14/839,913, dated Mar. 2, 2016, 11 pages.
Non-Final Office Action received for U.S. Appl. No. 14/864,011, dated Jan. 21, 2016, 10 pages.
Office Action received for Australian Patent Application No. 2016100155, dated May 4, 2016, 7 pages.
Cazlar, "[ios] Mapsgps (formerly Pebbgps) is Now Available—Now with Colour Turn-by-turn Directions!", Online Available at <https://forums.pebble.com/t/ios-mapsgps-formerly-pebbgps-is-now-available-now-with-colour-turn-by-turn-directions/5584>, 2013, 31 pages.
EasyVideoGuides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4L, Dec. 2, 2012, 1 page.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Kamijo, Noboru, "Next Generation Mobile System—Watchpad1.5", Available at <http://researcher.ibm.com/researcher/view_group_subpage.php?id=5617>, retrieved on Jul. 4, 2015, 2 pages.
Naver Blog, "How to Use Smart Wallet and Registered Card", Online Available at <http://feena74.blog.me/140185758401>, Mar. 29, 2013, 20 pages.
Npasqua, "Maps: Ability to Swipe Step by Step in Turn-by-turn Mode", 2012, Apple Support Communities, https://discussions.apple.com/thread/4424256?start=0&tstart=0, Oct. 12, 2012, 4 pages.
Oates, Nathan, "Pebbgps", Available online at:—https://pebble.devpost.com/submissions/21694-pebbgps, Mar. 16, 2014, 2 pages.
Office Action received for Danish Patent Application No. PA201570664, dated Mar. 15, 2016, 10 pages.
Office Action received for Danish Patent Application No. PA201570665, dated Mar. 31, 2016, 9 pages.
Office Action received for Danish Patent Application No. PA201570771, dated Mar. 17, 2016, 8 pages.
Office Action received for Danish Patent Application No. PA201570773, dated Mar. 18, 2016, 9 pages.
Office Action received for Danish Patent Application No. PA201670074, dated Apr. 7, 2016, 8 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/046892, dated Jan. 27, 2016, 20 pages.
Invitation to Pay Additional Fees and Partial Search Report received for PCT Patent Application No. PCT/US2015/046892, mailed on Nov. 4, 2015, 5 pages.
International Search Report and Written Opinion received for PCT Application No. PCT/US2015/047507, dated Feb. 22, 2016, 22 pages.
Invitation to Pay Additional Fees received for PCT Patent Application No. PCT/US2015/047507, dated Jan. 4, 2016, 8 pages.
International Search Report and Written Opinion received for PCT Patent Application No. PCT/US2015/055165, dated Apr. 20, 2016, 22 pages.
Invitation to Pay Additional Fees received for PCT Patent Application No. PCT/US2015/055165, dated Jan. 18, 2016, 6 pages.
The Gadget Pill, "Sygic for Android Navigation with Hud", Available online at:—https://www.youtube.com/watch?v=fGqrycRevGU, Mar. 23, 2014, 1 page.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Brief Communication Regarding Oral Proceedings received for European Patent Application No. 15727291.5, dated Jun. 9, 2020, 12 pages.
Minutes of the Oral Proceedings received for European Patent Application No. 15728352.4, dated May 27, 2020, 3 pages.
Notice of Allowance received for Chinese Patent Application No. 201610371774.4, dated Jun. 4, 2020, 2 pages (1 page of English Translation and 1 page of Official Copy).
Office Action received for Australian Patent Application No. 2017277971, dated Jun. 3, 2020, 3 pages.
Non-Final Office Action received for U.S. Appl. No. 16/358,453, dated Mar. 19, 2020, 15 pages.
Notice of Allowance received for Korean Patent Application No. 10-2017-0022582, dated Feb. 27, 2020, 5 pages (2 pages of English Translation and 3 pages of Official Copy).
Decision on Appeal received for Korean Patent Application No. 10-2016-0152210, dated Jun. 23, 2020, 20 pages (2 pages of English Translation and 18 pages of Official Copy).
Decision to Refuse received for European Patent Application No. 15727291.5, dated Jun. 30, 2020, 21 pages.
Decision to Refuse received for European Patent Application No. 16201205.8, dated Jun. 30, 2020, 29 pages.
European Search Report received for European Patent Application No. 20180033.1, dated Jul. 6, 2020, 4 pages.
Examiner's Answer to Appeal Brief received for U.S. Appl. No. 14/869,877, dated Jun. 26, 2020, 14 pages.
Minutes of the Oral Proceedings received for European Patent Application No. 15727291.5, mailed on Jun. 29, 2020, 8 pages.
Minutes of the Oral Proceedings received for European Patent Application No. 16201205.8, mailed on Jun. 29, 2020, 6 pages.
Office Action received for Chinese Patent Application No. 201811330077.X, dated May 18, 2020, 9 pages (3 pages of English Translation and 6 pages of Official Copy).
Certification of Examination received for Australian Patent Application No. 2018100158 dated Oct. 23, 2018, 2 pages.
Final Office Action received for U.S. Appl. No. 13/076,411 dated Nov. 8, 2018, 10 pages.
Notice of Allowance received for Taiwanese Patent Application No. 104128689 dated Aug. 28, 2018, 5 pages (2 pages of English Translation and 3 pages of Official copy).
Applicant-Initiated Interview Summary received for U.S. Appl. No. 16/667,271, dated Apr. 8, 2020, 3 pages.
Decision to Refuse Application received for the European Patent Application No. 16803996.4, dated Apr. 3, 2020, 25 pages.
Non-Final Office Action received for U.S. Appl. No. 16/267,817, dated Apr. 15, 2020, 25 pages.
Notice of Allowance received for Korean Patent Application No. 10-2019-7005262, dated Mar. 25, 2020, 5 pages (2 pages of English Translation and 3 pages of Official Copy).
Notice of Allowance received for Korean Patent Application No. 10-2020-7004737, dated Mar. 31, 2020, 4 pages (1 page of English Translation and 3 pages of Official Copy).
Notice of Allowance received for U.S. Appl. No. 16/164,561, dated Apr. 8, 2020, 5 pages.
Corrected Notice of Allowance received for U.S. Appl. No. 15/866,341, dated Aug. 26, 2019, 3 pages.
Final Office Action received for U.S. Appl. No. 16/164,561, dated Sep. 5, 2019, 12 pages.

(56) References Cited

OTHER PUBLICATIONS

Notice of Allowance received for U.S. Appl. No. 14/503,296, dated Aug. 28, 2019, 12 pages.
Office Action received for Chinese Patent Application No. 201710094150.7, dated Jul. 31, 2019, 6 pages. (2 pages of English Translation and 4 pages of Official Copy).
Office Action received for Chinese Patent Application No. 201810094316.X, dated Aug. 5, 2019, 9 pages (3 pages of English Translation and 6 pages of Official Copy).
Office Action received for European Patent Application No. 17810749.6, dated Aug. 20, 2019, 9 pages.
Notice of Allowance received for Korean Patent Application No. 10-2016-7014051, dated Nov. 27, 2018, 4 pages (1 page of English Translation and 3 pages of Official Copy).
Office Action received for Australian Patent Application No. 2016270323, dated Nov. 26, 2018, 4 pages.
Office Action received for Australian Patent Application No. 2016270775, dated Nov. 26, 2018, 5 pages.
Office Action received for Chinese Patent Application No. 201380080659.6, dated Oct. 26, 2018, 11 pages (3 pages of English Translation and 8 pages of Official Copy).
Office Action received for Chinese Patent Application No. 201810094316.X, dated Oct. 29, 2018, 12 pages (5 pages of English Translation and 7 pages of Official Copy).
Office Action received for European Patent Application No. 16803996.4, dated Nov. 29, 2018, 12 pages.
Summons to Attend Oral Proceedings received for European Patent Application No. 18154163.2, mailed on Nov. 29, 2018, 9 pages.
Advisory Action received for U.S. Appl. No. 13/076,411, dated Mar. 10, 2014, 6 pages.
Examiner's Answer to Appeal Brief received for U.S. Appl. No. 14/870,793, mailed on Apr. 16, 2018, 15 pages.
Final Office Action received for U.S. Appl. No. 14/503,296, dated Jun. 4, 2018, 8 pages.
Final Office Action received for U.S. Appl. No. 14/869,877, dated Apr. 26, 2018, 18 pages.
International Preliminary Report on Patentability Received for PCT Patent Application No. PCT/US2016/044990, dated Feb. 15, 2018, 8 pages.
International Search Report and Written Opinion for PCT Patent Application No. PCT/US2016/044990, dated Nov. 23, 2016, 11 pages.
International Search Report and Written Opinion received for PCT Patent Application No. PCT/US2017/035554, dated Sep. 22, 2017, 42 pages.
Invitation to Pay Additional Fees received for PCT Patent Application No. PCT/US2016/044990, dated Sep. 29, 2016, 3 pages.
Invitation to Pay Additional Fees received for PCT Patent Application No. PCT/US2017/035554, dated Jul. 20, 2017, 2 pages.
"Mugs", Online Available at: https://web.archive.org/web/20151029034349/http://le-mugs.com/, Oct. 29, 2015.
Non-Final Office Action received for U.S. Appl. No. 13/076,411, dated Mar. 21, 2018, 10 pages.
Non-Final Office Action received for U.S. Appl. No. 15/033,551, dated May 24, 2018, 26 pages.
Non-Final Office Action received for U.S. Appl. No. 15/057,835, dated Jan. 3, 2018, 8 pages.
Notice of Acceptance received for Australian Patent Application No. 2013404001, dated Nov. 21, 2017, 3 pages.
Notice of Allowance received for Japanese Patent Application No. 2016-527367, dated Jul. 30, 2018, 4 pages (1 page of English Translation and 3 pages of Official copy).
Notice of Allowance received for Japanese Patent Application No. 2018-008937, dated Jul. 2, 2018, 4 pages (1 page of English Translation and 3 pages of Official copy).
Notice of Allowance received for Korean Patent Application No. 10-2018-7001854, dated Aug. 21, 2018, 4 pages (1 page of English Translation and 3 pages of Official copy).
Notice of Allowance received for U.S. Appl. No. 13/076,414, dated May 4, 2016, 7 pages.
Notice of Allowance received for U.S. Appl. No. 14/503,072, dated Jun. 4, 2018, 6 pages.
Notice of Allowance received for U.S. Appl. No. 14/871,654, dated May 22, 2018, 22 pages.
Office Action received for European Patent Application No. 13795330.3, dated Oct. 9, 2017, 8 pages.
Office Action received for Australian Patent Application No. 2013404001, dated Aug. 3, 2017, 5 pages.
Office Action received for Australian Patent Application No. 2013404001, dated Nov. 26, 2016, 3 pages.
Office Action received for Australian Patent Application No. 2017100667, dated Aug. 3, 2017, 9 pages.
Office Action received for Australian Patent Application No. 2018100158, dated Apr. 23, 2018, 5 pages.
Office Action received for Chinese Patent Application No. 201380080659.6, dated Apr. 4, 2018, 15 pages (5 pages of English Translation and 10 pages of Official copy).
Office Action received for Chinese Patent Application No. 201510284896.5, dated Jun. 28, 2018, 15 pages (4 pages of English Translation and 11 pages of Official copy).
Office Action received for Danish Patent Application No. PA201770423, dated Jun. 12, 2018, 7 pages.
Office Action received for European Patent Application No. 18154163.2, dated Apr. 11, 2018, 6 pages.
Office Action received for Japanese Patent Application No. 2016-527367, dated Feb. 26, 2018, 15 pages (8 pages of English Translation and 7 pages of Official copy).
Office Action received for Japanese Patent Application No. 2016-527367, dated Jul. 7, 2017, 16 pages (8 pages of English Translation and 8 pages of Official copy).
Office Action received for Japanese Patent Application No. 2016-558332, dated Jul. 27, 2018, 9 pages (4 pages of English Translation and 5 pages of Official copy).
Office Action received for Korean Patent Application No. 10-2016-0152210, dated May 14, 2018, 13 pages (6 pages of English Translation and 7 pages of Official copy).
Office Action received for Korean Patent Application No. 10-2016-7014051, dated Apr. 30, 2018, 14 pages (7 pages of English Translation and 7 pages of Official copy).
Office Action received for Korean Patent Application No. 1020167014051, dated Jun. 20, 2017, 16 pages (8 pages of English Translation and 8 pages of Official copy).
Search Report and Opinion received for Danish Patent Application No. PA201770423, dated Oct. 4, 2017, 10 pages.
Summons to Attend Oral Proceedings received for European Patent Application No. 16201195.1, mailed on Sep. 4, 2018, 21 pages.
Non-Final Office Action received for U.S. Appl. No. 13/076,407, dated Dec. 5, 2013, 16 pages.
Notice of Allowance received for U.S. Appl. No. 13/076,407, dated May 20, 2014, 9 pages.
Final Office Action received in U.S. Appl. No. 13/076,411, dated Nov. 15, 2013, 11 pages.
Non-Final Office Action received for U.S. Appl. No. 13/076,411, dated Jun. 13, 2013, 9 pages.
Final Office Action received for U.S. Appl. No. 13/076,414, dated Feb. 19, 2014, 10 pages.
Non-Final Office Action received for U.S. Appl. No. 13/076,414, dated Aug. 21, 2013, 8 pages.
Notice of Allowance received for U.S. Appl. No. 13/076,414, dated Aug. 26, 2015, 7 pages.
Notice of Allowance received for U.S. Appl. No. 14/870,726, dated Sep. 11, 2018, 9 pages.
Notice of Allowance received for U.S. Appl. No. 15/294,439, dated Sep. 10, 2018, 9 pages.
Codrington, Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
International Preliminary Report on Patentability received for PCT Patent Application No. PCT/US2013/067634, dated May 12, 2016, 9 pages.

(56) References Cited

OTHER PUBLICATIONS

International Search Report and Written Opinion received for PCT Patent Application No. PCT/US2013/067634, dated Apr. 16, 2014, 11 pages.
Razykdreviews, "In Depth Review of Apple Watch Activity and Workout App", Online Available at: URL: https://www.youtube.com/watch?v=GkKI3qIK0ow, May 11, 2015, 1 page.
Rizknows, "Garmin Connect Mobile App—Review #2", Online Available at: https://www.youtube.com/watch?v=7my3wMpeRbE, Oct. 22, 2015, 1 page.
Non-Final Office Action received for U.S. Appl. No. 16/667,271, dated Dec. 13, 2019, 8 pages.
Office Action received for Australian Patent Application No. 2016270775, dated Nov. 26, 2019, 3 pages.
Office Action received for Chinese Patent Application No. 201610371774.4, dated Dec. 2, 2019, 6 pages (3 pages of English Translation and 3 pages of Official Copy).
Office Action received for Chinese Patent Application No. 201811330077.X, dated Nov. 13, 2019, 14 pages (6 pages of English Translation and 8 pages of Official Copy).
Office Action received for Japanese Patent Application No. 2018-121118, dated Nov. 18, 2019, 10 pages (5 pages of English Translation and 5 pages of Official Copy).
Decision to Refuse received for European Patent Application No. 18154163.2, dated May 17, 2019, 22 pages.
Final Office Action Received for U.S. Appl. No. 14/871,635, dated May 3, 2019, 32 pages.
Final Office Action received for U.S. Appl. No. 15/866,341, dated May 14, 2019, 10 pages.
Minutes of the Oral Proceedings received for European Patent Application No. 18154163.2, mailed on May 17, 2019, 7 pages.
Office Action received for European Patent Application No. 16804040.0, dated May 13, 2019, 12 pages.
Office Action received for Korean Patent Application No. 10-2019-7005262, dated May 3, 2019, 5 pages (2 pages of English Translation and 3 pages of Official Copy).
Preliminary Opinion before oral proceedings received for European Patent Application No. 18154163.2, mailed on Apr. 16, 2019, 12 pages.
Notice of Allowance received for Japanese Patent Application No. 2016-558332, dated Jan. 11, 2019, 4 pages (1 page of English Translation and 3 pages of Official Copy).
Office Action received for Australian Patent Application No. 2018202559, dated Jan. 16, 2019, 6 pages.
Office Action received for Chinese Patent Application No. 201610371774.4, dated Dec. 19, 2018, 13 pages (5 pages of English Translation and 8 pages of Official copy).
Office Action received for Chinese Patent Application No. 201610371856.9, dated Dec. 19, 2018, 12 pages (5 pages of English Translation and 7 pages of Official Copy).
Office Action received for Korean Patent Application No. 10-2017-7034558, dated Dec. 15, 2018, 15 pages (7 pages of English Translation and 8 pages of Official Copy).
Decision to Refuse Application received for the European Patent Application No. 16803996.4, dated Apr. 14, 2020, 28 pages.
Office Action received for Australian Patent Application No. 2020200685, dated Apr. 20, 2020, 3 pages.
Office Action received for Chinese Patent Application No. 201710439448.7, dated Mar. 27, 2020, 13 pages (7 pages of English Translation and 6 pages of Official Copy).
Final Office Action received for U.S. Appl. No. 15/057,835, dated Sep. 21, 2018, 9 pages.
Non-Final Office Action received for U.S. Appl. No. 14/503,296, dated Sep. 18, 2018, 20 pages.
Office Action received for Japanese Patent Application No. 2016-569665, dated Aug. 20, 2018, 9 pages (4 pages of English Translation and 5 pages of Official Copy).
Final Office Action received for U.S. Appl. No. 14/869,877, dated Jun. 11, 2019, 35 pages.

Notice of Allowance received for Korean Patent Application No. 10-2017-7034677, dated May 27, 2019, 5 pages (2 pages of English Translation and 3 pages of Official Copy).
Office Action received for Australian Patent Application No. 2016270323, dated May 29, 2019, 4 pages.
Office Action received for Australian Patent Application No. 2016270775, dated May 29, 2019, 3 pages.
Office Action received for Chinese Patent Application No. 201810094316.X, dated Apr. 28, 2019, 9 pages (3 pages of English Translation and 6 pages of Official Copy).
Notice of Allowance received for Chinese Patent Application No. 201710093861.2, dated Sep. 24, 2019, 4 pages (1 page of English Translation and 3 pages of Official Copy).
Notice of Allowance received for Japanese Patent Application No. 2017-562330, dated Sep. 20, 2019, 4 pages (1 page of English Translation and 3 pages of Official Copy).
Notice of Allowance received for Taiwanese Patent Application No. 104117508, dates Sep. 18, 2019, 5 pages (2 pages of English Translation and 3 pages of Official Copy).
Office Action received for Chinese Patent Application No. 201510284896.5, dated Sep. 3, 2019, 9 pages (2 pages of English Translation and 7 pages of Official Copy).
Office Action received for Korean Patent Application No. 10-2017-7034558, dated Sep. 25, 2019, 9 pages (4 pages of English Translation and 5 pages of Official Copy).
Summons to Attend Oral Proceedings received for European Patent Application No. 16803996.4, dated Oct. 2, 2019, 16 pages.
Applicant Initiated Interview Summary received for U.S. Appl. No. 15/713,551, dated Nov. 5, 2019, 3 pages.
Notice of Acceptance received for Australian Patent Application No. 2018202559, dated Oct. 21, 2019, 3 pages.
Office Action received for Indian Patent Application No. 201617039493, dated Oct. 21, 2019, 6 pages.
Office Action received for Japanese Patent Application No. 2017-562050, dated Sep. 30, 2019, 5 pages (2 pages of English Translation and 3 pages of Official Copy).
Office Action received for Australian Patent Application No. 2020200685, dated Feb. 10, 2020, 4 pages.
Result of Consultation received for European Patent Application No. 16803996.4, dated Feb. 17, 2020, 14 pages.
Non-Final Office Action received for U.S. Appl. No. 15/713,551 dated Mar. 21, 2019, 18 pages.
Notice of Allowance received for Japanese Patent Application No. 2016-224507, dated Mar. 26, 2019, 3 pages (1 page of English Translation and 2 pages of Official Copy).
Notice of Allowance received for U.S. Appl. No. 13/076,411, dated Apr. 8, 2019, 13 pages.
Office Action received for Australian Patent Application No. 2018200485, dated Mar. 15, 2019, 4 pages.
Office Action received for Chinese Patent Application No. 201380080659.6, dated Mar. 4, 2019, 9 pages (5 pages of English Translation and 4 pages of Official Copy).
Office Action received for Chinese Patent Application No. 201510284896.5, dated Mar. 6, 2019, 13 pages (4 pages of English Translation and 9 pages of Official Copy).
Office Action received for Chinese Patent Application No. 201710093861.2, dated Mar. 5, 2019, 6 pages (3 pages of English Translation and 3 pages of Official Copy).
Office Action received for Danish Patent Application No. PA201770423, dated Mar. 29, 2019, 6 pages.
Supplemental Notice of Allowance received for U.S. Appl. No. 15/616,480, dated Mar. 28, 2019, 2 pages.
Final Office Action received for U.S. Appl. No. 14/503,296, dated Apr. 24, 2019, 5 pages.
Office Action received for Australian Patent Application No. 2018202559, dated Apr. 8, 2019, 4 pages.
Partial Supplementary European Search Report received for European Patent Application No. 17810749.6, dated Apr. 25, 2019, 8 pages.
Office Action received for Korean Patent Application No. 10-2016-0152210, dated Jan. 29, 2019, 7 pages (3 pages of English Translation and 4 pages of Official Copy).

(56) References Cited

OTHER PUBLICATIONS

Advisory Action received for U.S. Appl. No. 16/164,561, dated Nov. 14, 2019, 2 pages.
Notice of Allowance received for Korean Patent Application No. 10-2019-7025322, dated Nov. 20, 2019, 5 pages (2 pages of English Translation and 3 pages of Official Copy).
Notice of Allowance received for U.S. Appl. No. 14/871,635, dated Nov. 14, 2019, 14 pages.
Summons to Attend Oral Proceedings received for European Patent Application No. 15728352.4, mailed on Nov. 18, 2019, 15 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Non Final Office Action received for U.S. Appl. No. 14/869,877, dated Oct. 5, 2018, 19 pages.
Office Action received for Chinese Patent Application No. 201710093861.2, dated Sep. 14, 2018, 15 pages (6 pages of English Translation and 9 pages of Official copy).
Office Action received for Korean Patent Application No. 10-2017-0022582, dated Sep. 19, 2018, 6 pages (2 pages of English Translation and 4 pages of Official Copy).
Summons to Attend Oral Proceedings received for European Patent Application No. 13795330.3, dated Oct. 19, 2018, 13 pages.
Office Action received for Korean Patent Application No. 10-2020-0097418, dated Aug. 28, 2020, 6 pages (2 pages of English Translation and 4 pages of Official Copy).
Non-Final Office Action received for U.S. Appl. No. 15/992,722, dated Aug. 6, 2020, 7 pages.
Office Action received for Australian Patent Application No. 2020200685, dated Aug. 12, 2020, 3 pages.
Summons to Attend Oral Proceedings received for European Patent Application No. 17810749.6, mailed on Aug. 12, 2020, 11 pages.
Applicant Initiated Interview Summary received for U.S. Appl. No. 16/358,453, dated Jul. 28, 2020, 5 pages.
Applicant-Initiated Interview Summary received for U.S. Appl. No. 16/267,817, dated Jul. 14, 2020, 5 pages.
Examiner's Pre-Review Report received for Japanese Patent Application No. 2018-121118, dated Jun. 2, 2020, 4 pages (2 pages of English Translation and 2 pages of Official Copy).
Office Action received for European Patent Application No. 20180033.1, dated Jul. 17, 2020, 7 pages.
Office Action received for Japanese Patent Application No. 2020-028315, dated Jul. 6, 2020, 18 pages (10 pages of English Translation and 8 pages of Official Copy).

Final Office Action received for U.S. Appl. No. 16/267,817, dated Aug. 24, 2020, 23 pages.
Notice of Allowance received for U.S. Appl. No. 15/713,551, dated Aug. 27, 2020, 12 pages.
Office Action received for Australian Patent Application No. 2017277971, dated Aug. 12, 2020, 3 pages.
Decision on Appeal received for U.S. Appl. No. 14/870,793, dated Nov. 3, 2020, 11 pages.
Decision to Refuse received for European Patent Application No. 16804040.0, dated Nov. 4, 2020, 18 pages.
Final Office Action received for U.S. Appl. No. 16/358,453, dated Nov. 16, 2020, 16 pages.
International Search Report and Written Opinion received for PCT Patent Application No. PCT/US2020/031528, dated Sep. 23, 2020, 18 pages.
Invitation to Pay Additional Fees received for PCT Patent Application No. PCT/US2020/031528, dated Jul. 30, 2020, 11 pages.
Minutes of the Oral Proceedings received for European Patent Application No. 16804040.0, dated Nov. 2, 2020, 6 pages.
Non-Final Office Action received for U.S. Appl. No. 16/533,540, dated Oct. 23, 2020, 34 pages.
Notice of Acceptance received for Australian Patent Application No. 2020200685, dated Oct. 29, 2020, 3 pages.
Record of Oral Hearing received for U.S. Appl. No. 14/870,793, dated Nov. 3, 2020, 24 pages.
Applicant-Initiated Interview Summary received for U.S. Appl. No. 16/377,892, dated Oct. 13, 2020, 5 pages.
Applicant-Initiated Interview Summary received for U.S. Appl. No. 16/378,136, dated Oct. 13, 2020, 4 pages.
Bao et al., "Location-based and Preference-Aware Recommendation Using Sparse Geo-Social Networking Data", ACM SIGSPATIAL GIS Redondo Beach, CA, Online available at : https://www.microsoft.com/en-us/research/wp-content/uploads/2016/02/LocationRecommendation.pdf, Nov. 6-9, 2012, 10 pages.
Lu Haiyun, "Recommendations Based on Purchase Patterns", International Journal of. Machine Learning and Computing, vol. 4, No. 6, Online available at: http://www.ijmlc.org/papers/462-0015.pdf, Dec. 2014, pp. 501-504.
Non-Final Office Action received for U.S. Appl. No. 16/990,974, dated Oct. 15, 2020, 6 pages.
Notice of Allowance received for U.S. Appl. No. 15/992,722, dated Oct. 19, 2020, 5 pages.
Office Action received for Australian Patent Application No. 2019271921, dated Oct. 6, 2020, 5 pages.
Office Action received for Korean Patent Application No. 10-2020-7018655, dated Oct. 13, 2020, 5 pages (2 pages of English Translation and 3 pages of Official Copy).

\* cited by examiner

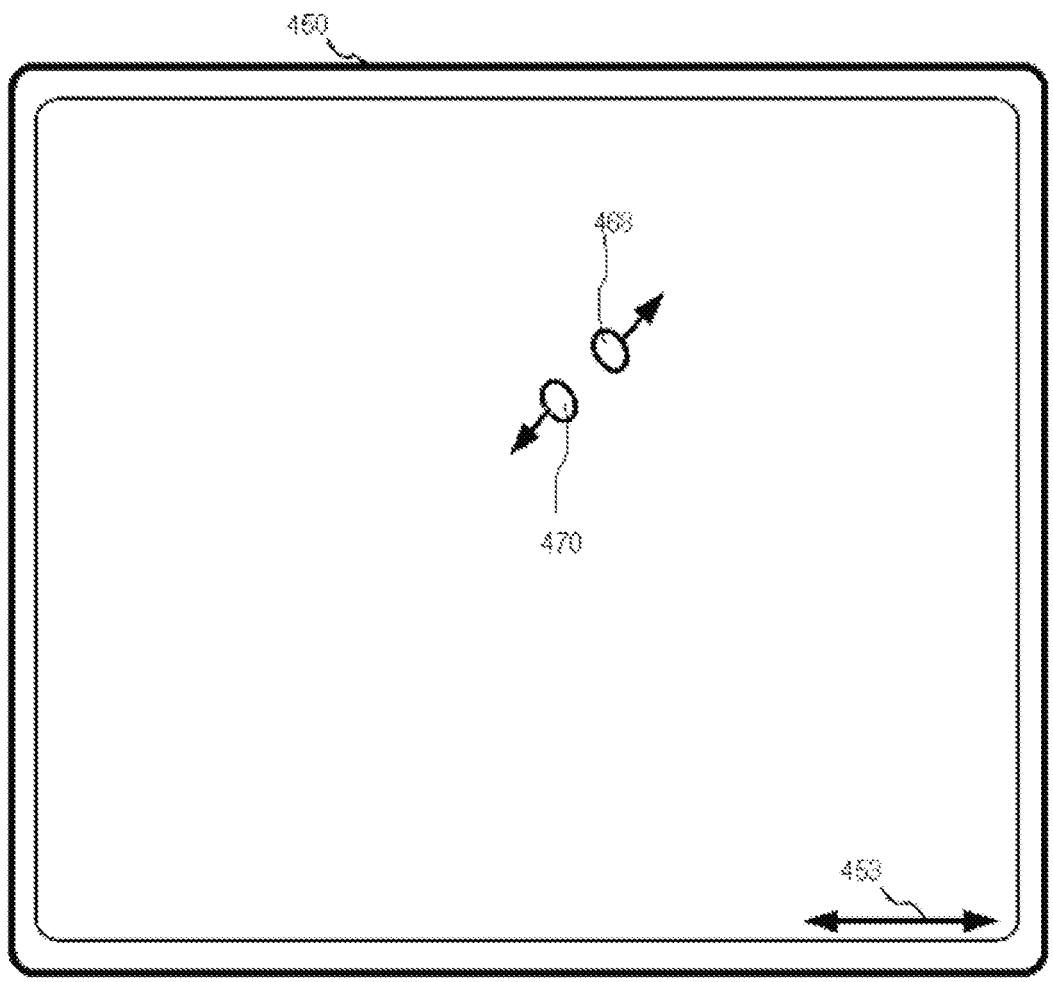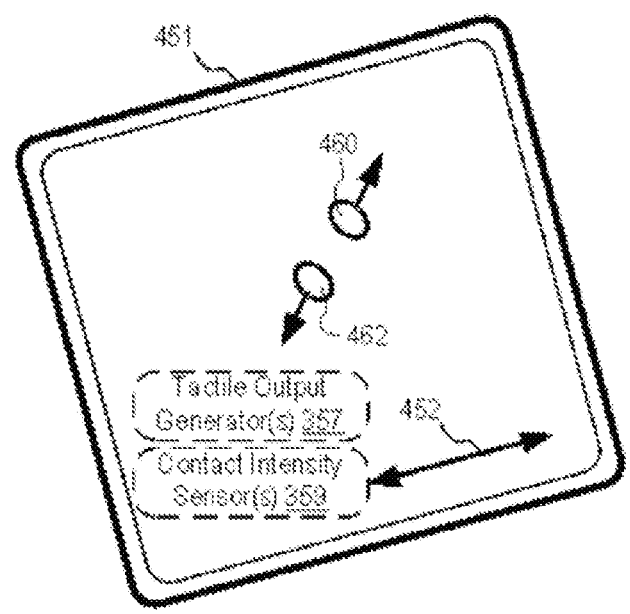
FIG. 4B

Interface 900

USER INTERACTIONS FOR A MAPPING APPLICATION

CROSS-REFERENCE TO RELATED APPLICATIONS

This application is a continuation of U.S. patent application Ser. No. 14/836,754 entitled "USER INTERACTIONS FOR A MAPPING APPLICATION", filed on Aug. 26, 2015, which claims priority to U.S. Provisional Patent Application 62/129,849 entitled "USER INTERACTIONS FOR A MAPPING APPLICATION", filed on Mar. 8, 2015; U.S. Provisional Patent Application 62/044,944 entitled "USER INTERACTIONS FOR A MAPPING APPLICATION", filed on Sep. 2, 2014; and U.S. Provisional Patent Application 62/044,993 entitled "REDUCED-SIZE USER INTERFACES FOR DYNAMICALLY UPDATED APPLICATION OVERVIEWS", filed on Sep. 2, 2014. The contents of these applications are hereby incorporated by reference in their entirety for all purposes.

FIELD

The present disclosure relates generally to mapping applications.

BACKGROUND

Mapping applications have become increasingly popular due to the proliferation of location-aware mobile electronic devices. Typically, users can interact with these mapping applications using touch-sensitive displays that are capable of both receiving user input and displaying portions of a map. While interacting with mapping applications in this way can be intuitive and simple on many electronic devices, it can be problematic when performed on compact mobile electronic devices having smaller displays. For example, it can be difficult to view route navigation directions overlaid on a map when displayed on a display of a compact mobile electronic device, such as a watch. Similarly, it can be difficult to type an address using a virtual keyboard displayed on the display of a compact mobile electronic device.

BRIEF SUMMARY

Some mapping application techniques using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for interacting with mapping applications. Such methods and interfaces optionally complement or replace other methods for interacting with mapping applications. Such methods and interfaces reduce the cognitive burden on a user and produce a more efficient human-machine interface. For battery-operated computing devices, such methods and interfaces conserve power and increase the time between battery charges.

The present disclosure relates to systems and processes for interacting with mapping applications. In one example, a virtual assistant server can efficiently communicate with a map server to provide a user with map data in response to spoken user requests received at a user device. In another example, communicatively coupled electronic devices can be synchronized such that a location marker generated on one device can be displayed on the other device. In yet another example, an electronic device can display simplified views of individual route directions that can be updated based on movement of the user or in response to user requests. In yet another example, an electronic device can selectively display an interface including a current location of a user or an interface including a route to a predicted destination based on contextual information associated with the user. The interfaces can include affordances for causing the electronic device to launch an associated mapping application.

In some embodiments, a computer-implemented method at one or more servers is described. The method includes: receiving, from an electronic device: data corresponding to an audio input comprising user speech; and contextual data representing a context of the user speech; generating a textual representation of the user speech based on the data corresponding to the audio input; transmitting, to a map server, the textual representation of the user speech and the contextual data; receiving, from the map server, map data; and transmitting, to the electronic device, the map data.

In some embodiments, a system is described. The system includes: means for receiving data corresponding to an audio input comprising user speech; means for receiving contextual data representing a context of the user speech; means for generating a textual representation of the user speech based on the data corresponding to the audio input; means for transmitting, to a map server, the textual representation of the user speech and the contextual data; means for receiving, from the map server, map data; and means for transmitting, to the electronic device, the map data.

In some embodiments, a computer-implemented method at a first electronic device is described. The method includes: causing, on a display of the first electronic device, a display of a map; determining whether a first request to mark a first location on the map has been received; and in accordance with a determination that the first request to mark the first location on the map has been received: causing, on the display of the first electronic device, a display of a first location marker on the map at a position within the display corresponding to the first location; and transmitting, to a second electronic device, a first set of geographic coordinates corresponding to the first location.

In some embodiments, a system is described. The system includes: means for causing, on a display of a first electronic device, a display of a map; means for determining whether a first request to mark a first location on the map has been received; means for causing, on the display of the first electronic device, a display of a first location marker overlaid on the map at a position within the display corresponding to the first location in accordance with a determination that the first request to mark the first location on the map has been received; and means for transmitting, to a second electronic device, a first set of geographic coordinates corresponding to the first location in accordance with a determination that the first request to mark the first location on the map has been received.

In some embodiments, a computer-implemented method at an electronic device is described. The method includes: receiving an ordered set of route directions for navigating a route from a start location to an end location, wherein the route comprises a plurality of segments; and causing, on a display of the electronic device, a display of first route direction interface associated with a first route direction of the set of route directions, wherein the first route direction is associated with a first segment of the plurality of segments and comprises a first directional instruction and a first segment identifier associated with the first segment, and wherein the first route direction interface comprises: a first textual description of the first directional instruction and the first segment identifier; and a first visual representation of the first directional instruction.

In some embodiments, a system is described. The system includes: means for receiving an ordered set of route directions for navigating a route from a start location to an end location, wherein the route comprises a plurality of segments; and means for causing a display of first route direction interface associated with a first route direction of the set of route directions, wherein the first route direction is associated with a first segment of the plurality of segments and comprises a first directional instruction and a first segment identifier associated with the first segment, and wherein the first route direction interface comprises: a first textual description of the first directional instruction and the first segment identifier; and a first visual representation of the first directional instruction.

In some embodiments, a method at an electronic device with a display is described. The method includes: detecting a display triggering event; in accordance with a detection of the display triggering event, obtaining contextual data representing a context of the electronic device; determining, based on the contextual data, whether a user is likely to be traveling to a destination within a threshold length of time; in accordance with a determination that the user is likely to be traveling to the destination within the threshold length of time, causing, on the display, a display of a first interface representing a mapping application, wherein the first interface representing the mapping application comprises: a first affordance for launching the mapping application, and a set of information associated with traveling to the destination; and in accordance with a determination that the user is not likely to be traveling to the destination within the threshold length of time, causing, on the display, a display of a second interface representing the mapping application, wherein the second interface representing the mapping application comprises: a second affordance for launching the mapping application, and a visual representation of a location of the electronic device.

In some embodiments, a system is described. The system includes: means for detecting a display triggering event; means for obtaining contextual data representing a context of the electronic device in accordance with a detection of the display triggering event; means for determining, based on the contextual data, whether a user is likely to be traveling to a destination within a threshold length of time; means for causing a display of a first interface representing a mapping application in accordance with a determination that the user is likely to be traveling to the destination within the threshold length of time, wherein the first interface representing the mapping application comprises: a first affordance for launching the mapping application, and a set of information associated with traveling to the destination; and means for causing a display of a second interface representing the mapping application in accordance with a determination that the user is not likely to be traveling to the destination within the threshold length of time, wherein the second interface representing the mapping application comprises: a second affordance for launching the mapping application, and a visual representation of a location of the electronic device.

In some embodiments, one or more servers are described. The one or more servers include a processing unit configured to: receive, from an electronic device: data corresponding to an audio input comprising user speech; and contextual data representing a context of the user speech; generate a textual representation of the user speech based on the data corresponding to the audio input; transmit, to a map server, the textual representation of the user speech and the contextual data; receive, from the map server, map data; and transmit, to the electronic device, the map data.

In some embodiments, a first electronic device is described. The first electronic device comprises a display unit and a processing unit coupled to the display unit, the processing unit configured to: cause, on the display unit of the first electronic device, a display of a map; determine whether a first request to mark a first location on the map has been received; and in accordance with a determination that the first request to mark the first location on the map has been received: cause, on the display unit of the first electronic device, a display of a first location marker on the map at a position within the display corresponding to the first location; and transmit, to a second electronic device, a first set of geographic coordinates corresponding to the first location.

In some embodiments, an electronic device is described. The electronic device includes a display unit and a processing unit coupled to the display unit, the processing unit configured to: receive an ordered set of route directions for navigating a route from a start location to an end location, wherein the route comprises a plurality of segments; and cause, on a display unit of the electronic device, a display of first route direction interface associated with a first route direction of the set of route directions, wherein the first route direction is associated with a first segment of the plurality of segments and comprises a first directional instruction and a first segment identifier associated with the first segment, and wherein the first route direction interface comprises: a first textual description of the first directional instruction and the first segment identifier; and a first visual representation of the first directional instruction.

In some embodiments, an electronic device is described. The electronic device includes a display unit and a processing unit coupled to the display unit, the processing unit configure to: detect a display triggering event; in accordance with a detection of the display triggering event, obtain contextual data representing a context of the electronic device; determine, based on the contextual data, whether a user is likely to be traveling to a destination within a threshold length of time; in accordance with a determination that the user is likely to be traveling to the destination within the threshold length of time, cause, on the display unit, a display of a first interface representing a mapping application, wherein the first interface representing the mapping application comprises: a first affordance for launching the mapping application, and a set of information associated with traveling to the destination; and in accordance with a determination that the user is not likely to be traveling to the destination within the threshold length of time, cause, on the display unit, a display of a second interface representing the mapping application, wherein the second interface representing the mapping application comprises: a second affordance for launching the mapping application, and a visual representation of a location of the electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with mapping applications, thereby increasing the effectiveness, efficiency, and user satisfaction with such devices. Such methods and interfaces may complement or replace other methods for interacting with mapping applications.

DESCRIPTION OF THE FIGURES

FIGS. 4A and 4B illustrate an exemplary user interface for a menu of applications on a portable multifunction device in accordance with some examples.

DETAILED DESCRIPTION

Figure 1A:
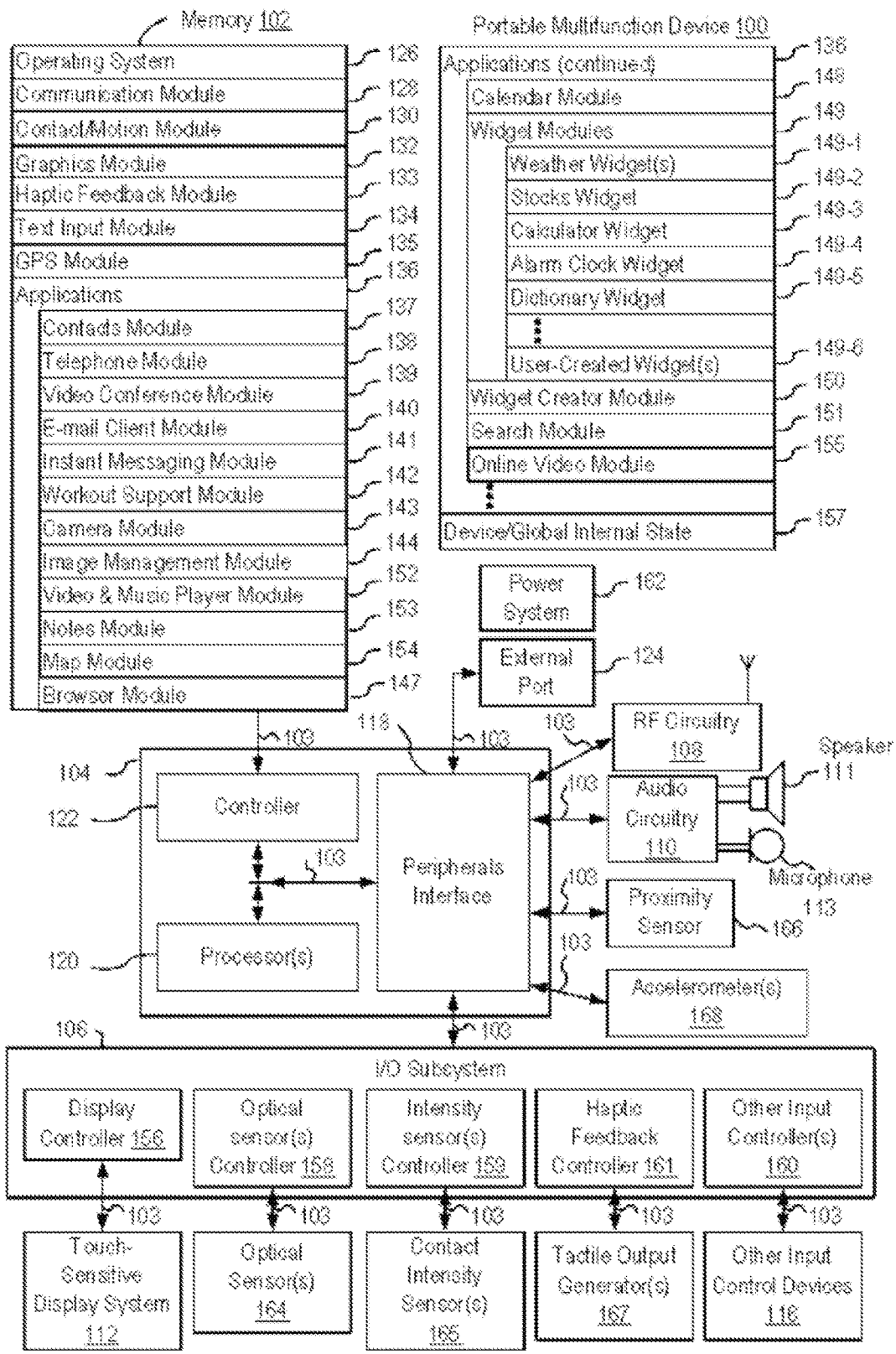
FIG. 1A is a block diagram illustrating a portable multifunction device with a touch-sensitive display in accordance with some examples.

The following description sets forth exemplary methods, parameters and the like. It should be recognized, however, that such description is not intended as a limitation on the scope of the present disclosure but is instead provided as a description of exemplary embodiments.

The present disclosure relates to systems and processes for interacting with mapping applications. In one example, a virtual assistant server can efficiently communicate with a map server to provide a user with map data in response to spoken user requests received at a user device. In another example, communicatively coupled electronic devices can be synchronized such that a location marker generated on one device can be displayed on the other device. In yet another example, an electronic device can display simplified views of individual route directions that can be updated based on movement of the user or in response to user requests. In yet another example, an electronic device can selectively display an interface including a current location of a user or an interface including a route to a predicted destination based on contextual information associated with the user. The interfaces can include affordances for causing the electronic device to launch an associated mapping application.

Below, FIGS. 1A-1B, 2, 3, and 5A-5B provide a description of exemplary devices for interacting with mapping applications. FIGS. 4A-4B, 9-11, 13-18, and 20-22 illustrate exemplary user interfaces that can be displayed on these exemplary devices.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described.

It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
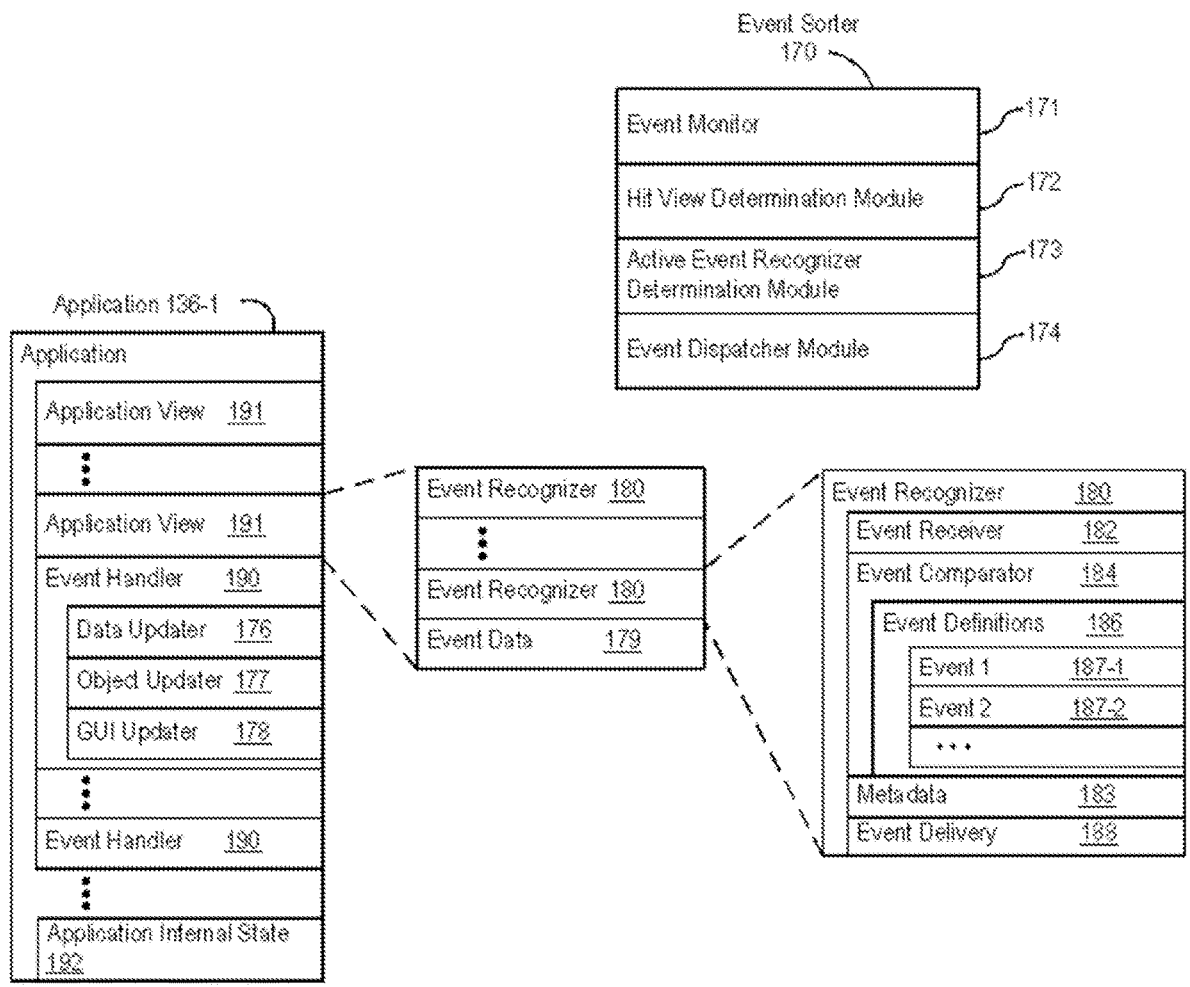
FIG. 1B is a block diagram illustrating exemplary components for event handling in accordance with some examples.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
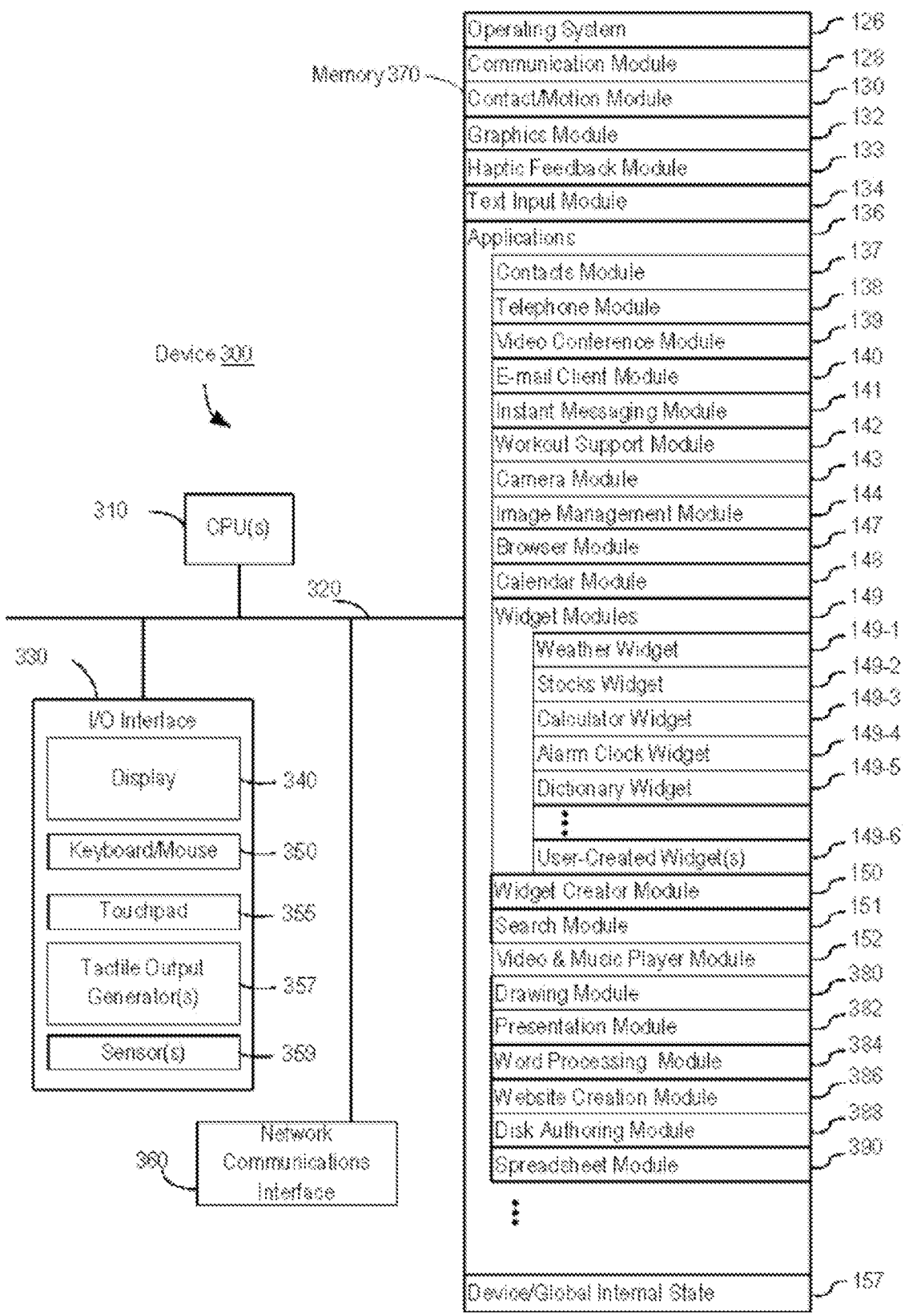
FIG. 3 is a block diagram of an exemplary multifunction device with a display and a touch-sensitive surface in accordance with some examples.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predefined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
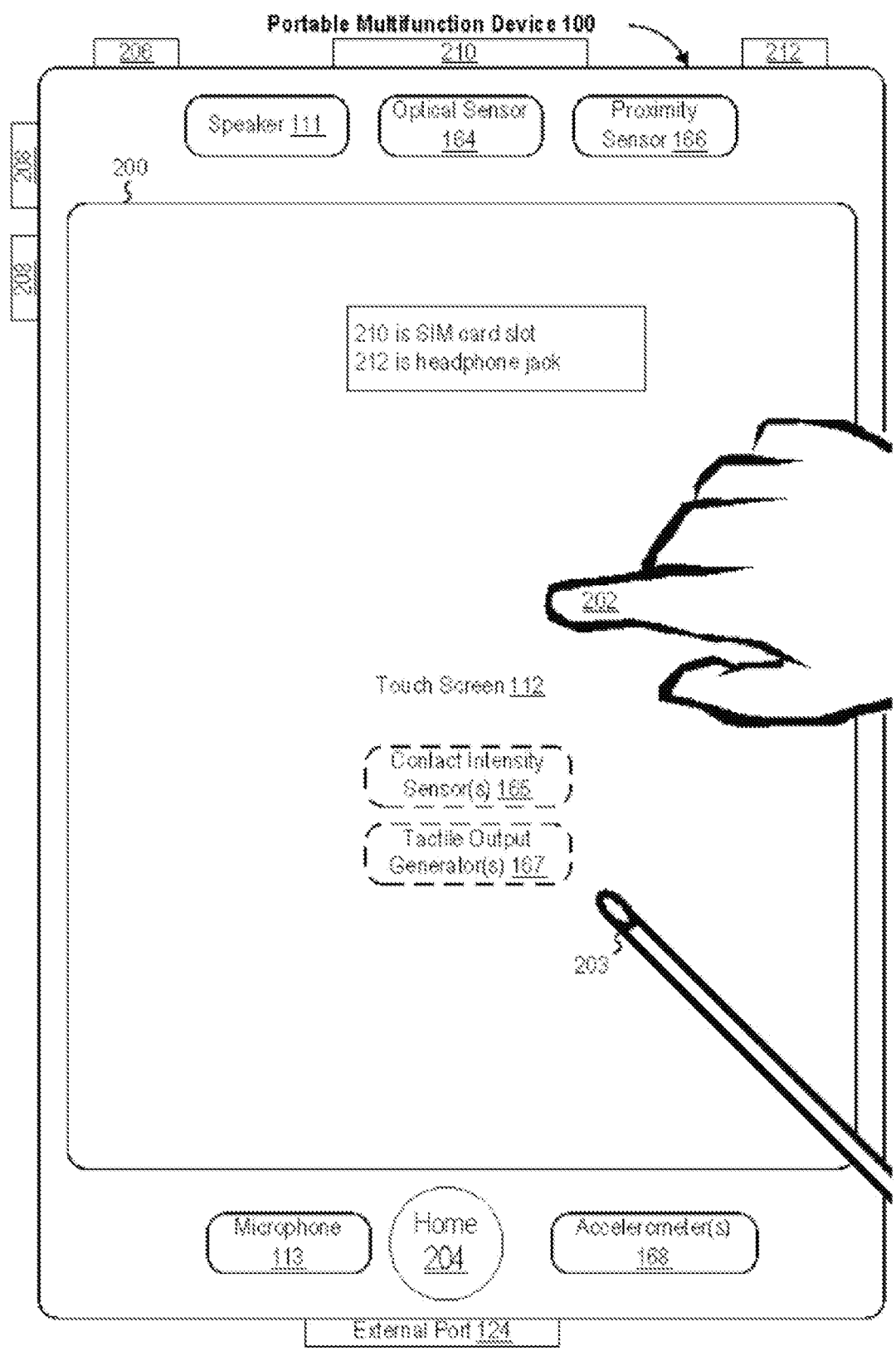
FIG. 2 illustrates a portable multifunction device having a touch-sensitive display in accordance with some examples.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
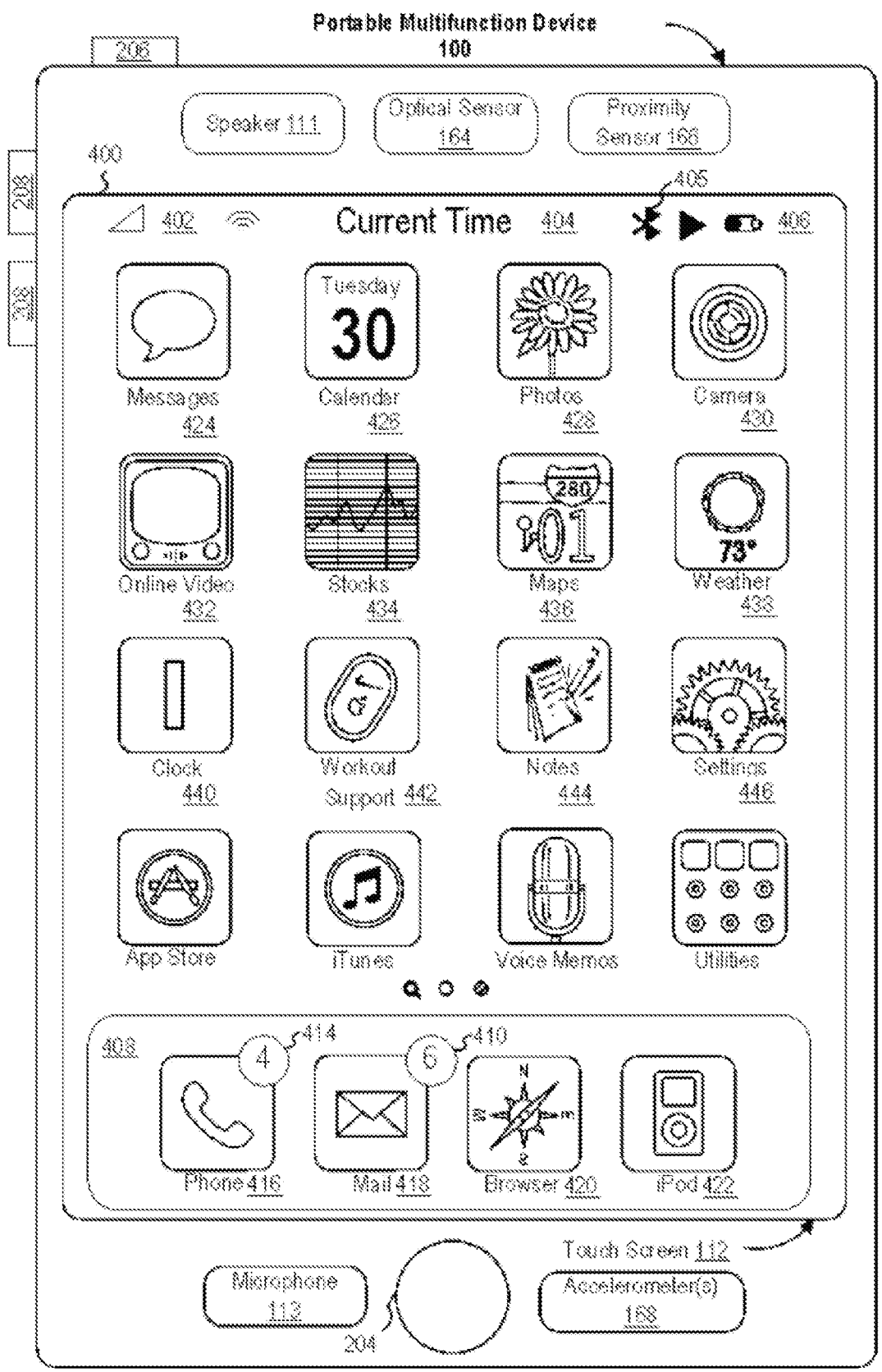

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser," and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, icons 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
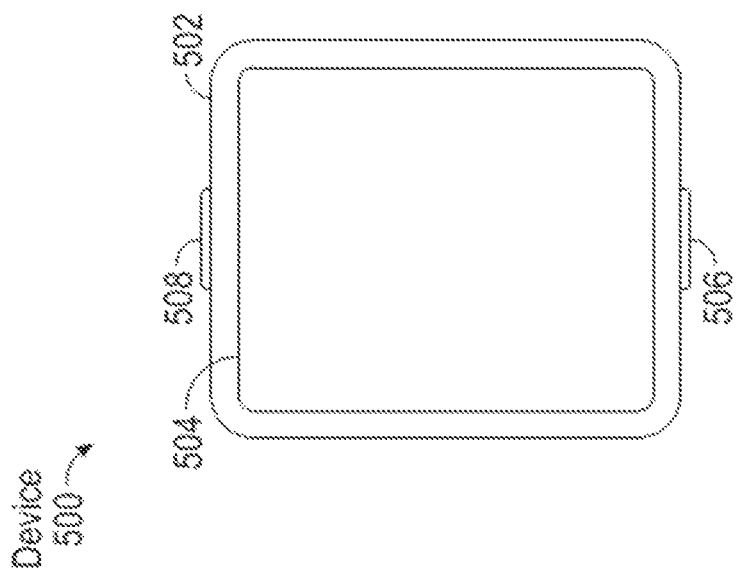
FIG. 5A is a block diagram illustrating a portable multifunction device with a touch-sensitive display in accordance with some examples.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500. As used here, the term "intensity" of a contact (or touch) on touchscreen 504 (or the touch-sensitive surface) refers to the force or pressure (force per unit area) of a touch (e.g., a finger) on the touchscreen.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
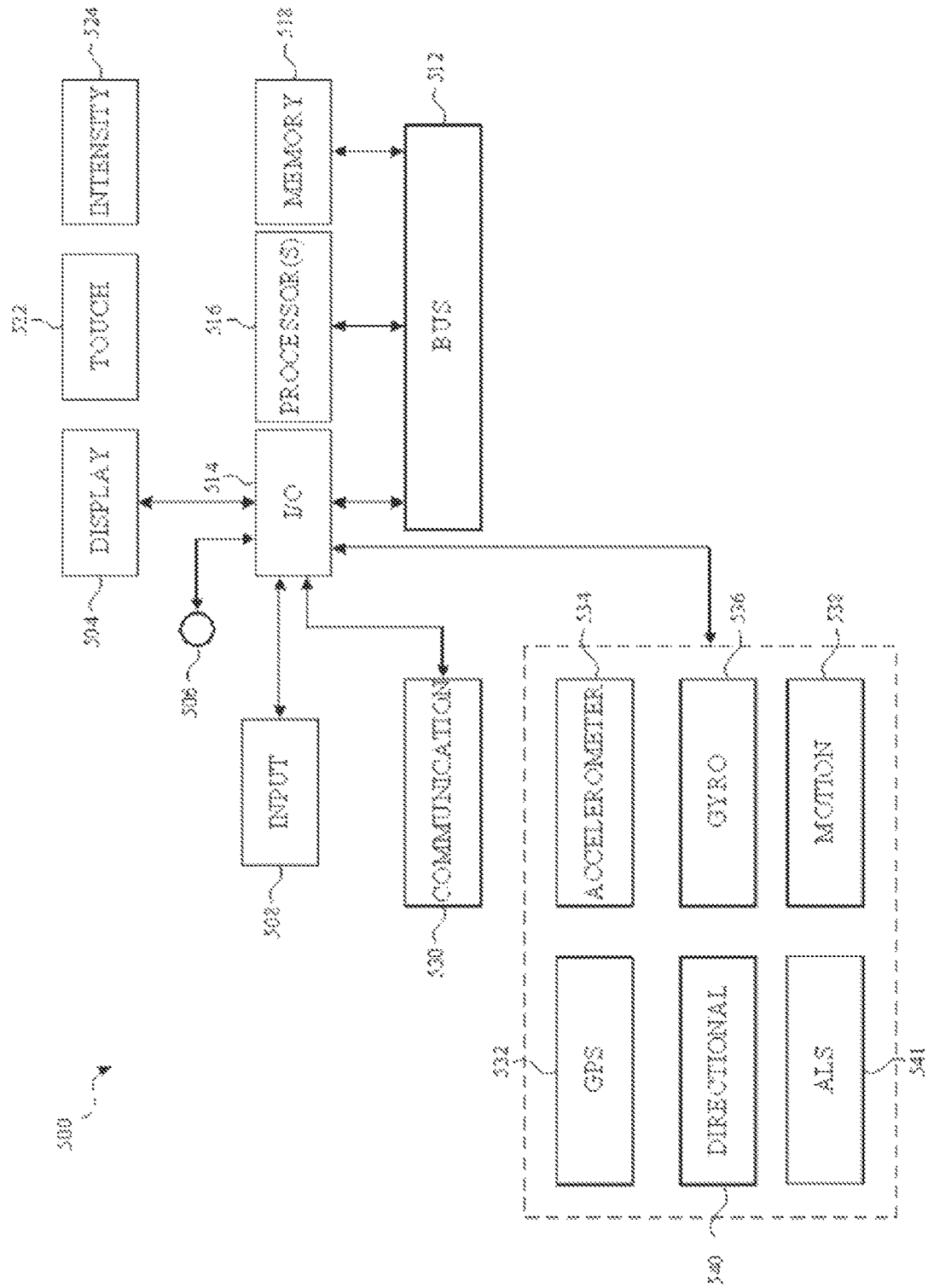
FIG. 5B illustrates a portable multifunction device having a touch-sensitive display in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication ("NFC"), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of computing device 500 can be a non-transitory computer readable storage medium, for storing computer-executable instructions, which, when executed by one or more computer processors 516, for example, can cause the computer processors to perform the techniques described above, including processes 700, 800, 1200, and 1900 (FIGS. 7, 8, 12, and 19). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing device 500 is not limited to the components and configuration of FIG. 5B, but can include other or additional components in multiple configurations.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm may be an unweighted sliding-average smoothing algorithm, a triangular smoothing algorithm, a median filter smoothing algorithm, and/or an exponential smoothing algorithm. These smoothing algorithms may eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes) which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 6:
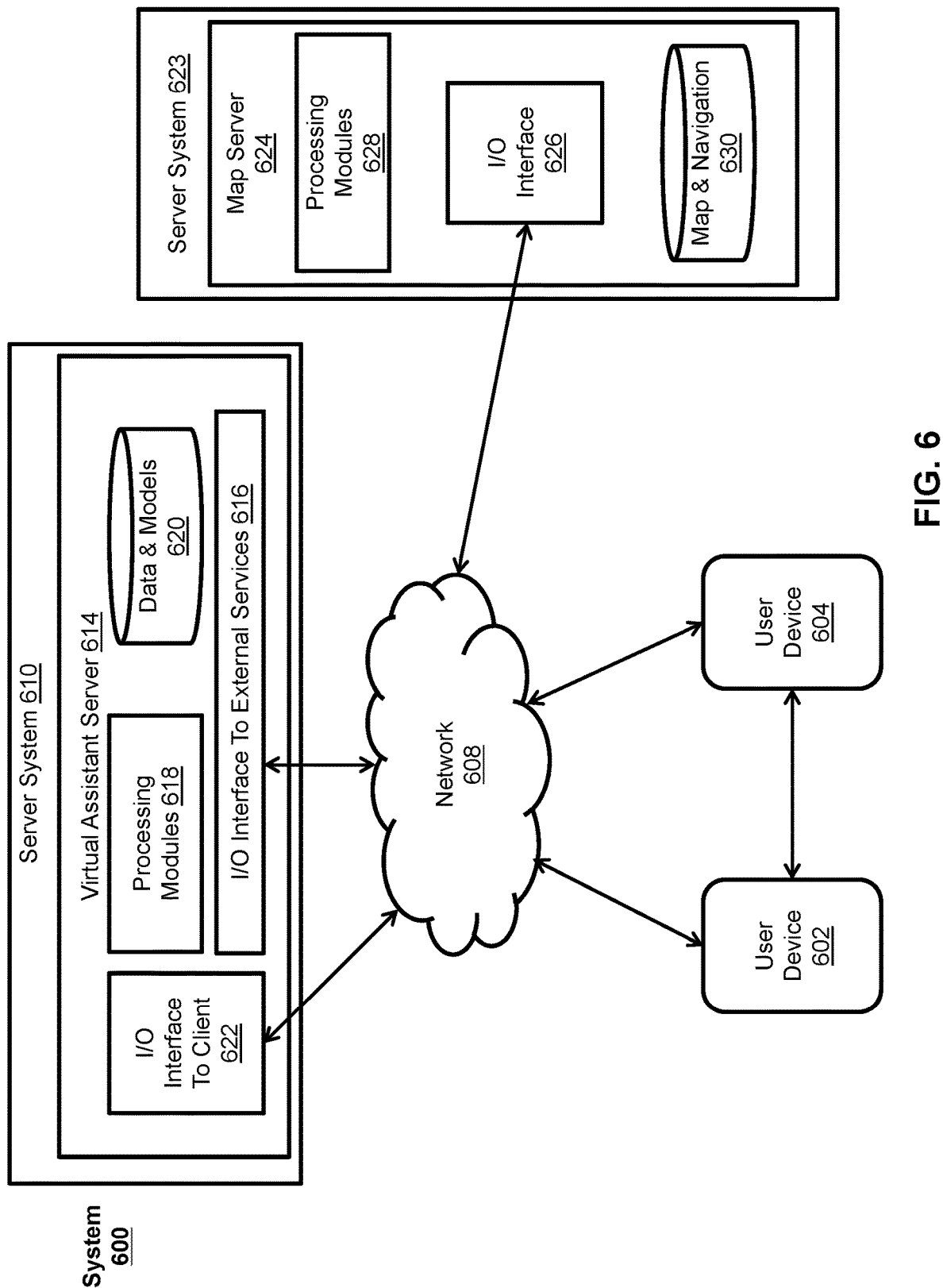
FIG. 6 illustrates a block diagram of an exemplary system for providing mapping services to a mapping application according to various examples.

FIG. 6 illustrates exemplary system 600 for implementing a virtual assistant and for providing mapping services according to various examples. The terms "virtual assistant," "digital assistant," "intelligent automated assistant," or "automatic digital assistant," can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include either provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 PM today." In response, the virtual assistant can acknowledge the request and then create an appropriate reminder item in the user's electronic schedule. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.) and possibly using multiple devices (e.g., output text to speech via a phone headset and display text on a TV).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 6, in some examples, a virtual assistant can be implemented according to a client-server model. The virtual assistant can include a client-side portion executed on user devices 602 and/or 604, and a server-side portion executed on a server system 610. User device 602 and/or 604 can include any electronic device, such as device 100, 300, or 500, and can communicate with server system 610 through one or more networks 608, which can include the Internet, an intranet, or any other wired or wireless public or private network. The client-side portion executed on user device 602 or 604 can provide client-side functionalities, such as user-facing input and output processing and communications with server system 610. Server system 610 can provide server-side functionalities for any number of clients residing on respective user devices 602 and 604.

Server system 610 can include one or more virtual assistant servers 614 that can include a client-facing I/O interface 622, one or more processing modules 618, data and model storage 620, and an I/O interface to external services 616. The client-facing I/O interface 622 can facilitate the client-facing input and output processing for virtual assistant server 614. The one or more processing modules 618 can utilize data and model storage 620 to determine the user's intent based on natural language input and can perform task execution based on inferred user intent. In some examples, virtual assistant server 614 can communicate with external services, such as telephony services, calendar services, information services, messaging services, navigation services, and the like, through network(s) 608 for task completion or information acquisition. The I/O interface to external services 616 can facilitate such communications.

In the example shown in FIG. 6, the external services can include mapping services provided by server system 623. Server system 623 can provide server-side functionalities for any number of clients residing on respective user devices 602 and 604 and can include one or more map servers 624 that can include an I/O interface 626, one or more processing modules 628, and map and navigation data storage 630. The I/O interface 626 can facilitate the client-facing and/or server-facing input and output processing for map server 624. The one or more processing modules 628 can utilize map and navigation data storage 630 to provide any of various mapping services, such as providing appropriate map tiles for display on user device 602 and/or 604, provide geocoding and reverse geocoding functions, provide navigation and routing functions to determine directions from a start location to and end location, provide traffic information, and the like. Server system 610 and/or 623 can be implemented on one or more standalone data processing devices or a distributed network of computers. In some examples, server system 610 and/or 623 can employ various virtual devices and/or services of third party service providers (e.g., third-party cloud service providers) to provide the underlying computing resources and/or infrastructure resources of server system 610 and/or 623.

In some examples, the client-side portion executed on user devices 602 and 604 can include mapping applications, which can provide client-side functionalities, such as user-facing input and output processing and communications with server system 610 and/or 623. For example, the mapping applications can request map data from server system 623 via server system 610 and/or can request map data from server system 623 directly. Additionally, in some examples, one user device (e.g., user device 602) can be communicatively coupled with another user device (e.g., user device 604) via a direct communication connection, such as Bluetooth, NFC, BTLE, or the like, or via a wired or wireless network, such as a local Wi-Fi network. In these examples, one user device (e.g., user device 604) can act as a proxy between the other user device (e.g., user device 602) and server system 610 and/or server system 623 by receiving data or requests for data from the other user device and transmitting the data or the requests for data to server system 610 and/or server system 623. Additionally, in these examples, the proxy user device can receive data or requests for data from server system 610 and/or server system 623 and can transmit the data or request for data to the other user device. By allowing one user device to act as a proxy for another advantageously provides a user device having limited communication capabilities and/or limited battery power, such as a watch or other compact electronic device, with that ability to access virtual assistant services provided by server system 610 and mapping services provided by server system 623 by leveraging the communication capabilities and/or battery power of another user device, such as a mobile phone, laptop computer, tablet computer, or the like. While only two user devices 602 and 604 are shown in FIG. 6, it should be appreciated that system 600 can include any number and type of user devices that operate independently or that are configured in a proxy configuration to communicate with server systems 610 and 623.

Although the functionality of the virtual assistant and mapping services are shown in FIG. 6 as including both a client-side portion and a server-side portion, in some examples, the functions of the assistant and/or mapping services can be implemented as a standalone application installed on a user device. In addition, the division of functionalities between the client and server portions of the virtual assistant and/or mapping services can vary in different examples. For instance, in some examples, the client executed on user device 602 or 604 can be a thin-client that provides only user-facing input and output processing functions, and delegates all other functionalities of the virtual assistant and/or mapping services to a backend server.

Figure 7:
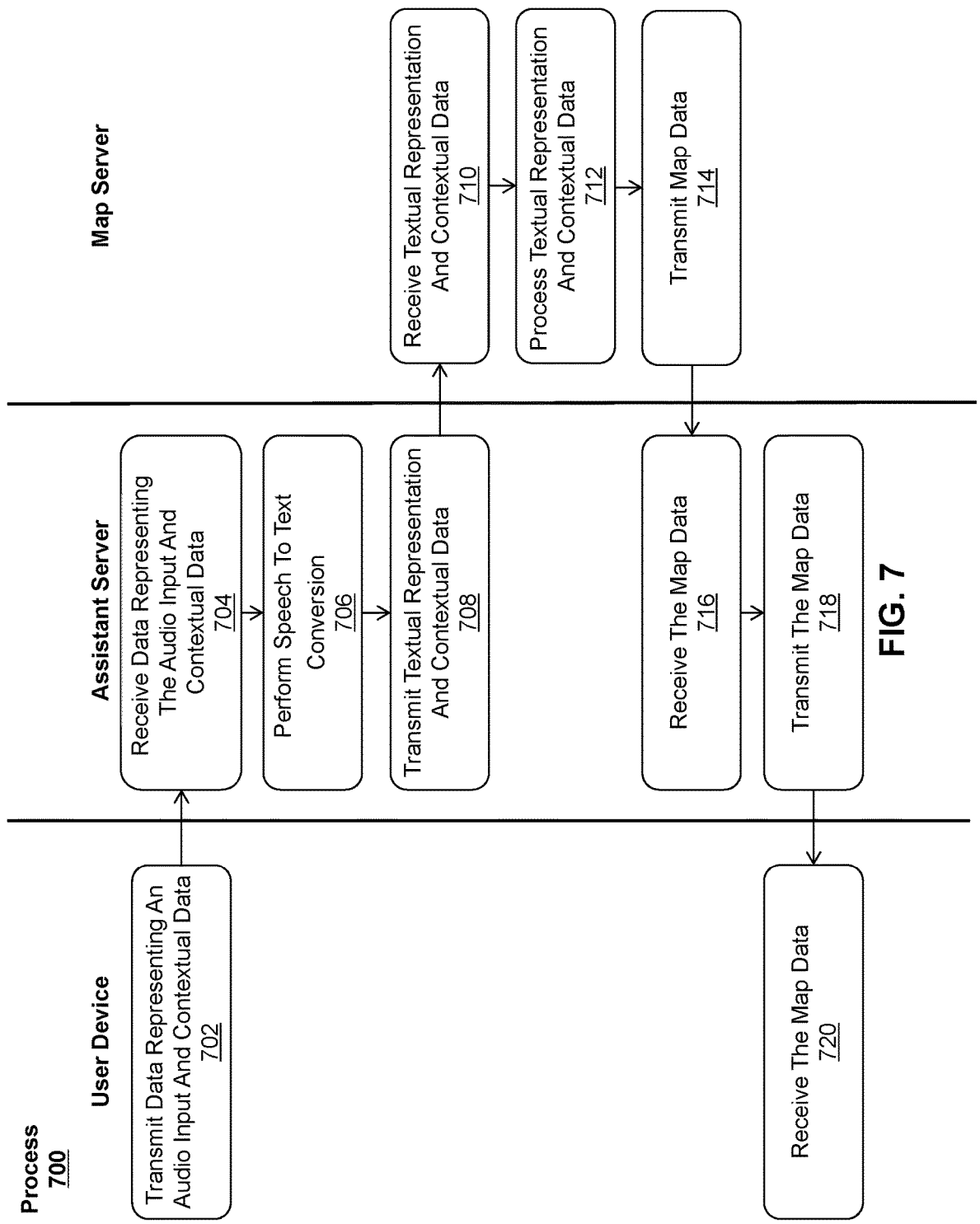
FIG. 7 illustrates an exemplary process for interacting with mapping applications according to various examples.

FIG. 7 illustrates an exemplary process 700 for interacting with a mapping application using a voice commands according to various examples. In some examples, process 700 can be performed using a system similar or identical to system 600, shown in FIG. 6. In these examples, the blocks of process 700 can be performed by user device 602 and/or 604, virtual assistant server system 610, and mapping server system 623. Specifically, the blocks on the left side of FIG. 7 can be performed by user device 602 and/or 604, the blocks in the center of FIG. 7 can be performed by virtual assistant server system 610, and the blocks on the right side of FIG. 7 can be performed by mapping server system 623.

At block 702, an audio input including user speech can be received at a user device. The user speech can include an instruction, request, or any other desired input for a mapping application. For example, the user speech can include a request for route navigation directions from the user's current location to a point of interest, an instruction to zoom-in or zoom-out from a displayed view of a map, an input containing an address or name of a point of interest, or the like. In some examples, a user device (e.g., user device 602 or 604) can receive the audio input that includes the user's speech via a microphone. The microphone can convert the audio input into an analog or digital representation, and provide the audio data to one or more processors of the device. The data representing the audio input can be transmitted to one or more servers for processing. For instance, in some examples, user device 602 or 604 can receive an audio input that represents the user's speech, convert the audio input into an analog or digital representation, and transmit the data representing the audio input to virtual assistant server 614 of server system 610 via network(s) 608. In other examples, one user device (e.g., user device 604) can be used as a proxy between another user device (e.g., user device 602) and the server systems 610 and 623. In these examples, user device 602 can receive the audio input that represents the user's speech, convert the audio input into an analog or digital representation, transmit the data representing the audio input to user device 604, and user device 604 can transmit the data representing the audio input to virtual assistant server 614 of server system 610 via network(s) 608.

Additionally, in some examples, contextual data associated with the user input can be transmitted along with the data representing the audio input at block 702. In general, the contextual data can include any type of information associated with the user input that can be used to infer the user's intent. In some examples, the contextual data can include sensor information from user device 602 or 604, such as lighting, ambient noise, ambient temperature, images or videos of the surrounding environment, current time, distance to another object, and the like. The contextual information can additionally or alternatively include information associated with the physical state of user device 602 or 604, such as the device orientation, device location, device temperature, power level, speed, acceleration, motion patterns, cellular signal strength, etc., or the software state of user device 602 or 604, such as running processes, installed programs, past and present network activities, background services, error logs, resources usage, contents displayed on the device, contents of a portion of a map displayed on the device, length of time that a current view has been displayed on the device, length of time since receiving a user input, length of time an application has been opened or running, etc. Any of these types of contextual information can be provided to the virtual assistant server 614 as contextual information associated with the user input.

At block 704, data corresponding to the audio input and the contextual data transmitted by the user device at block 702 can be received by one or more virtual assistant servers. For example, virtual assistant server 614 of server system 610 can receive the data corresponding to the audio input and the contextual data transmitted by user device 602 or 604 via network(s) 608.

At block 706, the one or more virtual assistant servers can perform speech-to-text conversion on the data corresponding to the audio input to convert the user speech into a textual representation of the user speech. The user speech can be converted using any known speech-to-text conversion process. For example, virtual assistant server 614 of server system 610 can perform a speech-to-text conversion on the audio input received at block 704.

At block 708, the one or more virtual assistant servers can transmit the textual representation of the user speech generated at block 706 and the contextual data received at block 704 to one or more map servers. For example, virtual assistant server 614 of server system 610 can transmit the textual representation of the user speech generated at block 706 and the contextual data received at block 704 to map server 624 of server system 623 via network(s) 608. In some examples, the textual representation may not also be transmitted to the user device.

At block 710, the textual representation of the user speech and the contextual data transmitted by the one or more virtual assistant servers at block 708 can be received by one or more map servers. For example, map server 624 of server system 623 can receive the textual representation of the user speech and the contextual data transmitted by virtual assistant server 614 via network(s) 608.

At block 712, the one or more map servers can process the textual representation of the user speech using the contextual data to infer the user's intent. Based on the inferred intent, the one or more servers can identify a task flow with steps and parameters designed to accomplish the inferred user intent, inputting input requirements from the inferred user intent into the task flow, execute the task flow by invoking programs, methods, services, APIs, or the like, and/or generate map data to be provided to the user of the user device in response to their audio input. In some examples, the map data can include map tiles to be displayed on a user device, route navigation information containing directions from a start location to an end location, geographic coordinates, textual descriptions and/or visual representations of a location, a point of interest, an object of interest, or the like. For example, map server 624 can process the textual representation of the user speech using the contextual data received at block 710 to determine the appropriate map data to provide to the user. If, for example, the user speech included the request "Give me directions to the park," map server 624 can process the request by using the contextual data to determine which park the user is likely referring to. The user's current location, the presence or absence of a park within the portion of a map being displayed by the user device, and the like, can be used to make this determination. Once a specific park is identified, a navigation algorithm can be performed using the user's current location as a start point and the location of the park as an end point. The algorithm can produce map data containing the route from the user to the park. Similar processes can be performed to respond to other user requests and inputs with appropriate map data.

At block 714, the one or more map servers can transmit the map data output by the processing of the textual representation of user speech performed at block 712 to the one or more virtual assistant servers. For example, map server 624 of server system 623 can transmit the map data generated at block 712 to virtual assistant server 614 of server system 610 via network(s) 608.

At block 716, the map data transmitted by the one or more map and navigation servers at block 714 can be received by one or more virtual assistant servers. For example, virtual assistant server 614 can receive the map data transmitted by map server 624 of server system 623 via network(s) 608. In other examples, at block 714, the one or more map servers can instead transmit the map data directly to the user device, rather than to the one or more virtual assistant servers.

At block 718, the one or more virtual assistant servers can transmit the map data received at block 716 to the user device. For example, virtual assistant server 614 of server system 610 can transmit the map data received at block 716 to user device 602 or 604 via network(s) 608.

At block 720, the map data transmitted by the one or more virtual assistant servers at block 718 can be received by the user device. For example, user device 602 or 604 can receive the map data transmitted by virtual assistant server 614 via network(s) 608. In some examples, where a user device is used as a proxy for another user device, block 720 can further include transmitting the map data to the proxied user device.

Using process 700, a mapping service can quickly respond to a request or other user input in the form of user speech. In particular, process 700 advantageously routes the converted textual representation of user speech and contextual information from the virtual assistant server directly to the map and navigation server for processing. This provides a speed improvement over existing systems that return the textual representation of user speech from the virtual assistant server to the user device and that require the user device to then transmit the received textual representation of user speech and the contextual information to the map and navigation server. The speed improvement can be particularly noticeable when the virtual assistant server and the map server are located in close proximity or are connected to the same network, resulting in the communication speed between the virtual assistant server and the map server being greater than the communication speed between the user device and the map server.

Figure 8:
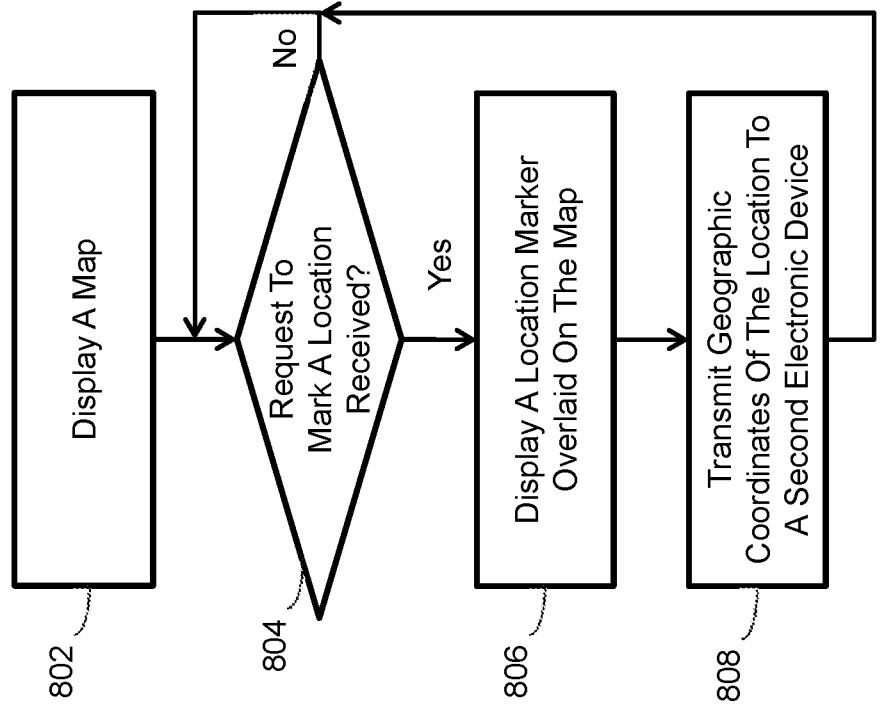
FIG. 8 illustrates another exemplary process for interacting with mapping applications according to various examples.
Figure 9:
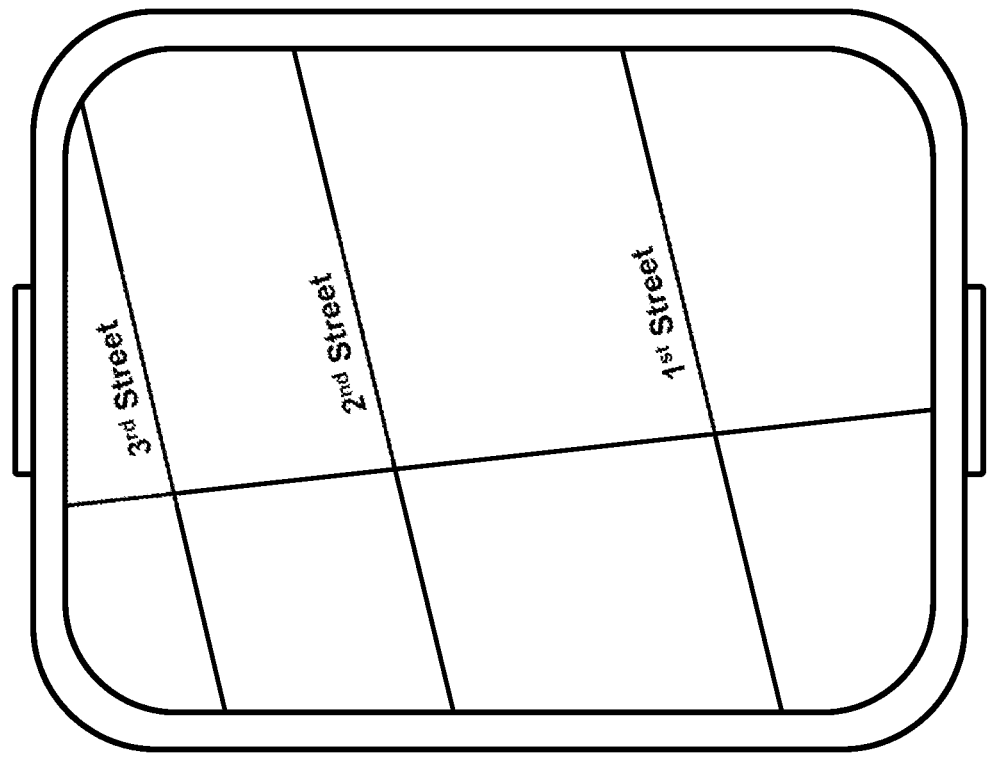
FIGS. 9-11 illustrate example interfaces for interacting with mapping applications according to various examples.

FIG. 8 illustrates an exemplary process 800 for synchronizing location markers entered into mapping applications between communicatively coupled electronic devices according to various examples. In some examples, process 800 can be performed using electronic devices similar or identical to device 100, 300, 500, 602, or 604.

At block 802 of process 800, a first electronic device can display a map on a display of the device. For example, user device 602 or 604 can display a map similar to that shown in interface 900 of FIG. 9.

Figure 10:
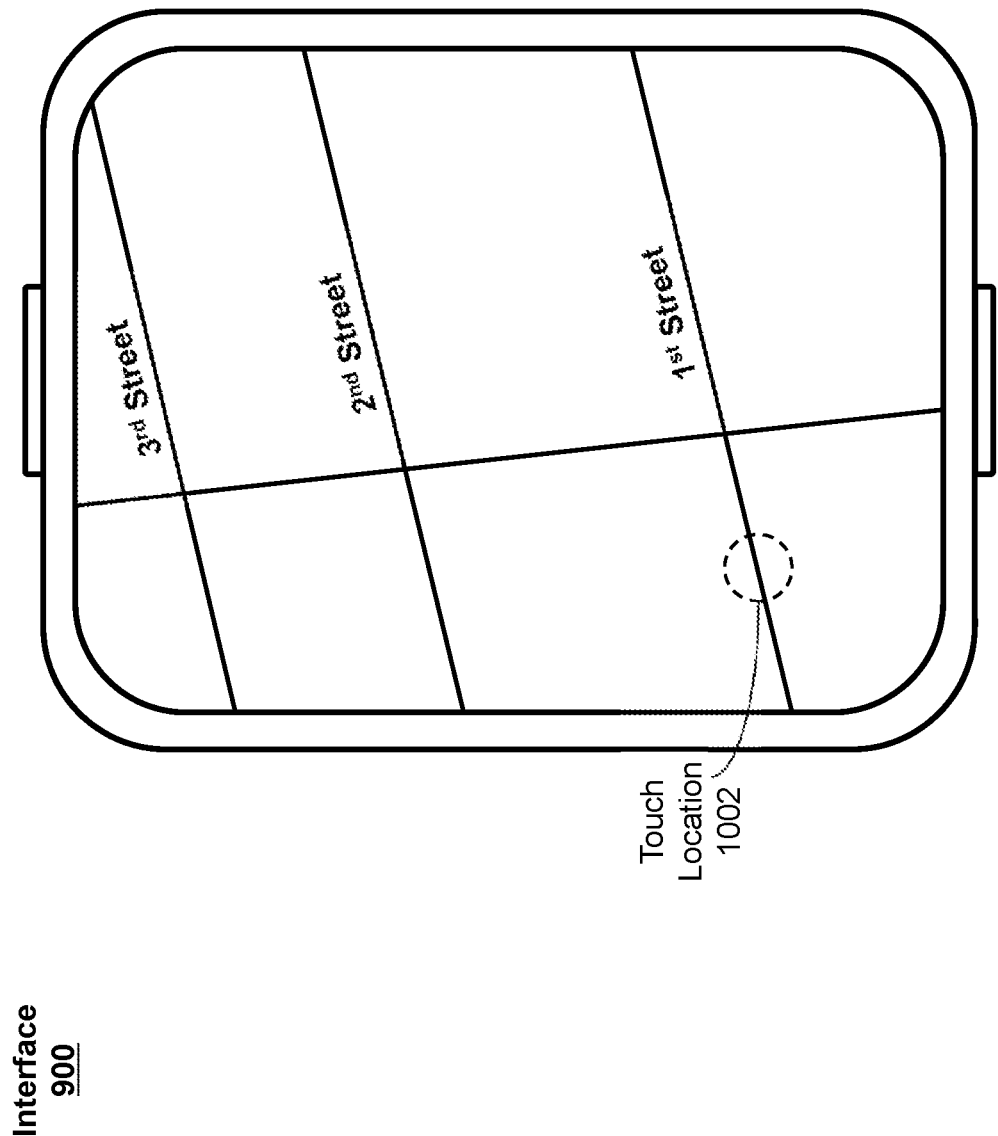
Figure 11:
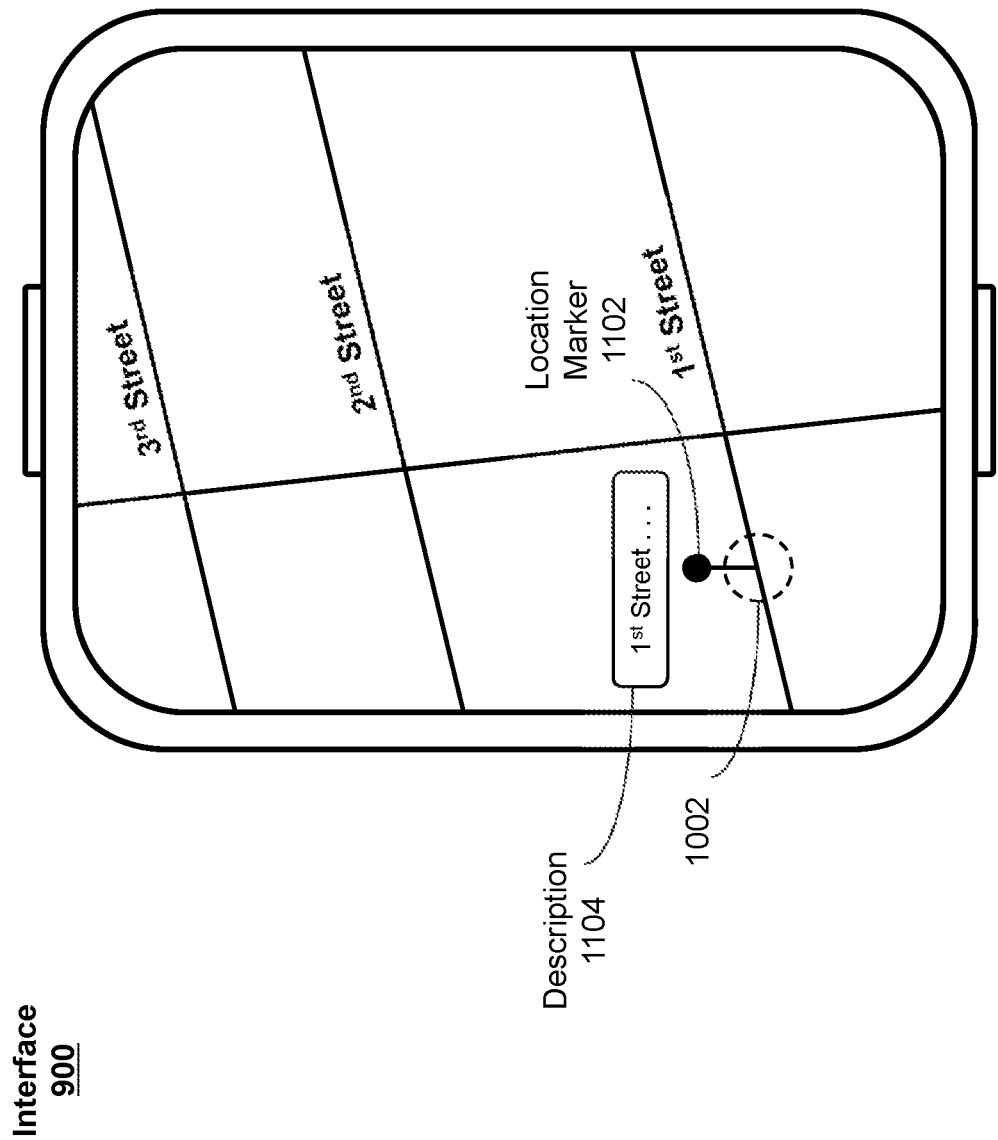

At block 804, the first electronic device can determine whether a request to mark a location on the displayed map has been received. For example, user device 602 or 604 can determine whether a request to mark a location on the map displayed at block 802 has been received. The request can be input into the first electronic device in any desired manner. For example, the request can be made by a selection of a button displayed on the displace of the first electronic device, a depression of a physical button, a rotation of a rotatable mechanism, a touch at a location on a touch-sensitive display corresponding to the desired location of the map to be marked, a touch and hold on a location on a touch-sensitive display corresponding to the desired location of the map to be marked, a press at a location on a pressure-sensitive display corresponding to the desired location of the map to be marked, or the like. To illustrate, FIG. 10 shows a request to mark a location on the map displayed in FIG. 9 being made by a user touching and holding an object (e.g., a finger) on the touch-sensitive display of the first electronic device at touch location 1002. If it is determined at block 804 that a request to mark a location on the map has been received, process 800 can proceed to block 806. However, if it is instead determined that no request to mark a location has been received, process 800 can repeat block 804. Block 804 can be repeated periodically, intermittently, or at any other desired frequency or interval of time to determine if a request to mark a location on the map has been received.

At block 806, the first electronic device can display a location marker overlaid on the map at the location requested by the user at block 804. The location marker can include any element that is visually distinct from the underlying map to allow a user to identify the marked location. For example, user device 602 or 604 can display a location marker similar or identical to location marker 1102, shown in FIG. 11. Location marker 1102 can be overlaid on the map at a position corresponding to the location of the user's request received at block 804. Location marker 1102 can be associated with geographic coordinates of the location requested to be marked at block 804 and/or a textual description of the requested location, such as a street name, address, city, country, zip code, or the like. In some examples, a description 1104 containing some or all of this associated information can be displayed overlaid on the map and near location marker 1102. In some examples, a selection of description 1104 and/or location marker 1102 can cause the first electronic device to display additional or more detailed information about the marked location. The display of location marker 1102 and description 1104 advantageously allows a user to identify a location of interest within a map and to view additional information associated with the selected location, such as street name, address, city, country, zip code, or the like. This can be particularly beneficial when performed on electronic devices having limited input capabilities, such as wearable electronic devices (e.g., a watch) or other compact devices, since it can be difficult to select a specific location without additional controls, such as a mouse, touchpad, or the like. In some examples, block 806 can further include storing, by the first electronic device, the geographic coordinates and other information associated with the location marker.

At block 808, the first electronic device can transmit the geographic coordinates associated with the location marker displayed at block 806 to a second electronic device. In some examples, other information associated with the location marker displayed at block 806, such as a street name, address, city, country, zip code, or the like, can also be transmitted to the second electronic device. The second electronic device can be a device that has been paired with the first electronic device, is associated with a same user account as the first electronic device, or is otherwise associated with the first electronic device. For example, user device 602 (alternatively user device 604) can transmit the geographic coordinates of the location requested to be marked at block 804 to user device 604 (alternatively user device 602) via a direct communication connection, such as Bluetooth, NFC, BTLE, or the like, or via a wired or wireless network, such as a local Wi-Fi network. In some examples, the second electronic device can store the geographic coordinates and other information associated with the location marker. In other examples, user device 602 (alternatively user device 604) can transmit the geographic coordinates of the location requested to be marked at block 804 to a server or remote database that can be accessed by user device 604 (alternatively user device 602).

After transmitting the geographic coordinates and, optionally, the other information associated with the location marker to the second electronic device, process 800 can return to block 804. Blocks 804, 806, and 808 can repeatedly be performed to allow a user to mark any number of locations. In some examples, an additional location marker can be displayed overlaid on the map each time block 806 is performed. In these examples, the geographic coordinates and other information associated with the additional location markers can also be stored on the first electronic device. In other examples, the location marker displayed at block 806 can replace one or more existing location markers previously displayed on the map. In these examples, the geographic coordinates and other information associated with the new location marker can replace previously stored geographic coordinates and other information associated with one or more older location markers.

In some examples, the second electronic device can use the geographic coordinates (and, optionally, other information associated with the location marker) provided by the first electronic device at block 808 to display a location marker overlaid on a map being displayed by the second electronic device. The location marker can be the same or different than the location marker displayed by the first electronic device. This advantageously allows a user to open a mapping application on the first electronic device, mark a location of interest within the mapping application, and view the marked location of interest in a mapping application on a different electronic device.

In some examples, process 800 can be performed by both the first electronic device and the second electronic device such that a request to mark a location on one device can cause the same location to be marked on the other electronic device. In these examples, the electronic device receiving the geographic coordinates and other information associated with a location marker can store that information in addition to previously stored information associated with other location markers or can replace the previously stored information associated with other marker(s) with the newly received information. In other examples, process 800 can be performed to synchronize marked locations between more than two electronic devices. In these examples, block 808 can include transmitting the geographic coordinates (and, optionally, other information associated with the location marker and with the location requested to be marked at block 804) to the other electronic devices. Moreover, process 800 can also be performed by the additional electronic devices.

Figure 12:
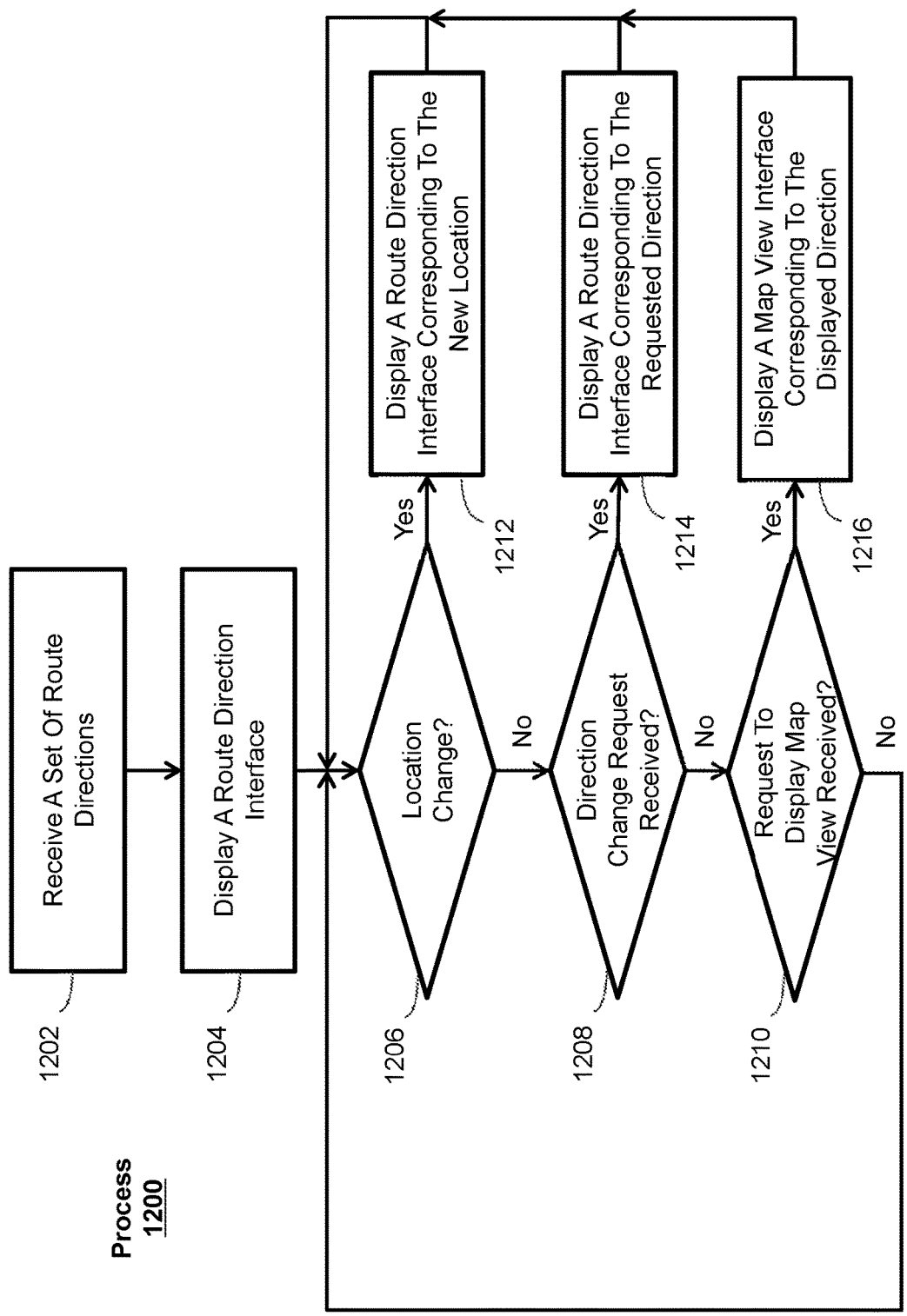
FIG. 12 illustrates another exemplary process for interacting with mapping applications according to various examples.

FIG. 12 illustrates an exemplary process 1200 for displaying route navigation directions according to various examples. In some examples, process 1200 can be performed using electronic devices similar or identical to device 100, 300, 500, 602, or 604.

At block 1202, an electronic device can receive a set of route directions for navigating a route from a start location to an end location. For example, an electronic device, such as user device 602 or 604, can receive a set of route navigation directions from a map server, such as map server 624 of server system 623. In other examples, the electronic device can instead generate the route navigation directions locally on the electronic device. In some examples, the route can include one or more segments corresponding to roads, highways, or other predefined or arbitrary portions of the route. In these examples, the set of route directions can include an ordered set of directions that can each include a directional instruction (e.g., an instruction to turn, and instruction to travel straight, or the like) and a name or other identifier of an associated segment of the route (e.g., a road/street/highway name, unique identifier, or the like). For example, one direction of the set of route directions can be "Turn Right on A Street." In this example, the direction includes a directional instruction "Turn Right" and a name of the associated segment "A Street." The other directions of the set of route directions can similarly include a directional instruction and the name or other identifier of an associated segment of the route.

Figure 13:
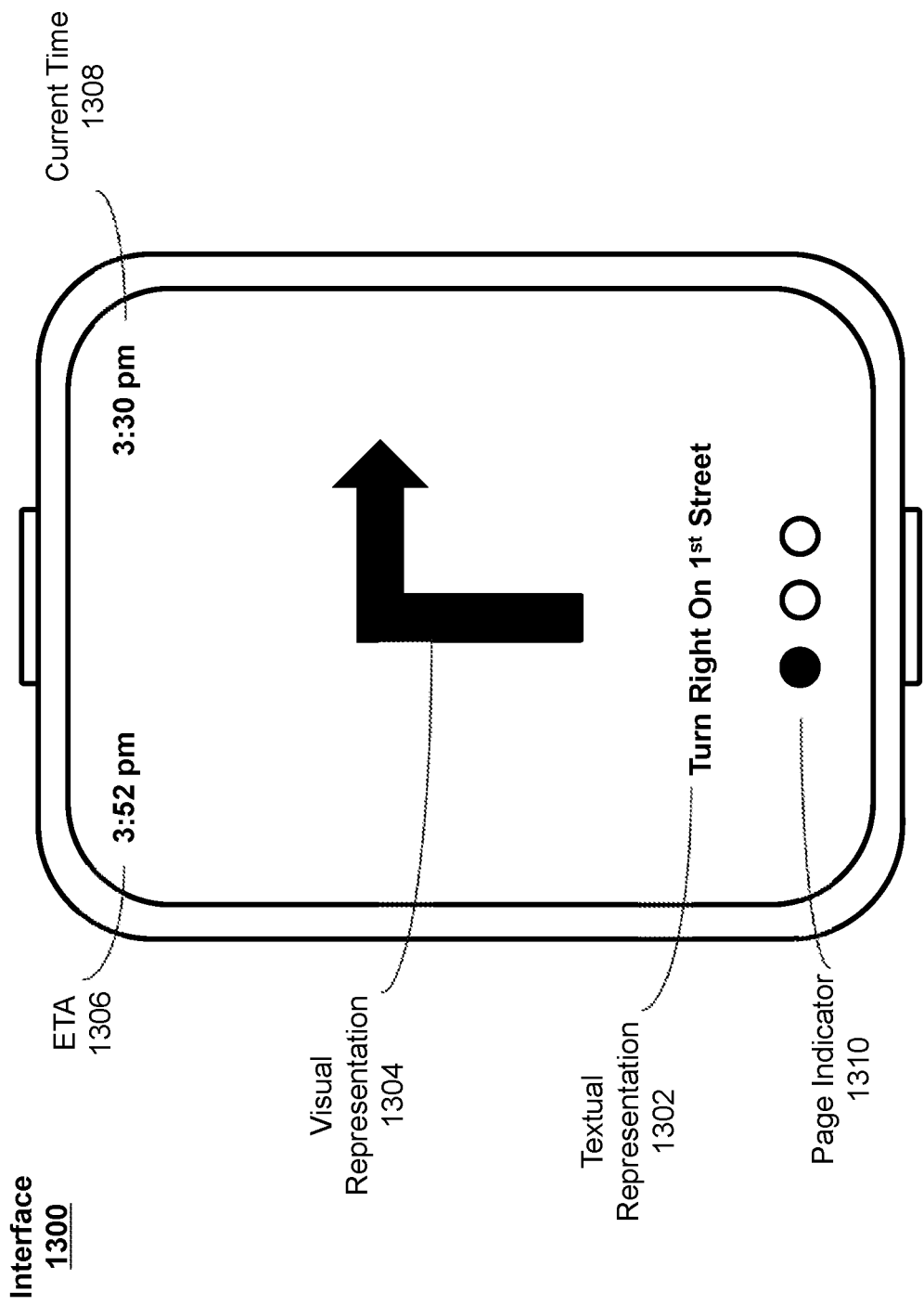
FIGS. 13-18 illustrate example interfaces for interacting with mapping applications according to various examples.

At block 1204, the electronic device (e.g., user device 602 or 604) can display a route direction interface representing a direction of the set of route directions received or generated at block 1202. In some examples, the direction represented by the route direction interface can be the first direction in the ordered set of route directions. FIG. 13 shows an example route direction interface 1300 that can be displayed by the electronic device at block 1204. As shown, interface 1300 can include a textual representation 1302 of the route direction. The textual representation 1302 can include a textual representation of both the directional instruction (e.g., "Turn Right") and the segment name or identifier (e.g., "1st Street") of the displayed direction. Interface 1300 can further include a visual representation 1304 of the directional instruction of the displayed direction. The visual representation 1304 can include a simplified visual representation of the directional instruction, such as an image of a directional arrow, to allow a user to quickly and easily recognize the next direction to make. In some examples, interface 1300 can further include an estimated time of arrival ("ETA") 1306 that can be calculated by the electronic device or the map server based on the current time, distance to the destination, type of roads being traveled, traffic conditions, the user's mode of the transportation, or the like. Interface 1300 can further include a current time indicator 1308 that provides a textual and/or visual representation of the current time. Interface 1300 can further include page indicators 1310 that can include a number of indicators (e.g., circles) corresponding to a number of directions in the ordered set of directions and the current direction being displayed (represented by the filled-in circle). In some examples, the route direction interface can exclude a view of a map or other visual representation of one or more segments of the route. This advantageously removes clutter from the display and allows a user to easily view the directional instruction and the segment identifier.

Referring back to FIG. 12, at block 1206, the electronic device (e.g., user device 602 or 604) can determine if the user's location has changed or if the user's location changed from a location corresponding to the route direction displayed at block 1204 to a location corresponding to a different route direction in the ordered set of route directions. In some examples, this can include determining geographic coordinates of the electronic device using any desired location determination technology, such as GPS or GLONASS (e.g., using GPS module 135, sensors 359, or GPS sensor 532), Wi-Fi or cellular (e.g., using RF circuitry 108, network communication interface 360, or communication unit 530), or the like. For example, the electronic device can receive location information from GPS satellites, nearby Wi-Fi base stations, and/or nearby cell towers, as described in U.S. patent application Ser. No. 12/040,283, "Location Determination," filed Feb. 29, 2008; Ser. No. 12/103,330, "Location Determination Using Formula," filed Apr. 15, 2008; and Ser. No. 12/122,339, "Location Determination," filed May 16, 2008, each of which is incorporated by reference herein in their entirety for all purposes. These determined geographic coordinates can be used by the electronic device to determine the location of the electronic device with respect to the segments of the navigation route. If it is determined that the electronic device is on or within a threshold distance from the current segment of the route (associated with the currently displayed direction), a negative determination can be made at block 1206 and the process can proceed to block 1208. Alternatively, if it is instead determined that the electronic device is not on or within a threshold distance from the current segment of the route (associated with the currently displayed direction) or is on or within a threshold distance from another segment of the route, a positive determination can be made at block 1206 and the process can proceed to block 1212 where a route direction interface representing the route direction corresponding to the new location of the user can be displayed.

At block 1208, the electronic device (e.g., user device 602 or 604) can determine whether a request to change the displayed direction has been received. The request can be input into the electronic device in any desired manner. For example, the request can be made by selecting a button displayed on the displace of the first electronic device, turning a rotatable mechanism, pressing on a pressure-sensitive display, pressing a physical button on the electronic device, taping on a touch-sensitive display, performing a swipe gesture (e.g., horizontally or vertically) across a touch-sensitive display, or the like. In some examples, a swipe gesture detected by a touch-sensitive display that travels from left to right on the touch-sensitive display can be interpreted as a request to change the displayed direction to the previous direction in the ordered set of directions, and a swipe gesture detected by a touch-sensitive display that travels from right to left on the touch-sensitive display can be interpreted as a request to change the displayed direction to the next direction in the ordered set of directions. If it is determined that no request to change the displayed direction has been received, the process can proceed to block 1210. However, if it is instead determined that a request to change the displayed direction has been received, the process can proceed to block 1214 where a route direction interface representing the direction requested to be displayed at block 1208 can be displayed.

In some examples, a downward swipe gesture (e.g., traveling from top to bottom) detected by a touch-sensitive display can be interpreted as a request to change the displayed direction to the previous direction in the ordered set of directions, and an upward swipe gesture (e.g., traveling from bottom to top) detected by a touch-sensitive display can be interpreted as a request to change the displayed direction to the next direction in the ordered set of directions. In some examples, rather than displaying a single direction in the ordered set of directions on the touch-sensitive display, multiple directions of the ordered set of directions are simultaneously displayed on the touch-sensitive display (e.g., as a list). As a result, the downward swipe gesture and the upward swipe gesture may be used to scroll through multiple directions in the ordered set of directions.

In some examples, an upward swipe gesture (e.g., traveling from bottom to top) detected by a touch-sensitive display can be interpreted as a request to change the displayed direction to the previous direction in the ordered set of directions, and an downward swipe gesture (e.g., traveling from top to bottom) detected by a touch-sensitive display can be interpreted as a request to change the displayed direction to the next direction in the ordered set of directions. In some examples, rather than displaying a single direction in the ordered set of directions on the touch-sensitive display, multiple directions of the ordered set of directions are simultaneously displayed on the touch-sensitive display (e.g., as a list). As a result, the downward swipe gesture and the upward swipe gesture may be used to scroll through multiple directions in the ordered set of directions.

At block 1210, the electronic device (e.g., user device 602 or 604) can determine whether a request to view a map view of a displayed direction has been received. The request can be input into the electronic device in any desired manner. For example, the request can be made by selecting a button displayed on the displace of the first electronic device, pressing on a pressure-sensitive display, turning a rotatable mechanism, pressing a physical button on the electronic device, taping on a touch-sensitive display, performing a swipe gesture (e.g., horizontally or vertically) across a touch-sensitive display, or the like. In some examples, a swipe gesture detected by a touch-sensitive display that travels from top to bottom of the touch-sensitive display can be interpreted as a request to view a map representation of the direction currently being displayed. In other examples, a swipe gesture detected by a touch-sensitive display that travels from bottom to top of the touch-sensitive display can be interpreted as a request to view a map representation of the direction currently being displayed. In other examples, a swipe gesture detected by a touch-sensitive display that travels from left to right on the touch-sensitive display can be interpreted as a request to view a map representation of the direction currently being displayed. In other examples, a swipe gesture detected by a touch-sensitive display that travels from right to left on the touch-sensitive display can be interpreted as a request to view a map representation of the direction currently being displayed. If it is determined that no request to view the map representation has been received, the process can return to block 1206. However, if it is instead determined that a request to view the map representation has been received, the process can proceed to block 1216 where a map view interface corresponding to the previously displayed direction (e.g., the direction being displayed when the request to display the map view was received at block 1210) can be displayed.

Figure 14:
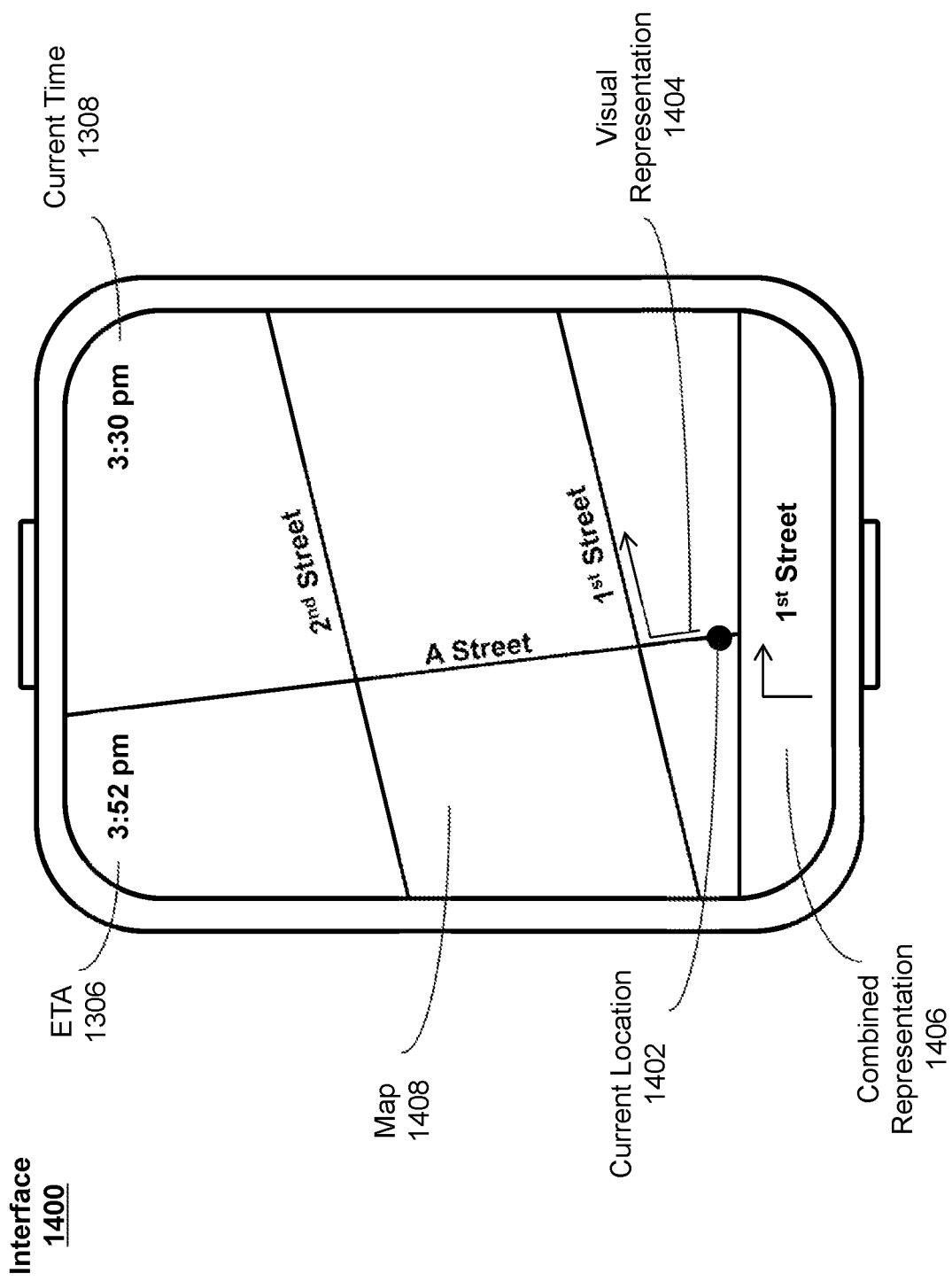

To illustrate the operation of process 1200, FIGS. 14-18 show example interfaces that can be displayed after interface 1300 is displayed and in response to various conditions determined at blocks 1206, 1208, and 1210. For example, if it is determined that a request to view the map view has been received at block 1206 after displaying interface 1300 at block 1204, the electronic device (e.g., user device 602 or 604) can display a map view interface corresponding to the previously displayed direction (e.g., the direction being displayed when the request to display the map view was received at block 1210) at block 1212. FIG. 14 shows an example map view interface 1400 that can be displayed by the electronic device at block 1214 in response to receiving a request to display a map view while interface 1300 was being displayed. As such, interface 1400 can represent the same direction as that represented by interface 1300. In some examples, the request can include a swipe gesture from the top of the touch-sensitive display of the electronic device to the bottom of the touch-sensitive display. As shown, interface 1400 can include a display of a map 1408 associated with the direction represented by the previously displayed route direction interface. Map 1408 can be displayed at a position within the display and at a zoom level that allows current location indicator 1402 to be displayed within map 1408 at a position corresponding to the user's current location. Additionally, map 1408 can be displayed at a position within the display and at a zoom level that allows the current segment of the route (e.g., "A Street") and the next segment of the route (e.g., "$1^{st}$ Street") to be displayed along with an optional visual representation 1404 of the directional instruction of the current direction to navigate from the current segment to the next segment of the route. Interface 1400 can further include combined representation 1406 including both a visual representation (e.g., an arrow) of the directional instruction and a textual representation (e.g., "$1^{st}$ Street") of the name or identifier of the segment associated with the displayed direction. Interface 1400 can further include ETA 1306 and current time 1308 similar to those shown in interface 1300. In some examples, route direction interface 1300 can be displayed in response to receiving a request to view a route direction view (e.g., in response to receiving a swipe gesture in a direction opposite that which caused the map view to be displayed). After displaying the map view interface at block 1216, process 1200 can return to block 1206

Figure 15:
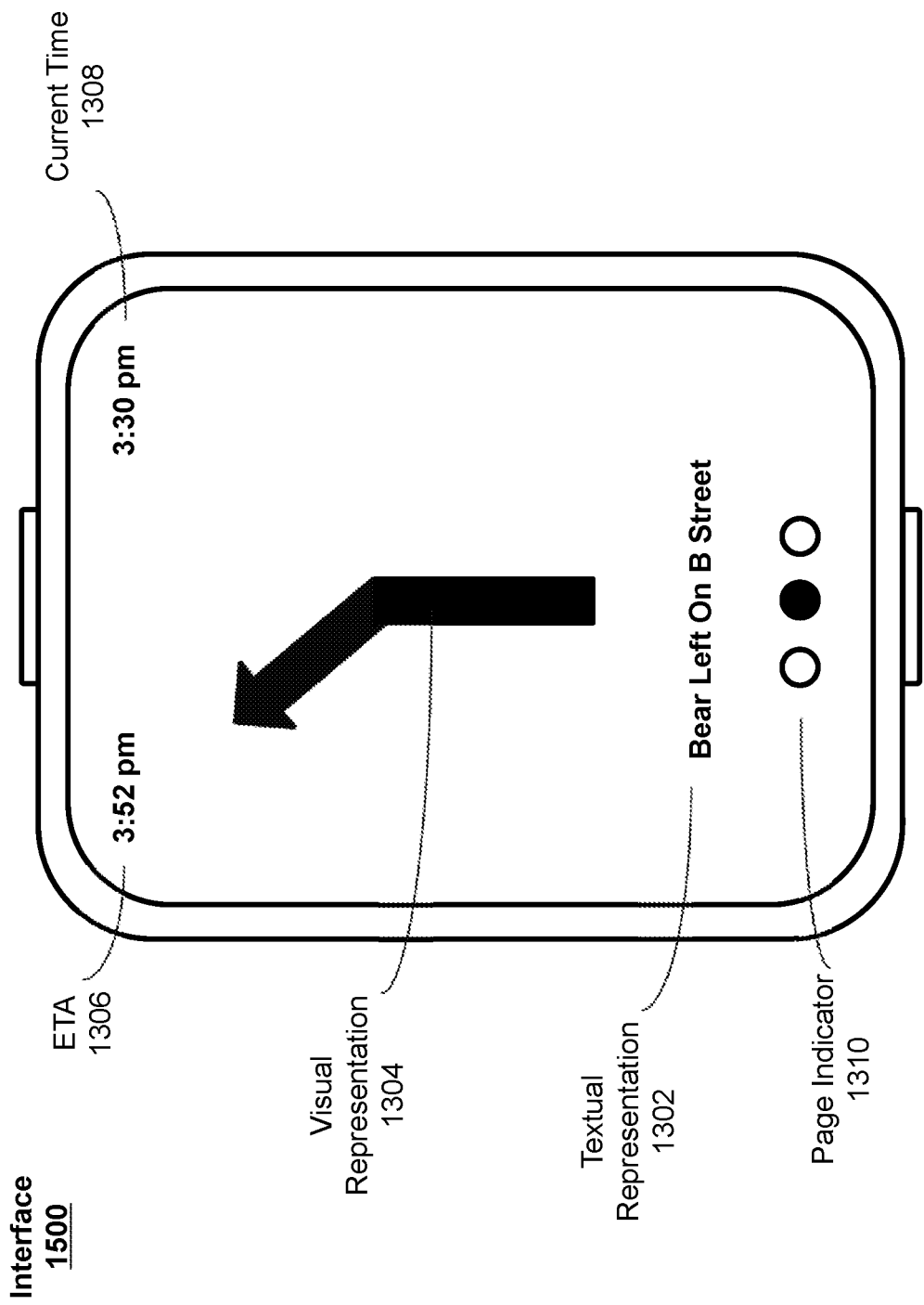

At block 1206, if it is determined that the user's location has changed or if the user's location changed from a location corresponding to the route direction currently displayed to a location corresponding to another route direction in the ordered set of route directions, process 1200 can proceed to block 1212. At block 1212, the electronic device (e.g., user device 602 or 604) can display a route direction interface representing the route direction corresponding to the new location of the user. To illustrate, continuing with the example described above and shown in FIG. 13, if it is determined that the location of the electronic device has moved from a location on "A Street" to a location on "$1^{st}$ Street" (to the right of "A Street" as displayed in interface 1300), the electronic device can display a new route direction interface representing the second direction of the ordered set of direction. FIG. 15 illustrates an example route direction interface 1500 representing the second direction of the ordered set of directions that can be displayed at block 1212. Similar to interface 1300, interface 1500 can include a textual representation 1302 of the displayed direction ("Bear Left On B Street"), a visual representation 1304 of a directional instruction associated with the direction, ETA 1306, current time 1308, and page indicator 1310, which can be updated to reflect the currently displayed direction and its position relative to the other directions of the ordered set of directions. After the new route direction interface is displayed at block 1212, the process can return to block 1206.

Figure 16:
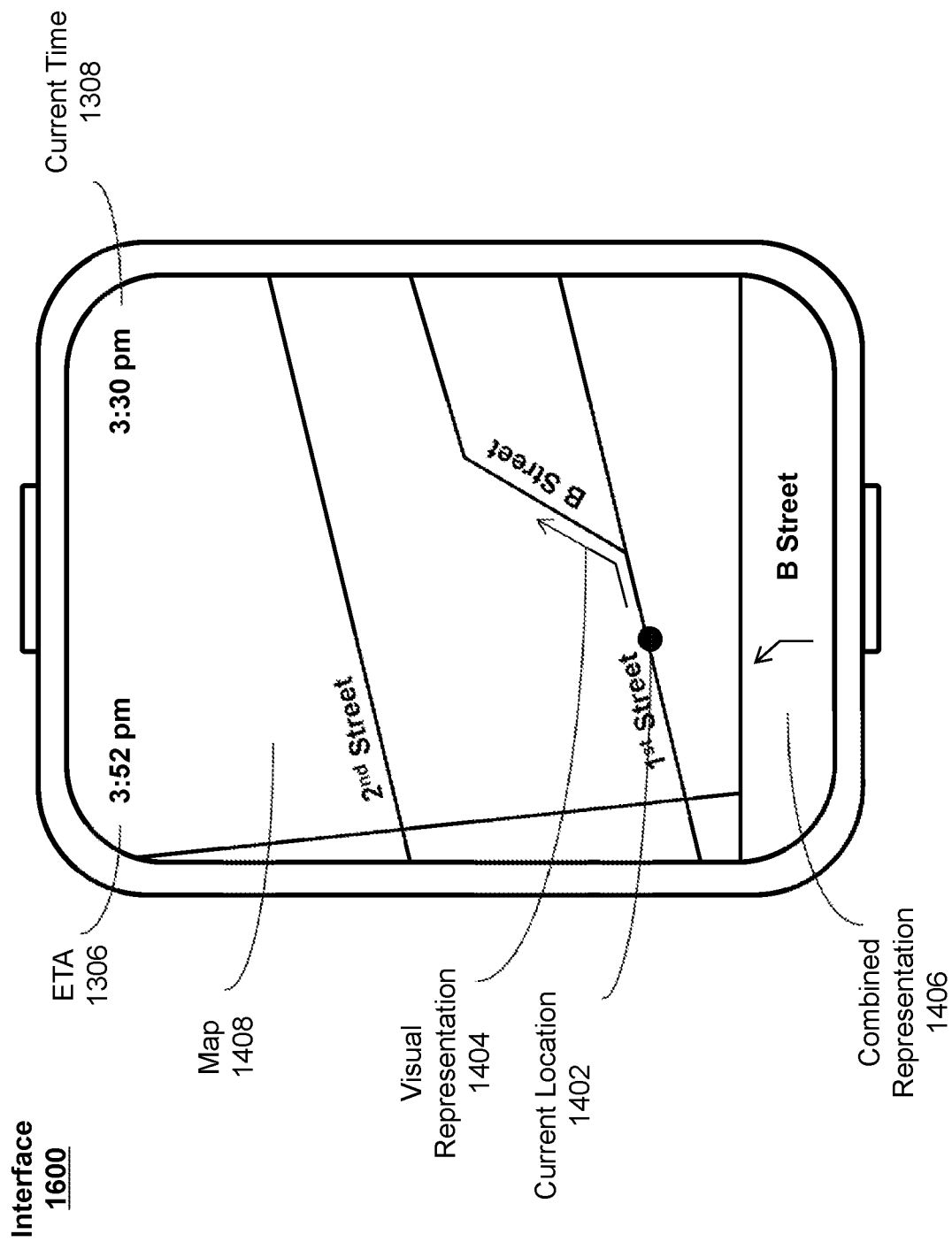
Figure 17:
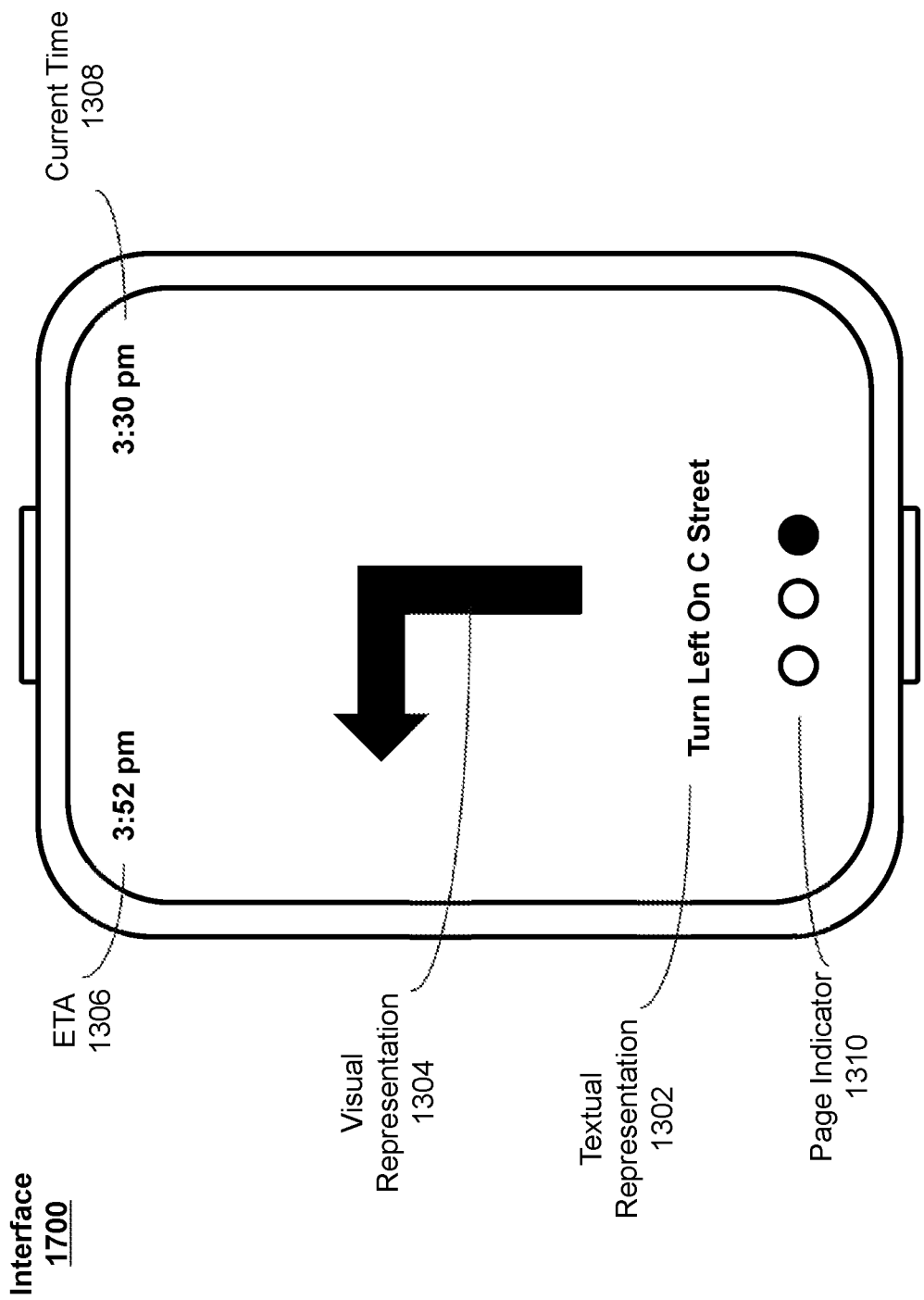

If it is then determined that no location change has occurred at block 1206, that no request to change the displayed direction is received at block 1208, and that a request (e.g., a swipe on the touch-sensitive display) to display a map view of the displayed direction is received at block 1210 while interface 1500 is being displayed (e.g., receiving a swipe gesture from the top of the touch-sensitive display of the electronic device to the bottom of the touch-sensitive display; receiving a swipe gesture from left to right on the touch-sensitive display of the electronic device; or receiving a swipe gesture from right to left on the touch-sensitive display of the electronic device), an interface similar to interface 1600, shown in FIG. 16, (or interface 1400 shown in FIG. 14) can be displayed at block 1216. As such, interface 1600 can represent the same direction as that represented by interface 1500. In some examples, similar to interface 1400, interface 1600 can include a map 1408 associated with the direction represented by the previously displayed route direction interface (interface 1500), current location indicator 1402, visual representation 1404, combined representation 1406, ETA 1306, and current time 1308. In some examples, route direction interface 1500 can be displayed again in response to receiving a request to view a route direction view (e.g., in response to receiving a swipe gesture in a direction opposite that which caused the map view to be displayed). After displaying the map view interface at block 1216, process 1200 can return to block 1206.

In some embodiments, while displaying a map view interface (e.g., 1400, 1600), the device receives user input corresponding to rotation of the rotatable input mechanism. In response to receiving the user input corresponding to the rotation of the rotatable input mechanism, the device pans (e.g., translates) the map view. In some examples, the direction of the pan of the map view is based on the ordered set of route directions. This allows the user view different portions of the map. In some examples, the direction of the pan is along a predetermined axis.

If it is determined that no change in location has occurred at block 1206 and that a request to change the displayed direction is received at block 1208 while interface 1500 is being displayed, the process can proceed to block 1214. At block 1214, the electronic device (e.g., user device 602 or 604) can display a route direction interface representing the direction requested to be displayed at block 1208. For example, if a request to view the next direction in the ordered set of directions was received while interface 1500 was being displayed (e.g., in response to receiving a swipe gesture from the right of the touch-sensitive display of the electronic device to the left of the touch-sensitive display), an interface similar to interface 1700, shown in FIG. 17, can be displayed. Similar to interface 1500, interface 1700 can include a textual representation 1302 of the displayed direction ("Turn Left On C Street"), a visual representation 1304 of a directional instruction associated with the direction, ETA 1306, current time 1308, and page indicator 1310, which can be updated to reflect the currently displayed direction and its position relative to the other directions of the ordered set of directions. After the new route direction interface is displayed at block 1212, the process can return to block 1206.

Figure 18:
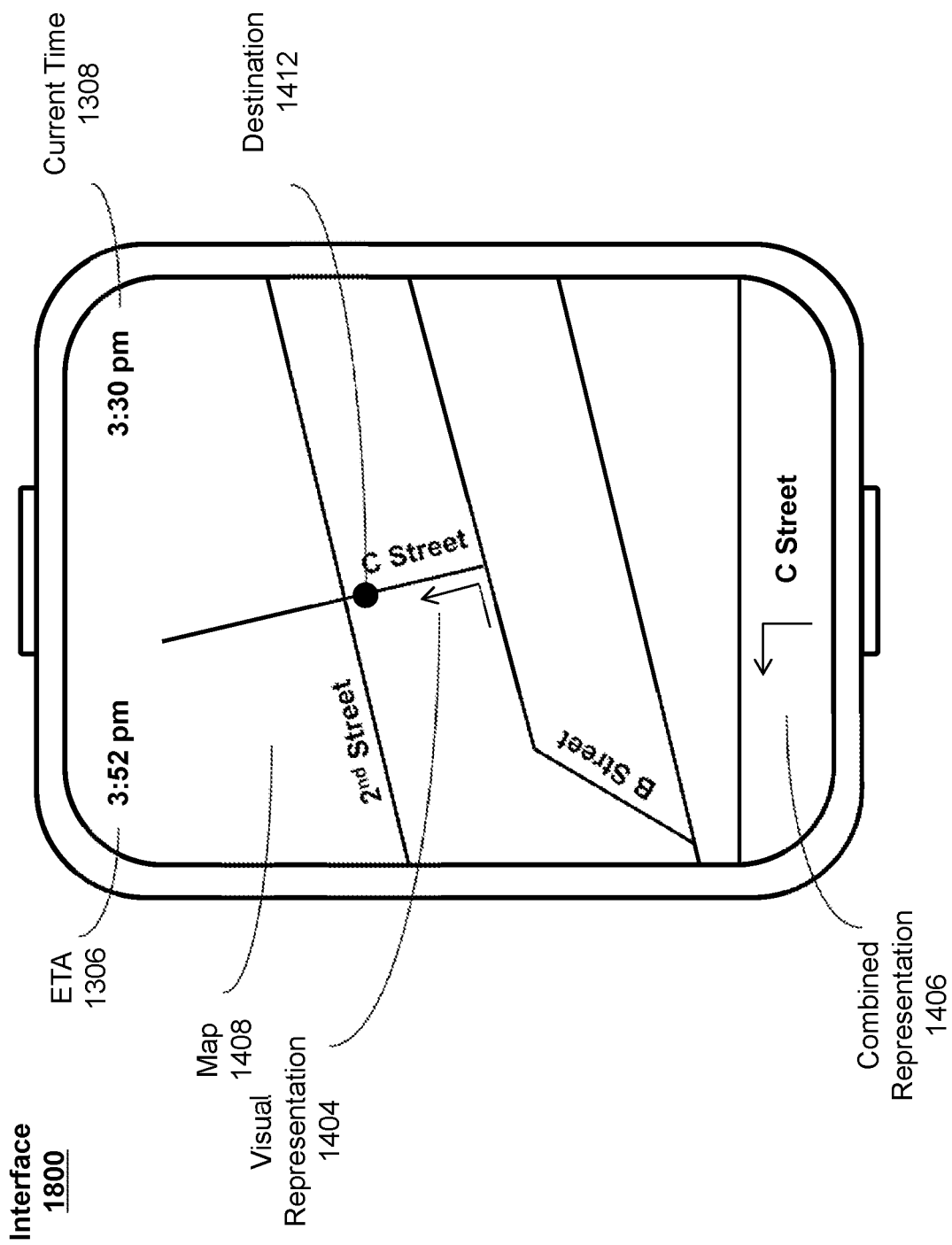

If it is then determined that no location change has occurred at block 1206, that no request to change the displayed direction is received at block 1208, and that a request to display a map view of the displayed direction is received at block 1210 while interface 1700 is being displayed (e.g., receiving a swipe gesture from the top of the touch-sensitive display of the electronic device to the bottom of the touch-sensitive display), an interface similar to interface 1800, shown in FIG. 18, can be displayed at block 1216. As such, interface 1800 can represent the same direction as that represented by interface 1700. In some examples, similar to interface 1600, interface 1800 can include a map 1408 associated with the direction represented by the previously displayed route direction interface (interface 1700), visual representation 1404, combined representation 1406, ETA 1306, and current time 1308. However, unlike interface 1600, interface 1800 may not include current location indicator 1402 since the user is not currently at a location associated with the displayed direction because the user manually selected the displayed location, rather than the displayed location being presented to the user in response to determining that the user is at a location associated with the displayed location. Additionally, since the displayed direction is the last direction in the ordered set of directions, interface 1800 can include a destination indicator 1412 positioned within map 1408 at a location corresponding to the geographic location of the destination. Destination indicator 1412 can include the same or a different visual representation than current location indicator 1402. In some examples, route direction interface 1700 can be displayed again in response to receiving a request to view a route direction view (e.g., in response to receiving a swipe gesture in a direction opposite that which caused the map view to be displayed).

While the blocks of process 1200 are shown in a particular order, it should be appreciated that the blocks can be performed in any order and some blocks may not be performed at all. For example, blocks 1206, 1208, and 1210 can be evaluated in any order and with any desired frequency or at any desired interval of time to determine whether the displayed interface should be changed based on the user's location, a request to change the displayed direction, and a request to display a map view, respectively.

Using process 1200, individual route directions can be presented to a user in manner that allows the user to easily identify the next direction in the route with a quick glance at the user device. Additionally, process 1200 advantageously allows a user to scroll through previous or subsequent directions and to view map representations of the directions to obtain a better understanding of the route being displayed.

Figure 19:
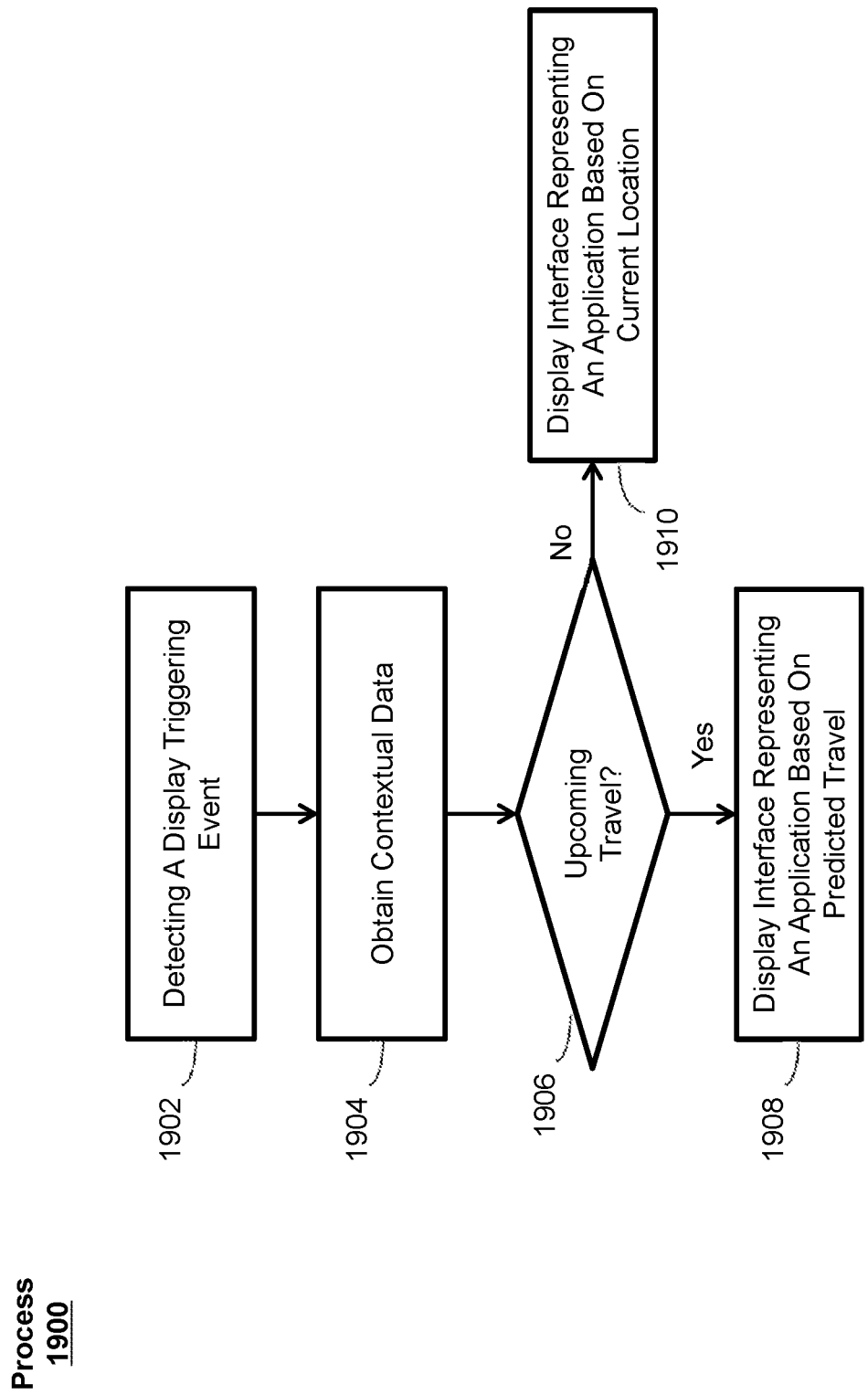
FIG. 19 illustrates another exemplary process for interacting with mapping applications according to various examples.
Figure 20:
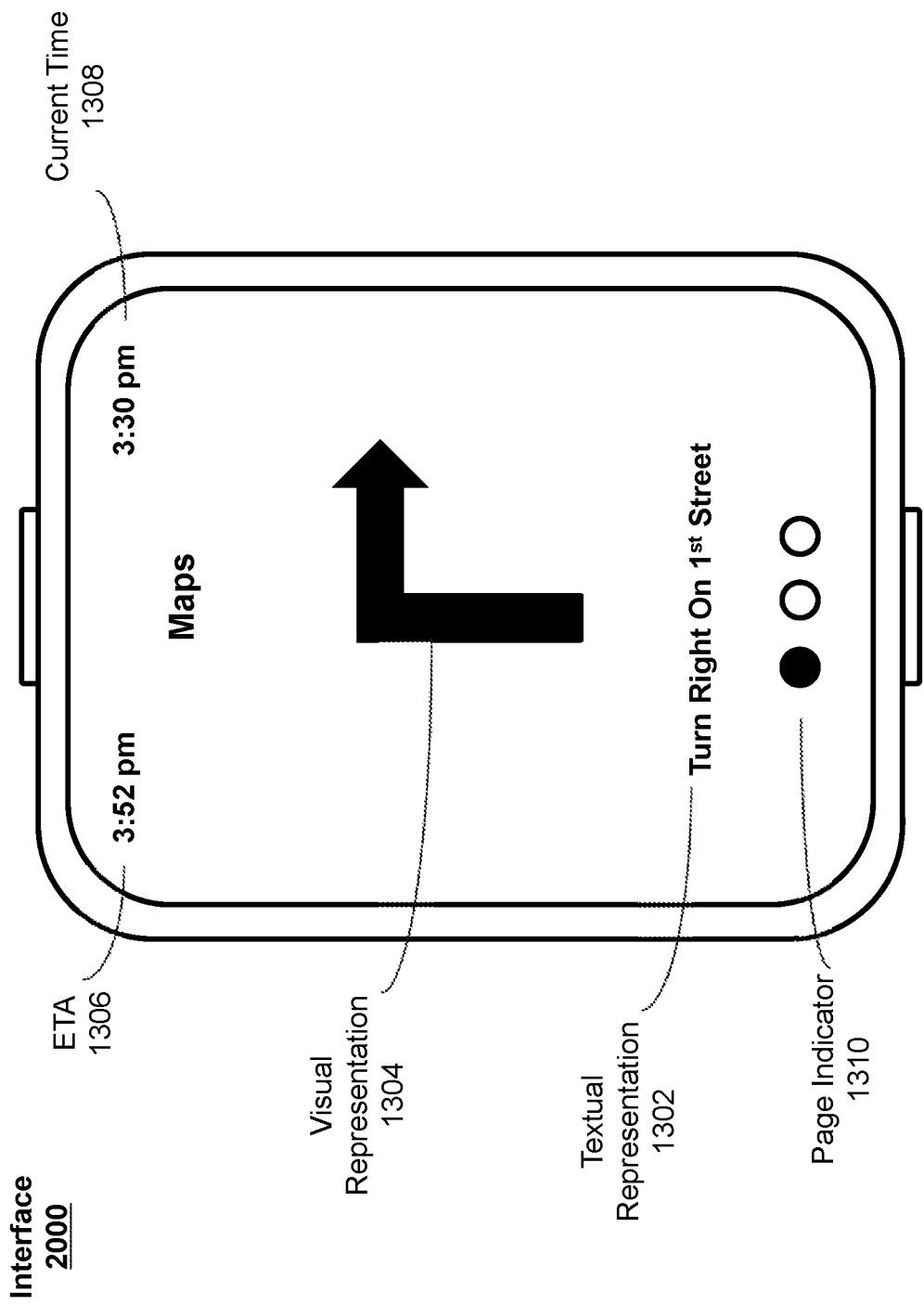
FIGS. 20-22 illustrate example interfaces for interacting with mapping applications according to various examples.

FIG. 19 illustrates an exemplary process 1900 for selectively displaying representations of a mapping application according to various examples. In some examples, process 1900 can be performed using electronic devices similar or identical to device 100, 300, 500, 602, or 604.

At block 1902 of process 1900, an electronic device (e.g., device 602 or 604) can detect a triggering event for activating a display of the electronic device. The triggering event can include any predefined or user-selected event. In some examples, detecting the triggering event can include detecting that the electronic device is moved into a position that can be viewed by a user. For example, if the electronic device is a wearable electronic device, such as a watch, detecting the triggering event can include detecting that the watch is raised and oriented in a direction that would be viewable by the user. In other examples, the triggering event can include the depression of a physical button, a touch on a touch-sensitive display, a press on a pressure-sensitive display, or the like. In response to detecting the triggering event, process 1900 can proceed to block 1904.

At block 1904, the electronic device (e.g., device 602 or 604) can obtain contextual data representing a context of the electronic device. In general, the contextual data can include any type of information associated with the user input that can be used to infer the user's intent. In some examples, the contextual data can include sensor information from user device 602 or 604, such as lighting, ambient noise, ambient temperature, images or videos of the surrounding environment, distance to another object, and the like. The contextual information can additionally or alternatively include information associated with the physical state of user device 602 or 604, such as the device orientation, device location, device temperature, power level, speed, acceleration, motion patterns, cellular signal strength, etc., or the software state of user device 602 or 604, such as running processes, installed programs, past and present network activities, background services, error logs, resources usage, contents displayed on the device, contents of a portion of a map displayed on the device, length of time that a current view has been displayed on the device, length of time since receiving a user input, length of time an application has been opened or running, etc. The contextual data can additionally or alternatively include information associated with the user, such as the user's contact list, calendar, task or to-do list, historical activity data, preferences, or the like.

At block 1906, the electronic device (e.g., device 602 or 604) can determine, based on the contextual data obtained at block 1904, whether it is likely that the user will be traveling to a destination within a threshold length of time. This determination can be made, for example, based on the contextual data obtained at block 1904, which can include appointments (having locations and times) in the user's calendar, items (having locations and times) in the user's task or to-do list, a pattern of the user traveling to the same destination at the same time based on the historical activity of the user, or the like. The threshold length of time can be a predetermined value or can vary depending on the current location of the user and the location of the destination of the predicted travel. For example, the threshold length of time can be greater than or equal to an estimated travel time required for the user to travel from his/her current location to the destination of the predicted travel. This can depend on, for example, the distance to the destination, type of roads being traveled, traffic conditions, the user's mode of the transportation, length of time previously required to travel the same route, or the like. If it is determined that it is likely the user will be traveling, process 1900 can proceed to block 1908. Alternatively, if it is instead determined that it is not likely that the user will be traveling, process 1900 can proceed to block 1910.

At block 1908, the electronic device (e.g., device 602 or 604) can display an interface representing a mapping application based on the traveling predicted to be performed by the user determined at block 1906. The interface can generally include an affordance for opening or launching the mapping application and a set of data associated with the predicted traveling obtained from the mapping application that can be updated based on data from the application. The set of data associated with the predicted travel can include an estimated time of arrival at the destination, an estimated length of time to travel to the destination, one or more directions for traveling to destination, a map comprising at least a portion of a route to the destination, traffic information associated with the route to the destination, or the like. For example, an interface similar to interface 2000, shown in FIG. 20, can be displayed by the electronic device at block 1908. Interface 2000 can display a set of data obtained from the mapping application using the predicted travel determined at block 1906 as an input. For example, interface 2000 can include elements similar to interface 1300, described above, such as a textual representation 1302, visual representation 1304, and page indicator 1310 representing a direction of a set of directions for traveling to the destination of the predicted travel determined at block 1906 as determined by the mapping application. As the user moves, the displayed direction can be updated based on the current direction of the set of directions as determined by the mapping application. Additionally, interface 2000 can further include an estimated time of arrival represented by ETA 1306 and a current time represented by current time 1308.

In some examples, interface 2000 can include an affordance, such as a text label or icon, for opening or launching the represented mapping application. The affordance can include any portion or the entirety of the interface. For example, the affordance can include a virtual button or can include all of interface 2000. The electronic device can open the represented mapping application in response to selection of the affordance. For example, the electronic device can open the mapping application in response to a tap on a touch-sensitive display, a press on a pressure-sensitive display, a swipe gesture performed across a touch-sensitive display, a depression of a physical button, a turn of a rotatable mechanism, a selection of a displayed option, or the like, while interface 2000 is displayed. In some examples, the mapping application can be opened using the predicted travel determined at block 1906 as an input. For example, the mapping application can be opened and the predicted travel can be entered as a desired destination for a navigation route.

In some examples, interface 2000 can be generated using a process or application separate from the mapping application that it represents. In these examples, the mapping application may not be displayed and may instead be executed in the background.

Figure 21:
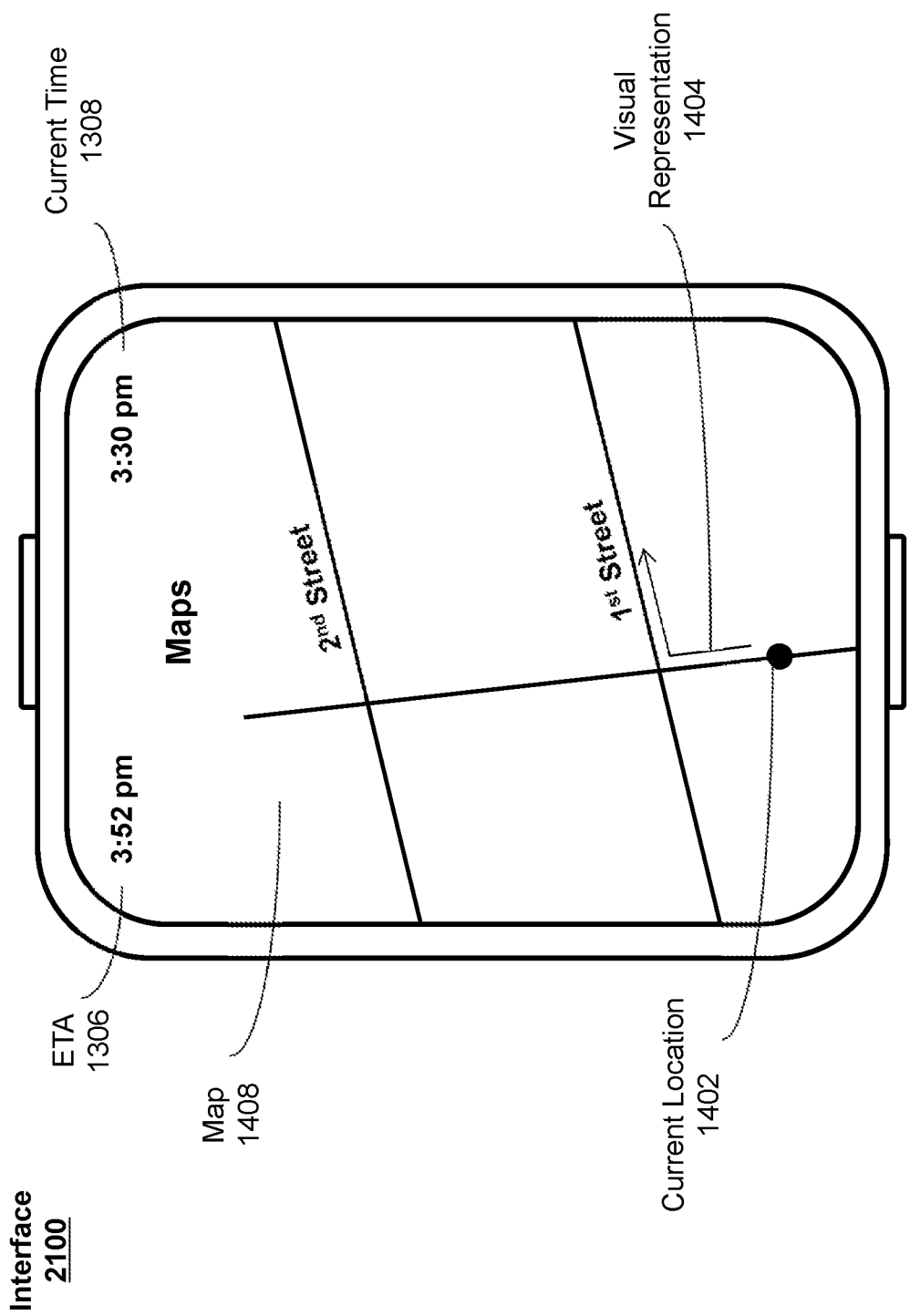
Figure 22:
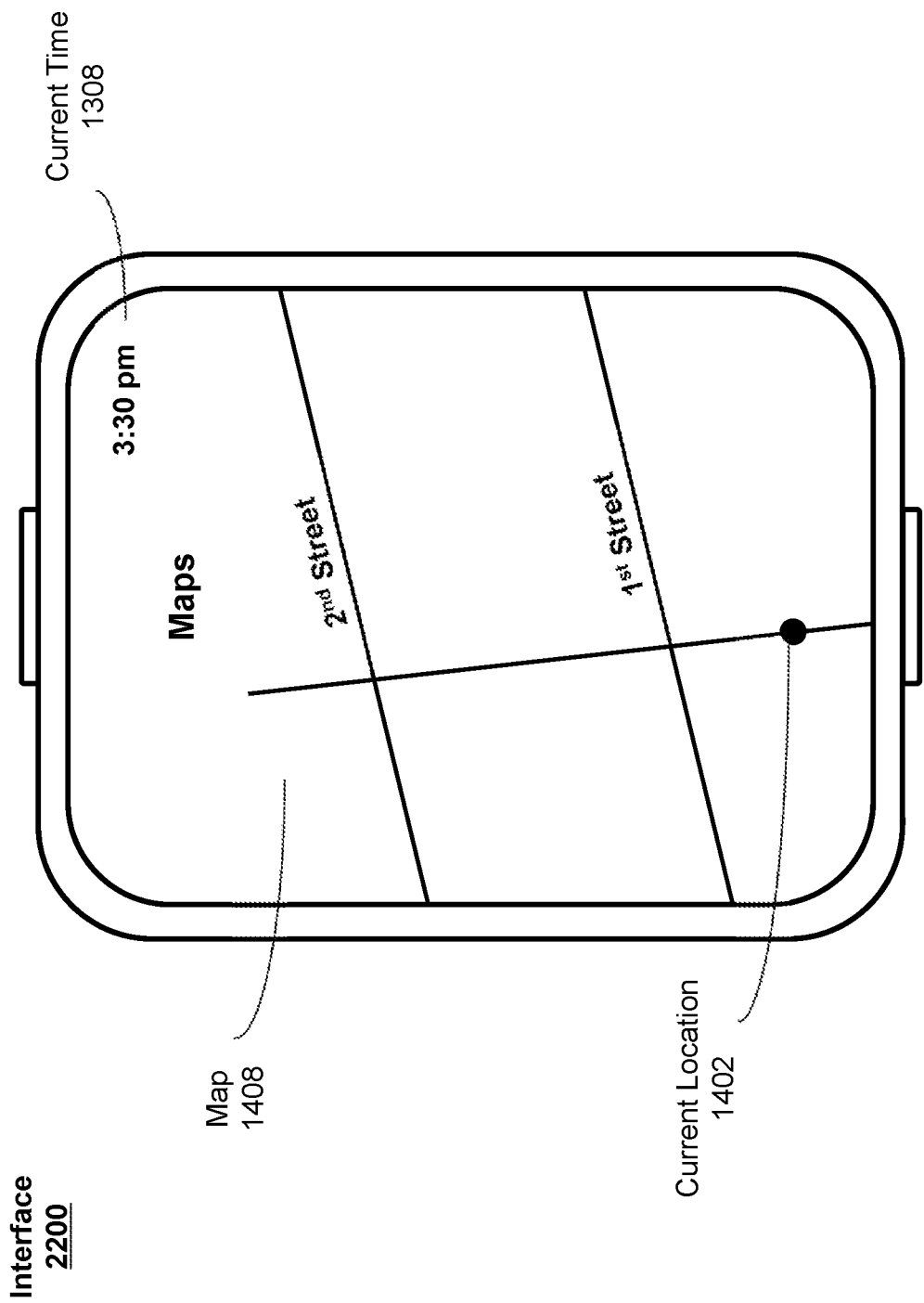

FIG. 21 illustrates another example interface 2100 that can be displayed at block 1908. Interface 2100 can display a set of data associated with the predicted traveling and obtained from the mapping application using the predicted travel determined at block 1906 as an input. For example, interface 2100 can include elements similar to interface 1400, described above, such as map 1408 and visual representation 1404 representing a direction of a set of directions for traveling to the destination of the expected travel determined at block 1906 as determined by the mapping application. As the user moves, the displayed direction can be updated based on the current direction of the set of directions as determined by the mapping application. Additionally, interface 2100 can further include current location indicator 1402, an estimated time of arrival represented by ETA 1306, and a current time represented by current time 1308.

In some examples, interface 2000 can include an affordance, such as a text label or icon, for opening or launching the represented mapping application. The affordance can include any portion or the entirety of the interface. For example, the affordance can include a virtual button or can include all of interface 2000. The electronic device can open the represented mapping application in response to selection of the affordance. For example, the electronic device can open the mapping application in response to a tap on a touch-sensitive display, a press on a pressure-sensitive display, a swipe gesture performed across a touch-sensitive display, a depression of a physical button, a turn of a rotatable mechanism, a selection of a displayed option, or the like, while interface 2000 is displayed. In some examples, the mapping application can be opened using the expected travel determined at block 1906 as an input. For example, the mapping application can be opened and the expected travel can be entered as a desired destination for a navigation route.

In some examples, interface 2100 can be generated using a process or application separate from the mapping application that it represents. In these examples, the mapping application may not be displayed and may instead be executed in the background.

At block 1910, the electronic device (e.g., device 602 or 604) can display an interface representing a mapping application based on the current location of the user since no predicted travel was determined at block 1906. The interface can generally include an affordance for opening or launching the mapping application and information associated with the user's current location. For example, an interface similar to interface 2200, shown in FIG. 22, can be displayed by the electronic device at block 1910. Interface 2200 can include elements similar to interface 1400, described above, such as current location indicator 1402, map 1408, and current time 1308. Since no travel is expected, there may not be navigation route to a destination. As a result, interface 2200 may not include visual representation 1404 or ETA 1306. In some examples, interface 2200 can include an affordance for opening or launching the represented mapping application. The affordance can include any portion or the entirety of the interface. For example, the affordance can include a virtual button or can include all of interface 2200. The electronic device can open the represented mapping application in response to selection of the affordance. For example, the electronic device can open the mapping application in response to a tap on a touch-sensitive display, a press on a pressure-sensitive display, a swipe gesture performed across a touch-sensitive display, a depression of a physical button, a turn of a rotatable mechanism, a selection of a displayed option, or the like, while interface 2200 is displayed. In some examples, the mapping application can be opened and can display the user's current location since no navigation route to a destination has been determined.

Using process 1900, an electronic device can advantageously present the user with an interface containing an affordance for easily opening a mapping application. Additionally, the interface can advantageously modify the type of information presented in the interface to include information that is likely relevant to the user as determined by the electronic device based on contextual information. Moreover, the electronic device can launch the mapping application using the information displayed within the interface to reduce the amount of input required from the user to cause the mapping application to perform a desired function.

Figure 23:
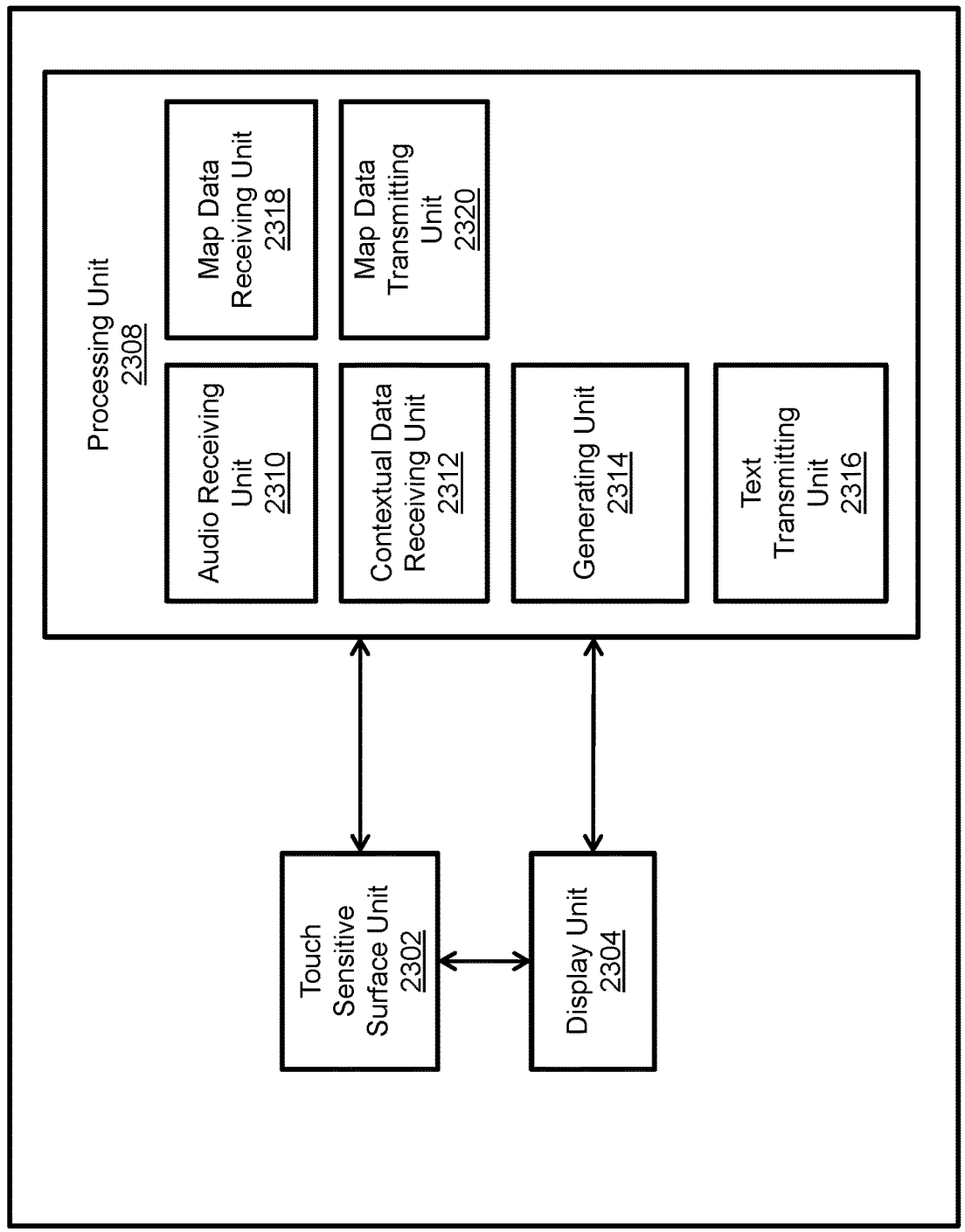
FIGS. 23-26 illustrate functional block diagrams of electronic devices according to various examples.

FIG. 23 shows a functional block diagram of an electronic device 2300 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 23 can be combined or separated into sub-blocks to implement the principles of the various described examples. Therefore, the description herein optionally supports any possible combination or separation or further definition of the functional blocks described herein.

As shown in FIG. 23, electronic device 2300 can include a display unit 2304 configured to display graphical objects, a touch-sensitive surface unit 2302 configured to receive user gestures, and a processing unit 2308. In some examples, processing unit 2308 can include an audio receiving unit 2310, a contextual data receiving unit 2312, a generating unit 2314, a text transmitting unit 2316, a map data receiving unit 2318, and a map data transmitting unit 2320.

Processing unit 2308 can be configured to receive (e.g., using audio receiving unit 2310) data corresponding to an audio input comprising user speech. Contextual data receiving unit 2312 can be configured to receive contextual data representing a context of the user speech. Generating unit 2314 can generate a textual representation of the user speech based on the data corresponding to the audio input. Text transmitting unit 2316 can transmit, to a map server, the textual representation of the user speech and the contextual data. Map data receiving unit 2318 can receive, from the map server, map data and map data transmitting unit 2320 can transmit the map data to the electronic device.

In some examples, the contextual data can include a location of the electronic device. In other examples, the contextual data can include a software state of the electronic device. In other examples, the contextual data can include a content being displayed by the electronic device. In other examples, the contextual data can include a state of a mapping application running on the electronic device. In some examples, the current state of the mapping application can include a current view of the mapping application being displayed on the electronic device. In some examples, the current state of the mapping application can include a length of time that the current view of the mapping application has been displayed. In some examples, the contextual data can include length of time since the electronic device received a user input.

In some examples, the map data can include: one or more map tiles, a set of geographic coordinates, routing information from a start location to an end location, or traffic data. In some examples, the textual representation of the user speech is not transmitted to the electronic device.

Figure 24:
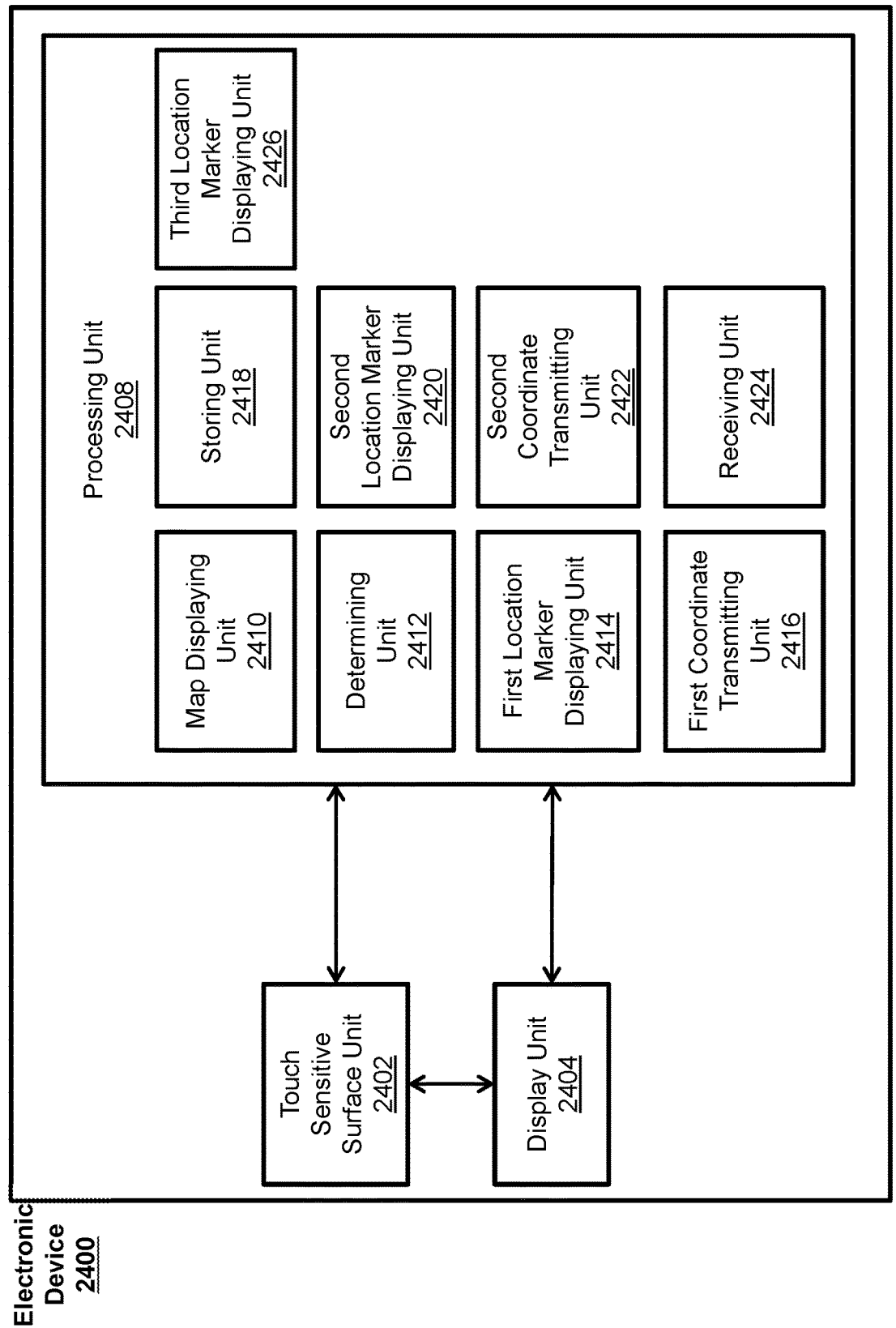

FIG. 24 shows a functional block diagram of an electronic device 2400 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 24 can be combined or separated into sub-blocks to implement the principles of the various described examples. Therefore, the description herein optionally supports any possible combination or separation or further definition of the functional blocks described herein.

As shown in FIG. 24, electronic device 2400 can include a display unit 2404 configured to display graphical objects, a touch-sensitive surface unit 2402 configured to receive user gestures, and a processing unit 2408. In some examples, processing unit 2408 can include a map displaying unit 2410, a determining unit 2412, a first location marker displaying unit 2414, a first geographic coordinate transmitting unit 2416, a storing unit 2418, a second location marker displaying unit 2420, a second coordinate transmitting unit 2422, a receiving unit 2424, and a third location marker displaying unit 2426.

Processing unit 2408 can be configured to cause (e.g., using map displaying unit 2410), on a display of a first electronic device, a display of a map. Determining unit 2412 can determine whether a first request to mark a first location on the map has been received. First location marker displaying unit 2414 can cause, on the display of the first electronic device, a display of a first location marker on the map at a position within the display corresponding to the first location in accordance with a determination that the first request to mark the first location on the map has been received. First geographic coordinate transmitting unit 2416 can transmit, to a second electronic device, a first set of geographic coordinates corresponding to the first location in accordance with a determination that the first request to mark the first location on the map has been received.

In some examples, storing unit 2418 can be configured to store, at the first electronic device, the first set of geographic coordinates.

In some examples, first location marker displaying unit 2414 can be further configured to cause, on the display of the first electronic device, a display of information associated with the first location. In some examples, the information associated with the first location can include an address, a street name, a name of a city, a name of a country, a zip code, or an estimated travel time to the first location.

In some examples, determining unit 2412 can be configured to determine whether the first request to mark the first location on the map has been received by determining whether a touch has been detected at the position within the display corresponding to the first location for more than a threshold length of time.

In some examples, determining unit 2412 can be further configured to determine whether a second request to mark a second location on the map has been received. Second location marker displaying unit 2420 can be configured to cause, on the display of the first electronic device, a display of a second location marker overlaid on the map at a position within the display corresponding to the second location in accordance with a determination that the second request to mark the second location on the map has been received. Second coordinate transmitting unit 2422 can be configured to transmit, to the second electronic device, a second set of geographic coordinates corresponding to the second location in accordance with a determination that the second request to mark the second location on the map has been received.

In some examples, second location marker displaying unit 2420 can configured to cause, on the display of the first electronic device, the display of the second location marker overlaid on the map by removing the first location marker from the display of the first electronic device. In some examples, storing unit 2418 can be configured to replace the stored first set of geographic coordinates with the second set of geographic coordinates.

In some examples, receiving unit 2424 can be configured to receive, at the first electronic device, a third set of geographic coordinates from the second electronic device. In some examples, storing unit 2418 can be further configured to replace the stored first set of geographic coordinates with the third set of geographic coordinates. In some examples, third location marker displaying unit 2426 can be configured to cause, on the display of the first electronic device, a display of a third location marker overlaid on the map at a position within the display corresponding to the third set of geographic coordinates.

In some examples, third location marker displaying unit 2426 can be further configured to cause, on the display of the first electronic device, the display of the third location marker overlaid on the map further by removing the first location marker from the display of the first electronic device.

Figure 25:
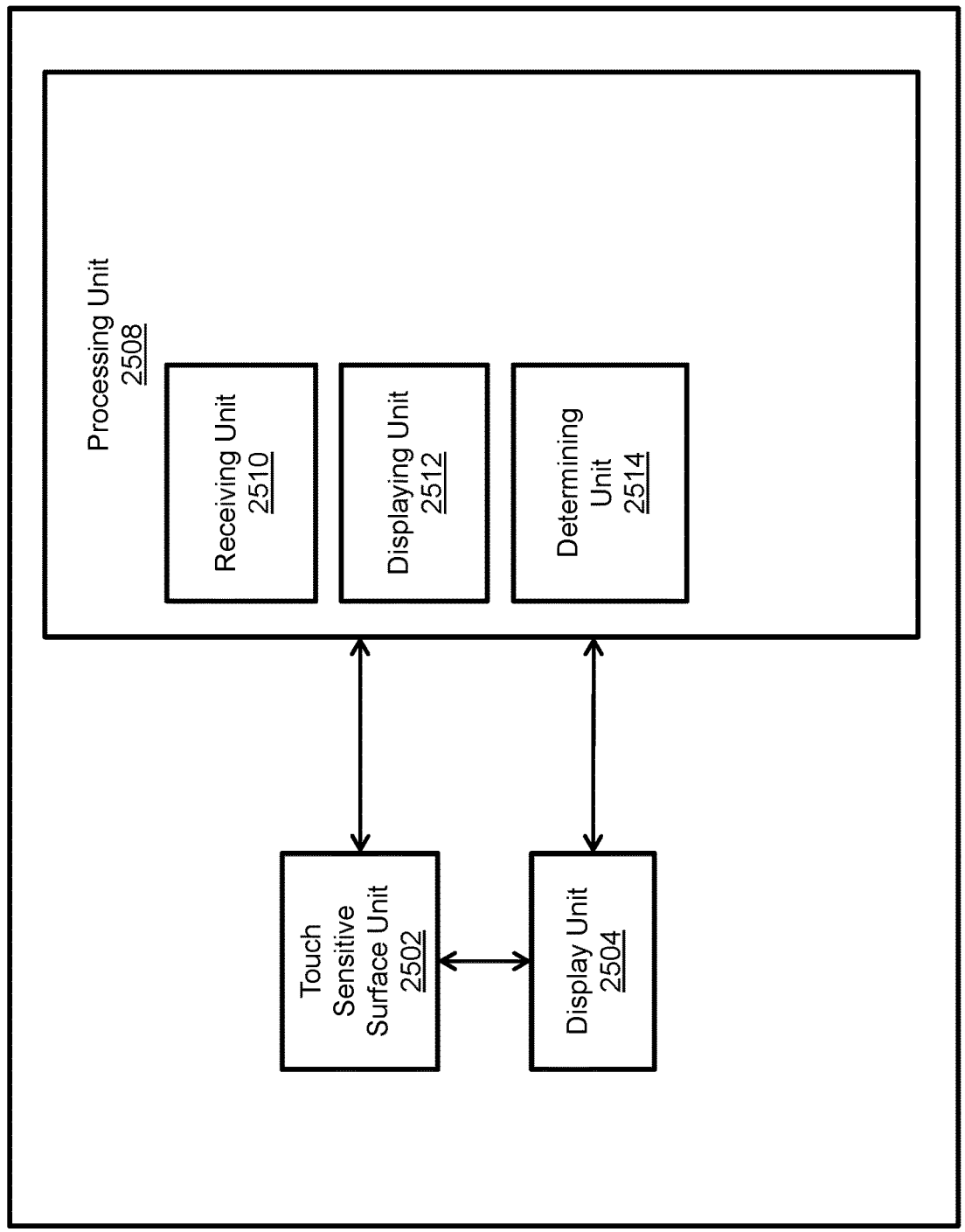

FIG. 25 shows a functional block diagram of an electronic device 2500 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 25 can be combined or separated into sub-blocks to implement the principles of the various described examples. Therefore, the description herein optionally supports any possible combination or separation or further definition of the functional blocks described herein.

As shown in FIG. 25, electronic device 2500 can include a display unit 2504 configured to display graphical objects, a touch-sensitive surface unit 2502 configured to receive user gestures, and a processing unit 2508. In some examples, processing unit 2508 can include a receiving unit 2510, a displaying unit 2512, and a determining unit 2514.

Processing unit 2508 can be configured to receive (e.g., using receiving unit 2510) an ordered set of route directions for navigating a route from a start location to an end location, wherein the route comprises a plurality of segments. Displaying unit 2512 can cause a display of first route direction interface associated with a first route direction of the set of route directions, wherein the first route direction is associated with a first segment of the plurality of segments and comprises a first directional instruction and a first segment identifier associated with the first segment, and wherein the first route direction interface comprises: a first textual description of the first directional instruction and the first segment identifier and a first visual representation of the first directional instruction.

In some examples, the first route direction interface excludes a map. In some examples, the first route direction interface excludes a view of any of the plurality of segments. In some examples, the first visual representation consists of an image of an arrow. In some examples, the first directional instruction includes an instruction to turn or an instruction to travel straight. In some examples, the first route direction interface further includes an estimated time of arrival at the end location.

In some examples, determining unit 2515 can be configured to determine whether a location of the electronic device corresponds to a second segment of the plurality of segments. In some examples, displaying unit 2512 can be configured to replace, in accordance with a determination that the location of the electronic device corresponds to the second segment of the plurality of segments, the first route direction interface with a second route direction interface associated with a second route direction of the set of route directions, wherein the second route direction is associated with the second segment of the plurality of segments and comprises a second directional instruction and a second segment identifier associated with the second segment, and wherein the second route direction interface comprises a second textual description of the second directional instruction and the second segment identifier and a second visual representation of the second directional instruction.

In some examples, determining unit 2512 can be configured to determine whether a request to view a third direction of the set of route directions has been received. In some examples, displaying unit 2512 can be configured to replace, in accordance with a determination that the request to view the third direction of the set of route directions has been received, the first route direction interface with a third route direction interface associated with a third route direction of the set of route directions, wherein the third route direction is associated with the third segment of the plurality of segments and comprises a third directional instruction and a third segment identifier associated with the third segment, and wherein the third route direction interface comprises: a third textual description of the third directional instruction and the third segment identifier and a third visual representation of the third directional instruction.

In some examples, determining unit 2512 can be configured to determine whether the request to view the third direction of the set of route directions has been received by determining whether a swipe gesture has been detected across the display of the electronic device. In some examples, the swipe gesture includes a horizontal swipe gesture.

In some examples, determining unit 2514 can be configured to determine whether a request to view a map view of the first direction has been received. In some examples, displaying unit 2512 can be configured to replace, in accordance with a determination that the request to view the map view of the first direction has been received, the first route direction interface with a first map view interface associated with the first route direction, wherein the first map view interface comprises a map comprising the first segment and a combined textual and visual representation of the first direction.

In some examples, determining unit 2514 can be configured to determine whether the request to view the map view of the first direction has been received by determining whether a swipe gesture has been detected across the display of the electronic device. In some examples, the swipe gesture includes a vertical swipe gesture.

Figure 26:
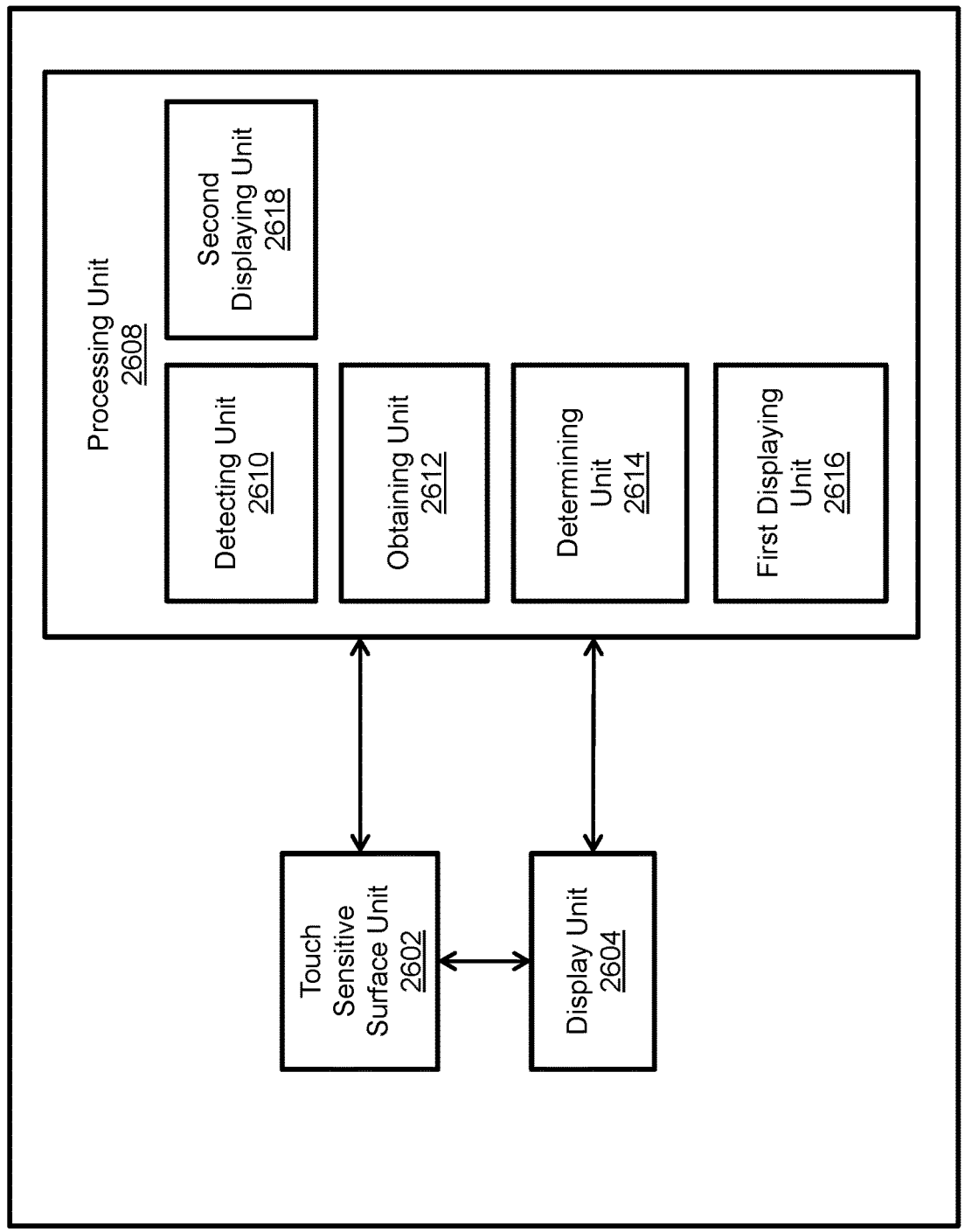

FIG. 26 shows a functional block diagram of an electronic device 2600 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 26 can be combined or separated into sub-blocks to implement the principles of the various described examples. Therefore, the description herein optionally supports any possible combination or separation or further definition of the functional blocks described herein.

As shown in FIG. 26, electronic device 2600 can include a display unit 2604 configured to display graphical objects, a touch-sensitive surface unit 2602 configured to receive user gestures, and a processing unit 2608. In some examples, processing unit 2608 can include a detecting unit 2610, obtaining unit 2612, determining unit 2614, first displaying unit 2616, and a second displaying unit 2618.

Processing unit 2608 can be configured to detect (e.g., using detecting unit 2610) a display triggering event. Obtaining unit 2612 can be configured to obtain contextual data representing a context of the electronic device in accordance with a detection of the display triggering event. Determining unit 2614 can be configured to determine, based on the contextual data, whether a user is likely to be traveling to a destination within a threshold length of time. First displaying unit 2616 can be configured to cause a display of a first interface representing a mapping application in accordance with a determination that the user is likely to be traveling to the destination within the threshold length of time, wherein the first interface representing the mapping application comprises: a first affordance for launching the mapping application and a set of information associated with traveling to the destination. Second displaying unit 2616 can be configured to cause a display of a second interface representing the mapping application in accordance with a determination that the user is not likely to be traveling to the destination within the threshold length of time, wherein the second interface representing the mapping application comprises: a second affordance for launching the mapping application and a visual representation of a location of the electronic device.

In some examples, the threshold length of time is greater than or equal to an estimated travel time to the destination.

In some examples, the contextual data comprises the user's calendar data and determining unit 2614 can be configured to determine whether the user is likely to be traveling to a destination by determining whether the user has a scheduled appointment within the threshold length of time based on the calendar data, the scheduled appointment associated with the destination.

In some examples, the contextual data includes the user's task list data and determining unit 2614 can be configured to determine whether the user is likely to be traveling to a destination by determining whether the user has a scheduled task to perform within the threshold length of time based on the task list data, the scheduled task associated with the destination.

In some examples, the contextual data includes the user's historical activity data and determining unit 2614 can be configured to determine whether the user is likely to be traveling to a destination by determining whether the user has a pattern of traveling to the destination at a time during a day, wherein the time during the day is within the threshold length of time from a current time.

In some examples, the set of information associated with traveling to the destination includes: an estimated time of arrival at the destination, an estimated length of time to travel to the destination, one or more directions for traveling to destination, a map comprising at least a portion of a route to the destination, or traffic information associated with the route to the destination.

In some examples, the mapping application is executing on the electronic device and is not displayed on the display.

In some examples, detecting unit 2610 can be further configured to detect a selection of the first affordance and first displaying unit 2616 can be configured to replace, in response to detecting the selection of the first affordance, the display of the first interface with a display of the mapping application.

In some examples, detecting unit 2610 can be further configured to detect a selection of the second affordance and second displaying unit 2618 can be configured to replace, in response to detecting the selection of the second affordance, the display of the second interface with a display of the mapping application.

In some examples, the display triggering event includes the electronic device being oriented in a predetermined orientation. In other examples the display triggering event includes a touch detected at the display of the electronic device.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A first electronic device, comprising:
   a display;
   one or more processors; and
   memory storing one or more programs configured to be executed by the one or more processors, the one or more programs including instructions for:
   causing, on the display of the first electronic device, a display of a map;
   determining whether a first request to mark a first location on the map has been received; and
   in accordance with a determination that the first request to mark the first location on the map has been received:
   causing, on the display of the first electronic device, a display of a first location marker on the map at a position within the display corresponding to the first location; and
   transmitting, to a second electronic device, a first set of geographic coordinates corresponding to the first location, wherein the second electronic device is associated with a same user account as the first electronic device.

2. The first electronic device of claim 1, the one or more programs further including instructions for:
   storing, at the first electronic device, the first set of geographic coordinates.

3. The first electronic device of claim 1, the one or more programs further including instructions for:
   causing, on the display of the first electronic device, a display of information associated with the first location.

4. The first electronic device of claim 3, wherein the information associated with the first location comprises an address, a street name, a name of a city, a name of a country, a zip code, or an estimated travel time to the first location.

5. The first electronic device of claim 1, wherein determining whether the first request to mark the first location on the map has been received comprises determining whether a touch has been detected at the position within the display corresponding to the first location for more than a threshold length of time.

6. The first electronic device of claim 1, the one or more programs further including instructions for:
   determining whether a second request to mark a second location on the map has been received; and
   in accordance with a determination that the second request to mark the second location on the map has been received:
   causing, on the display of the first electronic device, a display of a second location marker overlaid on the map at a position within the display corresponding to the second location; and
   transmitting, to the second electronic device, a second set of geographic coordinates corresponding to the second location.

7. The first electronic device of claim 6, wherein causing, on the display of the first electronic device, the display of the second location marker overlaid on the map further comprises removing the first location marker from the display of the first electronic device.

8. The first electronic device of claim 6, the one or more programs further including instructions for:
   storing, at the first electronic device, the first set of geographic coordinates; and
   replacing the stored first set of geographic coordinates with the second set of geographic coordinates.

9. The first electronic device of claim 1, the one or more programs further including instructions for:
   receiving, at the first electronic device, a third set of geographic coordinates from the second electronic device.

10. The first electronic device of claim 9, the one or more programs further including instructions for:
    storing, at the first electronic device, the first set of geographic coordinates;
    replacing the stored first set of geographic coordinates with the third set of geographic coordinates; and
    causing, on the display of the first electronic device, a display of a third location marker overlaid on the map at a position within the display corresponding to the third set of geographic coordinates.

11. The first electronic device of claim 10, wherein causing, on the display of the first electronic device, the display of the third location marker overlaid on the map further comprises removing the first location marker from the display of the first electronic device.

12. The first electronic device of claim 1, wherein the first electronic device and the second electronic device are paired.

13. A non-transitory computer-readable storage medium storing one or more programs configured to be executed by one or more processors of a first electronic device with a display, the one or more programs including instructions for:
    causing, on the display of the first electronic device, a display of a map;
    determining whether a first request to mark a first location on the map has been received; and
    in accordance with a determination that the first request to mark the first location on the map has been received:
    causing, on the display of the first electronic device, a display of a first location marker on the map at a position within the display corresponding to the first location; and
    transmitting, to a second electronic device, a first set of geographic coordinates corresponding to the first location, wherein the second electronic device is associated with a same user account as the first electronic device.

14. The non-transitory computer-readable storage medium of claim 13, the one or more programs further including instructions for:
  storing, at the first electronic device, the first set of geographic coordinates.

15. The non-transitory computer-readable storage medium of claim 13, the one or more programs further including instructions for:
  causing, on the display of the first electronic device, a display of information associated with the first location.

16. The non-transitory computer-readable storage medium of claim 15, wherein the information associated with the first location comprises an address, a street name, a name of a city, a name of a country, a zip code, or an estimated travel time to the first location.

17. The non-transitory computer-readable storage medium of claim 13, wherein determining whether the first request to mark the first location on the map has been received comprises determining whether a touch has been detected at the position within the display corresponding to the first location for more than a threshold length of time.

18. The non-transitory computer-readable storage medium of claim 13, the one or more programs further including instructions for:
  determining whether a second request to mark a second location on the map has been received; and
  in accordance with a determination that the second request to mark the second location on the map has been received:
    causing, on the display of the first electronic device, a display of a second location marker overlaid on the map at a position within the display corresponding to the second location; and
    transmitting, to the second electronic device, a second set of geographic coordinates corresponding to the second location.

19. The non-transitory computer-readable storage medium of claim 18, wherein causing, on the display of the first electronic device, the display of the second location marker overlaid on the map further comprises removing the first location marker from the display of the first electronic device.

20. The non-transitory computer-readable storage medium of claim 18, the one or more programs further including instructions for:
  storing, at the first electronic device, the first set of geographic coordinates; and
  replacing the stored first set of geographic coordinates with the second set of geographic coordinates.

21. The non-transitory computer-readable storage medium of claim 13, the one or more programs further including instructions for:
  receiving, at the first electronic device, a third set of geographic coordinates from the second electronic device.

22. The non-transitory computer-readable storage medium of claim 21, the one or more programs further including instructions for:
  storing, at the first electronic device, the first set of geographic coordinates;
  replacing the stored first set of geographic coordinates with the third set of geographic coordinates; and
  causing, on the display of the first electronic device, a display of a third location marker overlaid on the map at a position within the display corresponding to the third set of geographic coordinates.

23. The non-transitory computer-readable storage medium of claim 22, wherein causing, on the display of the first electronic device, the display of the third location marker overlaid on the map further comprises removing the first location marker from the display of the first electronic device.

24. The non-transitory computer-readable storage medium of claim 13, wherein the first electronic device and the second electronic device are paired.

25. A method, comprising:
  at a first electronic device with a display:
    causing, on a display of the first electronic device, a display of a map;
    determining whether a first request to mark a first location on the map has been received; and
    in accordance with a determination that the first request to mark the first location on the map has been received:
      causing, on the display of the first electronic device, a display of a first location marker on the map at a position within the display corresponding to the first location; and
      transmitting, to a second electronic device, a first set of geographic coordinates corresponding to the first location, wherein the second electronic device is associated with a same user account as the first electronic device.

26. The method of claim 25, the method further comprising:
  storing, at the first electronic device, the first set of geographic coordinates.

27. The method of claim 25, the method further comprising:
  causing, on the display of the first electronic device, a display of information associated with the first location.

28. The method of claim 27, wherein the information associated with the first location comprises an address, a street name, a name of a city, a name of a country, a zip code, or an estimated travel time to the first location.

29. The method of claim 25, wherein determining whether the first request to mark the first location on the map has been received comprises determining whether a touch has been detected at the position within the display corresponding to the first location for more than a threshold length of time.

30. The method of claim 25, the method further comprising:
  determining whether a second request to mark a second location on the map has been received; and
  in accordance with a determination that the second request to mark the second location on the map has been received:
    causing, on the display of the first electronic device, a display of a second location marker overlaid on the map at a position within the display corresponding to the second location; and
    transmitting, to the second electronic device, a second set of geographic coordinates corresponding to the second location.

31. The method of claim 30, wherein causing, on the display of the first electronic device, the display of the second location marker overlaid on the map further comprises removing the first location marker from the display of the first electronic device.

32. The method of claim 30, the method further comprising:
- storing, at the first electronic device, the first set of geographic coordinates; and
- replacing the stored first set of geographic coordinates with the second set of geographic coordinates.

33. The method of claim 25, the method further comprising:
- receiving, at the first electronic device, a third set of geographic coordinates from the second electronic device.

34. The method of claim 33, the method further comprising:
- at the first electronic device:
  - storing, at the first electronic device, the first set of geographic coordinates;
  - replacing the stored first set of geographic coordinates with the third set of geographic coordinates; and
  - causing, on the display of the first electronic device, a display of a third location marker overlaid on the map at a position within the display corresponding to the third set of geographic coordinates.

35. The method of claim 34, wherein causing, on the display of the first electronic device, the display of the third location marker overlaid on the map further comprises removing the first location marker from the display of the first electronic device.

36. The method of claim 25, wherein the first electronic device and the second electronic device are paired.

* * * * *